United States Patent
Barbour et al.

(10) Patent No.: US 10,277,569 B1
(45) Date of Patent: Apr. 30, 2019

(54) CROSS-REGION CACHE OF REGIONAL SESSIONS

(71) Applicant: Amazon Technologies, Inc., Seattle, WA (US)

(72) Inventors: Marc R. Barbour, Woodinville, WA (US); Khaled Salah Sedky, Sammamish, WA (US); Slavka Praus, Seattle, WA (US); Srikanth Mandadi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/958,888

(22) Filed: Dec. 3, 2015

(51) Int. Cl.
| | |
|---|---|
| *H04L 29/06* | (2006.01) |
| *H04L 9/08* | (2006.01) |
| *H04L 9/32* | (2006.01) |
| *H04L 29/08* | (2006.01) |

(52) U.S. Cl.
CPC ............ *H04L 63/08* (2013.01); *H04L 9/0861* (2013.01); *H04L 9/3247* (2013.01); *H04L 63/0442* (2013.01); *H04L 63/061* (2013.01); *H04L 67/142* (2013.01); *H04L 67/148* (2013.01)

(58) Field of Classification Search
None
See application file for complete search history.

(56) References Cited

U.S. PATENT DOCUMENTS

| | | | | | |
|---|---|---|---|---|---|
| 4,503,287 | A | * | 3/1985 | Morris | H04L 9/14 380/259 |
| 5,535,276 | A | * | 7/1996 | Ganesan | H04L 9/0825 380/46 |
| 5,757,920 | A | * | 5/1998 | Misra | G06F 21/33 705/76 |
| 5,809,144 | A | * | 9/1998 | Sirbu | G06Q 20/04 380/282 |
| 5,978,918 | A | * | 11/1999 | Scholnick | G06F 21/6263 705/53 |
| 6,041,357 | A | * | 3/2000 | Kunzelman | H04L 63/0815 709/228 |

(Continued)

OTHER PUBLICATIONS

Ramsdell, B.; RFC 3850—Secure/Multipurpose Internet Mail Extensions (S/MIME) Version 3.1 Certificate Handling; Jul. 2004; Retrieved from the Internet <URL: https://tools.ietf.org/pdf/rfc3850.pdf>; pp. 1-16, as printed. (Year: 2004).*

(Continued)

*Primary Examiner* — Saleh Najjar
*Assistant Examiner* — Michael W Chao
(74) *Attorney, Agent, or Firm* — Davis Wright Tremaine LLP

(57) ABSTRACT

Techniques for using short-term session credentials across regions are described herein. A first request for resources generated using a short-term session credentials and digitally signed with a digital signature. The request is generated in a first region and received in a second region. In response to the request, a second request is generated in the second region to validate the first request. A new session token that is usable in the second region is generated and returned to the second region. The new session token can then be used in the second region to fulfill the first request.

20 Claims, 35 Drawing Sheets

(56) References Cited

U.S. PATENT DOCUMENTS

| | | | |
|---|---|---|---|
| 6,094,485 A * | 7/2000 | Weinstein | H04L 63/105 380/30 |
| 6,212,634 B1 * | 4/2001 | Geer, Jr. | G06Q 20/3821 380/280 |
| 6,636,968 B1 | 10/2003 | Rosner et al. | |
| 6,851,060 B1 * | 2/2005 | Shrader | G06F 17/30861 707/999.009 |
| 7,146,009 B2 | 12/2006 | Andivahis et al. | |
| 7,181,017 B1 | 2/2007 | Nagel et al. | |
| 7,181,530 B1 | 2/2007 | Halasz et al. | |
| 7,499,551 B1 * | 3/2009 | Mire | H04L 9/006 380/277 |
| 7,669,051 B2 * | 2/2010 | Redlich | C07K 14/70575 713/166 |
| 7,751,558 B2 * | 7/2010 | Gentry | H04L 9/0836 380/30 |
| 7,860,243 B2 * | 12/2010 | Zheng | H04L 9/0833 380/30 |
| 8,312,272 B1 | 11/2012 | Serenyi et al. | |
| 8,447,983 B1 * | 5/2013 | Beck | H04L 9/0894 705/65 |
| 8,719,568 B1 * | 5/2014 | Antypas, III | H04L 9/14 713/168 |
| 9,191,375 B2 | 11/2015 | Kaler et al. | |
| 9,258,117 B1 * | 2/2016 | Roth | H04L 9/321 |
| 9,521,000 B1 * | 12/2016 | Roth | H04L 9/3247 |
| 9,954,680 B1 | 4/2018 | Machani et al. | |
| 2001/0008012 A1 * | 7/2001 | Kausik | G06F 21/6245 713/156 |
| 2001/0037453 A1 * | 11/2001 | Mitty | H04L 51/30 713/168 |
| 2002/0049912 A1 * | 4/2002 | Honjo | G06F 21/335 726/10 |
| 2003/0041241 A1 * | 2/2003 | Saito | H04L 63/0428 713/169 |
| 2003/0076959 A1 * | 4/2003 | Chui | H04K 1/00 380/277 |
| 2003/0149781 A1 | 8/2003 | Yared et al. | |
| 2003/0185391 A1 | 10/2003 | Qi et al. | |
| 2004/0139319 A1 | 7/2004 | Favazza et al. | |
| 2004/0210771 A1 | 10/2004 | Wood et al. | |
| 2005/0025091 A1 | 2/2005 | Patel et al. | |
| 2005/0079866 A1 | 4/2005 | Chen et al. | |
| 2005/0120214 A1 * | 6/2005 | Yeates | H04L 63/08 713/171 |
| 2006/0020783 A1 * | 1/2006 | Fisher | G06Q 20/02 713/156 |
| 2006/0184788 A1 | 8/2006 | Sandhu et al. | |
| 2007/0058815 A1 | 3/2007 | Kwak et al. | |
| 2007/0162518 A1 * | 7/2007 | Tian | H04L 9/0838 |
| 2008/0085004 A1 | 4/2008 | Kitaj et al. | |
| 2008/0134311 A1 * | 6/2008 | Medvinsky | G06F 21/33 726/7 |
| 2009/0249073 A1 | 10/2009 | Wiseman et al. | |
| 2009/0328186 A1 * | 12/2009 | Pollutro | G06F 21/31 726/13 |
| 2010/0318792 A1 | 12/2010 | Lin et al. | |
| 2011/0093710 A1 * | 4/2011 | Galvin | H04L 63/061 713/169 |
| 2013/0073850 A1 * | 3/2013 | Zaverucha | H04L 9/0869 713/168 |
| 2013/0226815 A1 | 8/2013 | Ibasco et al. | |
| 2013/0254117 A1 * | 9/2013 | von Mueller | G06Q 20/3829 705/71 |
| 2013/0301828 A1 | 11/2013 | Gouget et al. | |
| 2013/0318348 A1 * | 11/2013 | Lebron | H04L 63/0428 713/168 |
| 2014/0351574 A1 | 11/2014 | Grab et al. | |
| 2017/0078275 A1 | 3/2017 | Slovetskiy | |
| 2017/0134352 A1 | 5/2017 | Abbott | |
| 2018/0123784 A1 | 5/2018 | Gehrmann | |

OTHER PUBLICATIONS

No stated author; Understanding Digital Certificates; May 19, 2005; Retrieved from the Internet <URL: https://technet.microsoft.com/en-us/library/bb123848(v=exchg.65).aspx>; pp. 1-8, as printed. (Year: 2005).*

Kohl et al.; The Kerberos Network Authentication Service (V5); 1993; Retrieved from the Internet <URL: https://tools.ietf.org/pdf/rfc1510.pdf>; pp. 1-112, as printed. (Year: 1993).*

"How the Kerberos Version 5 Authentication Protocol Works," Microsoft TechNet, last updated Oct. 7, 2009 [retrieved May 5, 2017], https://web-beta.archive.org/web/20110428164922/https://technet.microsoft.com/en-us/library/cc772815, 64 pages.

McDaniel et al., "Antigone: Implementing Policy in Secure Group Communication," University of Michigan Department of Electrical Engineering and Computer Science, published 2000 [earliest listed date; retrieved May 11, 2017], http://oai.dtic.mil/oai/oai?verb=getRecord&metadataPrefix=html&identifier=ADA459517, 34 pages.

Vimercati et al., "A Data Outsourcing Architecture Combining Cryptography and Access Control," Proceedings of the 2007 ACM Workshop on Computer Security Architecture, Nov. 2, 2007, 7 pages.

Wong et al., "Secure Group Communications Using Key Graphs," IEEE/ACM Transactions on Networking 8(1):16-30, Feb. 2000.

* cited by examiner

CROSS-REGION CACHE OF REGIONAL SESSIONS

CROSS-REFERENCE TO RELATED APPLICATIONS

This application incorporates by reference for all purposes the full disclosure of co-pending U.S. patent application Ser. No. 14/958,872, filed concurrently herewith, entitled "ASYMMETRIC SESSION CREDENTIALS," co-pending U.S. patent application Ser. No. 14/958,887, filed concurrently herewith, entitled "CROSS-REGION ROLES," and co-pending U.S. patent application Ser. No. 14/958,892, filed concurrently herewith, entitled "PERSONALIZING GLOBAL SESSION IDENTIFIERS."

BACKGROUND

Modern computer systems typically have different services and resources that can be accessed by users of the computer system. When users request access to the services and resources, such requests is generally verified before access is granted so that a user does not gain access to services and resources outside of that user's set of permissions. One system typically used for providing secure access to services and resources is based on creating short-term session credentials that are associated with a user. Once a session is established, a user can use the session credentials associated with the session to issue multiple requests over the life of that session. Typically, session credentials are encrypted and include a secret key that is used to sign each of the multiple requests over the life of the session.

A drawback of such sessions and the associated session credentials is that any service that can decrypt the session credentials can have access to the secret key. When such session credentials are used across regions, providing access to secret keys can lead to increased vulnerabilities in computer systems. Furthermore, since decrypting the session credentials is typically required to verify a request, when the secret key is a symmetric key, the secret key can be used by services to improperly sign additional requests. For example, a service can receive a request and decrypt the session credentials associated with the request to extract the secret key for the purposes of verifying the request. However, if the service could also use the extracted secret key to generate requests to other services, even though such requests may not necessarily originate from the owner of the session.

BRIEF DESCRIPTION OF THE DRAWINGS

Various techniques will be described with reference to the drawings, in which.

DETAILED DESCRIPTION

Figure 1:
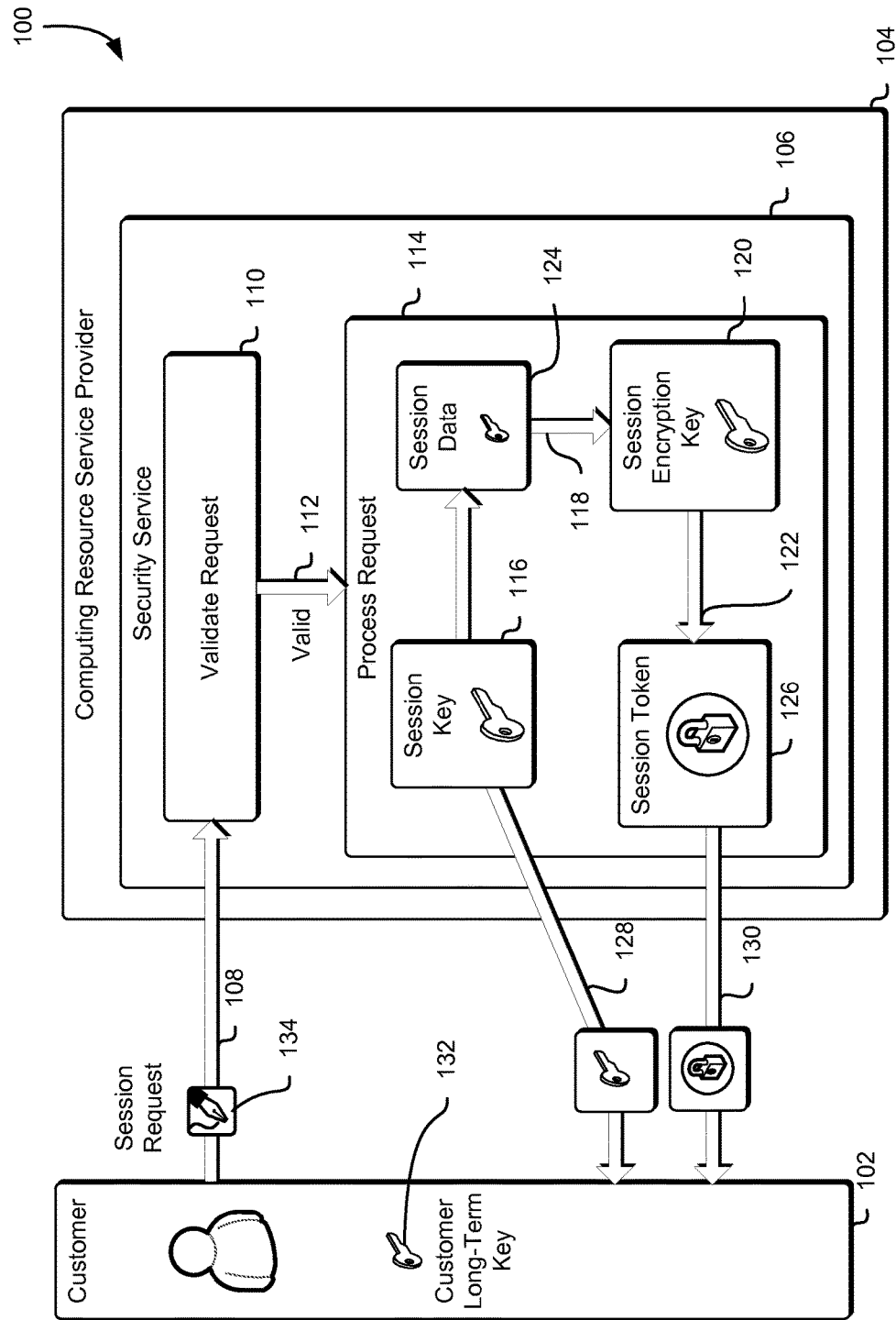
FIG. 1 illustrates an environment where session credentials are generated.

This disclosure relates to managing message authentication within a computing resource service provider environment using short-term credentials. The short-term credentials are generated based on long-term credentials and can be used within a computer system or across computer system boundaries. The short-term credentials can also be secured so that they may be used in untrusted environments without compromising either the short-term credentials or the underlying long-term credentials. The short-term credentials can also be partially based on other, short-term credentials so that, for example, they can be regularly expired and efficiently invalidated at an individual, account, regional, or global scale. The short term credentials can also be used to assign and validate short-term access to user roles so that a user can have access to resources in a region or location that the user may not generally have access to.

A request from a customer of a computing resource service provider for access to computing resources of the computing resource service provider is typically signed or authenticated by a key and that key is used to verify the request prior to executing or fulfilling the request. One method of signing the request is to use a long-term secret key that is maintained as a shared secret between the customer and the computing resource service provider. In this method, the customer signs the request using the long-term secret key and sends the request and the signature to the computing resource service provider. The computing resource service provider then verifies the signature using the same secret key and, if the signature is verified, the computing resource service provider executes or fulfills the request by, for example, providing resources, executing applications, or performing operations associated with the request.

One potential drawback of using long-term credentials to provide access is that, if the long-term credentials are compromised, they provide a mechanism for the detection of unauthorized access by an unauthorized agent. Another potential drawback of using such long-term credentials is that, if they are used for multiple transactions by a customer, the likelihood of their being compromised may increase. A third potential drawback of using such long-term credentials is that, in the interest of increasing their security, the cryptographic operations associated with such long-term credentials can become very computationally expensive if, for example, larger keys and/or more complicated key-generation algorithms are used.

Using short-term credentials such as those provided by session credentials helps alleviate some of the potential drawbacks of using long-terms credentials as message authenticators. One example of how a customer may obtain short-term session credentials that may be used as message authenticators is the customer may first generate a request for a session, and sign the request with a long-term secret key such as, for example, an account key. The request may then be sent to a security service which verifies the request signature. If the verification is successful, the security service can then generate a set of session data (also referred to herein as "short-term credential data") that includes a session key and encrypt the short-term credential data to produce a short-term credential such as a session credential (also referred to herein as a "session token"). The session token is encrypted with a session encryption key that is available only to the computing resource service provider and provided to the customer. The encryption of the session token prevents the customer from accessing the session data in the session token. The customer is also provided with a session key which is cryptographically related to the session key in the session data. When the customer sends a message using the session token, the session token is sent with the message and digitally signed with the session key sent to the customer. The computing resource service provider then extracts the session key from the session token using the secret encryption key and verifies the digital signature of the message using the extracted session key. If the digital signature is verified, the message is processed.

Using short-term credentials provided by session tokens, the customer can sign messages and have them authenticated without compromising long-term credentials. The long-term credentials (e.g., a password, a private key, or a certificate) are used to generate the request for the session token and the session token is only valid for a determined period of time. One example of how a session can be used by a customer is, a customer can request the session token using the username and password of the customer (i.e., the long-term credential) and can also request that the session be active for a certain time period (e.g., 36 hours). During the 36-hour period, the customer can generate messages and requests for resources using the session token and signed by the session key. Each request can be verified by the computing resource service provider without compromising the long-term key so, for example, the customer could generate thousands or millions of messages during the 36-hour period, and still have his or her username and password used only once. If, due to some circumstances, the short-term credentials in the session become compromised, the session token can be invalidated quickly and the customer can simply request a new session token.

In an example of how session tokens can be used as message authenticators, the copy of the session key in the session data that is encrypted in the session token may be the same as the copy of the session key that is returned to the customer. This type of symmetric key session token maintains the security of short-term credentials with the session encryption key. While the customer has access to the session key that is sent from the computing resource service provider, the customer does not have access to the session key in the session token. The session key that the customer has access to can be used to digitally sign messages and requests for resources, but such messages and requests will not be verified if the session key in the session token does not match the digital signature. Thus, the session key cannot be used to digitally sign messages without the session token and the session token cannot be used without the signature of the session key.

In another example of how session tokens can be used as message authenticators, the copy of the session key in the session data that is encrypted in the session token may one of a pair of session keys that form a public key encryption pair where the private key is maintained as a secret and the public key is used to verify the private key. In this type of asymmetric key session token, the session key in the session data is a public key and the session key that is provided to the customer is a corresponding private key. The security of the private key is maintained by the customer and the security of the public key is maintained within the session token with a session encryption key. As with a symmetric key session token, the session key that the customer has access to can be used to digitally sign messages and requests for resources, but such messages and requests will not be verified if the session key in the session token does not match the digital signature. In the case of asymmetric key session tokens, the public key in the session token can be used to verify the digital signature generated by the private key. In a first example of an asymmetric session token, the private key and the public key can be generated by the computing resource service provider and sent to the customer. In a second example of an asymmetric session token, the customer can maintain the private key for signing requests and provide the public key to the computing resource service provider for inclusion in the session token.

Symmetric key session tokens and asymmetric key session tokens can be used to provide short-term credentials for users and/or customers in several different ways. In a first example, a customer or user in one zone (or region) of a computing resource service provider can obtain short-term credentials in that region, and can then use those region-specific short-term credentials to authenticate message and/or generate resource requests in other regions. Because the other regions may not have access to the session encryption keys of the original region, they may not normally be able to extract the session key from the session token to verify the digital signature. However, by sending a request to the original region to extract the session key from the session token, the message or request can be authenticated by the original region and then the short-term credentials used in the other regions.

Similarly, customers can use session tokens across regions to authenticate access to resources in defined roles. For example, a user in a first region may create a set of permissions for access to resources in a second region such as, for example, the ability to access a particular database. This set of permissions defines a role for access to those resources and other users can assume that role to access the resources. Symmetric and asymmetric session tokens can be used across regions to access the role by providing an identifier associated with the role to the other users in other regions (i.e., regions different than where the resources are located). When the other users use the identifier associated with the role to assume the role, a symmetric or asymmetric session token can be generated, providing short-term credentials for the access. Such short-term credentials can also provide access to resources in untrusted regions such as, for example, external regions because the short-term credentials can all be both generated and verified in trusted regions, thereby protecting any sensitive information such as encryption keys from being accessed in the untrusted regions.

Other aspects of symmetric and asymmetric session tokens can also be used to control access to customer credentials, to limit those credentials to certain regions, to personalize those credentials to customers, accounts, or roles, and/or to maintain those credentials, are also described in the present disclosure. For example, by encrypting a session token with a combination of encryption keys that are global, regional, and/or account-specific, only a customer associated with that account or in that region may be able to use that session token. Similarly, by encrypting a session token with a combination of encryption keys, the session tokens (and thus, the short-term credentials) may be quickly invalidated by discarding one of the encryption keys while keeping the others that may still be valid and/or usable.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where session credentials are generated in accordance with an embodiment. A customer 102 of a computing resource service provider 104 may generate a session request 108 (also referred to herein as a "request for a session") from a security service that may be used as a short-term credential (also referred to as a "session token") and which may be used to authenticate messages from the customer 102 to the computing resource service provider 104 and which may also be used to generate requests for resources from the computing resource service provider 104. In some embodiments, the computing resource service provider 104 may provide a distributed, virtualized, and/or datacenter environment within which one or more applications, processes, services, virtual machines, and/or other such computer system entities may be executed. In some embodiments, the customer 102 may be a person, or may be a process running on one or more remote computer systems, or may be some other computer system entity, user, or process.

The commands to connect to the computer system instance may originate from an outside computer system and/or server, or may originate from an entity, user, or process on a remote network location, or may originate from an entity, user, or process within the computing resource service provider 104. The command to connect to the computing resource service provider 104 may be generated by a computer system client device associated with the customer 102, or may originate as a result of an automatic process, or may originate as a result of a combination of these and/or other such origin entities. In some embodiments, the command or commands to initiate the connection to the computing resource service provider 104 may be sent to the one or more services associated with and/or provided by the computing resource service provider 104, without the intervention of the customer 102. The commands to initiate the connection to the services may originate from the same origin as the commands to connect to the computing resource service provider 104, or may originate from another computer system and/or server, or may originate from a different entity, user, or process on the same or a different remote network location, or may originate from a different entity, user, or process within the computing resource service provider 104, or may originate from a different user of a computer system client device, or may originate as a result of a combination of these and/or other such same and/or different entities.

The customer 102 may request connection to the computing resource service provider 104 via one or more connections and, in some embodiments, via one or more networks and/or entities associated therewith, such as servers connected to the network, either directly or indirectly. The computer system client device that may request access to the services may include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines, and/or other types of computing devices and/or components. The network may include, for example, a local network, an internal network, a public network such as the Internet, or other networks such as those listed or described below. The network may also operate in accordance with various protocols such as those listed or described below.

The computing resource service provider 104 may provide access to one or more host machines, as well as provide access to one or more virtual machine (VM) instances as may be operating thereon. The services provided by the computing resource service provider 104 may also be implemented as and/or may utilize one or more VM instances as may be operating on the host machines. For example, the computing resource service provider 104 may provide a variety of services to the customer 102 and the customer 102 may communicate with the computing resource service provider 104 via an interface such as a web services interface or any other type of interface. While the example environment illustrated in FIG. 1 shows a single connection or interface used to generate the session request 108 from the computing resource service provider 104, each of the services provided by the computing resource service provider 104 may have its own interface and, generally, subsets of the services may have corresponding interfaces in addition to or as an alternative to the single interface.

The computing resource service provider 104 may provide various services to its users or customers (e.g., the customer 102). The services provided by the computing resource service provider 104 may include, but may not be limited to, virtual computer system services, block-level data storage services, cryptography services, on-demand data storage services, notification services, authentication services, policy management services, security services, or other services. Not all embodiments described may include all of these services, and additional services may be provided in addition to or as an alternative to the services explicitly described. As described above, each of the services may include one or more web service interfaces that enable the customer 102 to submit appropriately configured API requests to the various services through web service requests. In addition, each of the services may include one or more service interfaces that enable the services to access each other (e.g., to enable a virtual machine instance provided by the virtual computer system service to request credentials from a security service such as the security service 106).

The security service 106 may be one of a plurality of services provided by the computing resource service provider 104 and may be configured to facilitate secure access to the services and/or other resources associated with the computing resource service provider 104. For example, the security service 106 may be configured to control access to resources of the computing resource service provider 104, may be configured to authenticate messages sent to the computing resource service provider 104, may be configured to verify credentials of customers such as the customer 102, may be configured to provide secure storage for credentials, may be configured to generate credentials, and may be configured to perform other security related operations associated with the computing resource service provider 104. For example, the security service 106 may generate cryptographic keys such as those described herein, may receive cryptographic keys from customers and/or other services, may maintain cryptographic keys as a service, and/or may use such cryptographic keys to validate requests and digital signatures of requests and messages. It should be noted that, as used herein, a "cryptographic key" may refer to a symmetric key, an asymmetric key, or some other authentication credential (e.g., a username and password or a certificate) and may be referred to simply as a "key." In an embodiment, a security service maintains cryptographic keys as a secret within the security service by, for example, storing the key in a hardware security module ("HSM"). In another embodiment, a security service maintains cryptographic keys as a secret within the security service by being configured to not expose the key (e.g., because the security service is programmed to not provide the keys). In another embodiment, a security service maintains cryptographic keys as a secret within the security service by, for example, deleting the keys in the event of an intrusion.

The session request 108 may be digitally signed 134 by the customer so that the security service 106 may validate the session request 110. In the example illustrated in FIG. 1, the session request 108 is digitally signed 134 with a customer long-term key 132 associated with the customer 102. A customer long-term key 132 is a secure credential with a long-term period of validity (e.g., three months, six months, or more) that is uniquely associated with the customer 102. In another embodiment, the session request 108 is digitally signed 134 with a username and password of an account associated with the customer 102. In another embodiment, the session request is digitally signed 134 with a short-term credential such as those described herein (i.e., a session request 108 may be digitally signed 134 by a session token that may be specific to such requests). In another embodiment, the session request is digitally signed with a public key cryptography key pair that includes a public long-term key and a private long-term key. In another embodiment, the session request is digitally signed 134 by a certificate such as, for example, an X.509 certificate, or some other public or identify certificate. In another embodiment, the session request is digitally signed 134 by a combination of such cryptographic methods. As may be contemplated, the examples of cryptographic methods that may be used to digitally sign the session request described herein are illustrative examples and other such cryptographic methods that may be used to digitally sign the session request may be considered as within the scope of the present disclosure.

When the security service 106 receives the session request 108 that is digitally signed 134 by, for example, the customer long-term key 132, the security service may first validate the request 110. Operations to validate the request 110 may include, but may not be limited to validating the identity of the customer 102, validating that the customer 102 is authorized to generate the session request 108, validating that the customer account used to generate the request is authorized to generate the session request 108, and/or validating that the request came from a computing device associated with the customer 102 that is authorized to generate the session request 108. In the example illustrated in FIG. 1, the security service 106 validates the request by verifying that the session request 108 is digitally signed 134 by the customer long-term key 132 and that the customer long-term key 136 is being used by the customer 102 associated with the key. Although not illustrated in FIG. 1, in the event that the session request 108 is not valid (i.e., that one or more of the operations to validate the request 110 yield a result indicating the request is not valid), an error may be generated and/or one or more notifications may be sent to the customer, an administrator, or some other such entity.

If the session request 108 is valid 112, the security service 106 may then process 114 the request. The security service 106 may first process 114 the request by obtaining a session key 116 and a session encryption key 120. The session key 116 may be any cryptographic key, certificate, or credential. The session key 116 may be generated by the security service 106, may be provided by another service of the computing resource service provider 104, or may be provided by the customer 102. The session encryption key 120 may also be any cryptographic key, certificate, or credential and may be generated by the security service 106 or may be provided by another service by the computing resource service provider 104. In an embodiment, the session key 116 and/or the session encryption key 120 are generated by dedicated hardware and/or software within the computing resource service provider 104 environment configured to generate such keys. The security service 106 may then store the session key 116 in a set of session data 124 and may encrypt 118 the session data 124 using the session encryption key 120 to generate 122 a session token 126. Each of these operations is described in more detail below, as is the set of session data 124.

The security service 106 may then provide 130 the session token 126 to the customer 102. In the example illustrated in FIG. 1, because the session token 126 is encrypted using the session encryption key 120, the customer cannot access the session data 124 and may not otherwise alter the session data 124, including the session key 116 stored in the session data 124. Additionally, the security service 106 may provide 128 the session key 116 to the customer 102 so that the customer 102 can use the session key 116 to digitally sign messages and/or requests that are combined with the session token 126 as described herein. The examples described below illustrate how the short-term credentials in the session token 126 are combined with the digital signature of the session key 116 to verify requests and/or authenticate messages.

Figure 2:
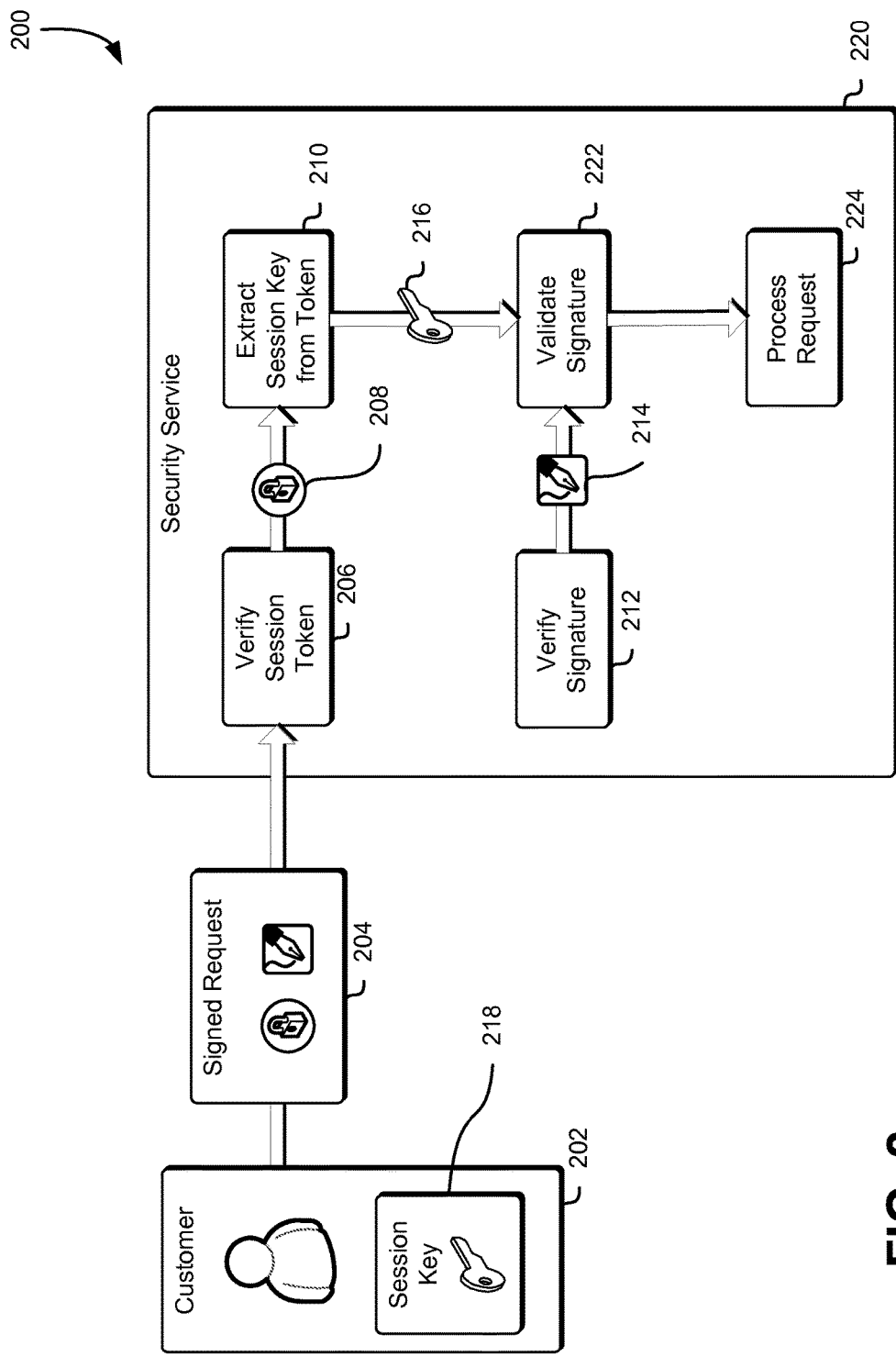
FIG. 2 illustrates an environment where requests are validated using session credentials.

FIG. 2 illustrates an example environment 200 where requests are validated using session credentials as described in connection with FIG. 1 and in accordance with an embodiment. A customer 202 may use the session token described above to generate a signed request 204. The signed request 204, which includes the session token, is signed by the session key 218. The signed request is illustrated herein with a "lock" symbol in a circle, which represents the session token and the "pen and line" symbol in the square, which represents the digital signature.

As discussed herein, numerous variations of the cryptographic operations described herein utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt.

Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve cryptography algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms for symmetric and/or asymmetric cryptographic primitives are considered as being within the scope of the present disclosure and the above is not intended to be an exhaustive list.

It should be noted that that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures. As with the above, other algorithms and combinations of algorithms used to provide digital signatures are also considered as being within the scope of the present disclosure and the above is not intended to be an exhaustive list.

In various embodiments, data objects such as session tokens may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security.

In such examples, the key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

The signed request 204 may be received by a security service 220, which may be the same as the security service 106 described in connection with FIG. 1. The security service 220 may first verify the session token 206 by extracting the session key 210 from the session token 208 that is included in the signed request 204. The security service 220 may extract the session key 210 from the session token 208 by decrypting the session token using the session encryption key. The session encryption key, which may be the same as the session encryption key 120 described in connection with FIG. 1, may be maintained as a secret by the security service 220 using one or more of the methods described herein.

It should be noted that, unless otherwise specified or made clear from context, "decrypting the session token using the session encryption key" includes decrypting the session token using the same session encryption key that was used to encrypt the session token (i.e., using a symmetric session encryption key), decrypting the session token using a decryption key that corresponds to the session encryption key (i.e., using an asymmetric session encryption key), decrypting the session token using a combination of keys that were used to encrypt the session token (i.e., using multiple session encryption keys), or a combination of these and/or other such cryptographic operations usable to extract the session key from the session token.

The security service 220 may then verify 212 the signature 214 of the signed request 204 by using the extracted session key 216 obtained by extracting the session key 210 from the session token 208 that is included in the signed request 204 by obtaining the session key 210 from the extracted session data. The security service 220 may validate the signature 222 of the signed request by, for example, using the extracted session key 216 to perform a cryptographic operation to validate the digital signature generated by the session key 218. The security service 220 may also validate the signature 222 by using the session key 218 to perform an encryption operation on a data item and then using the extracted session key 216 to perform a corresponding decryption operation on the encrypted data item. The security service 220 may also validate the signature 222 by comparing the session key 218 to the extracted session key 216. Finally, if the security service 220 is able to verify the session token 206 and is able to verify 212 the signature 214, the security service may process the request 224 by, for example, providing resources associated with the request and/or forwarding the request to another service of the computing resource service provider.

In an embodiment, the signed request 204 includes a request for resources from a computing resource service provider such as the computing resource service provider 104 described in connection with FIG. 1. The request for resources may include an identifier for the resource and/or an identifier for the customer 202. The request for resources may also include a set of policies or permissions for access to the resources or those policies or permissions may be determined after the request for resource is received by the computing resource service provider. For example, the request for resources may include a request, by the customer 202, to access a data store provided by a data storage service of the computing resource service provider. The request for resources may further specify that the customer desires read-write access to the data store provided by the data storage service of the computing resource service provider. Because having read-write access to a data store can have potentially harmful effects, verifying the request using the short-term credentials provided by the session token can help ensure that the customer 202 is authorized to access such resources.

In another embodiment, the signed request 204 includes a message that is received by the computing resource service provider such as the computing resource service provider 104 described in connection with FIG. 1 and that must be authenticated by the security service 220 before being processed by the computing resource service provider. The message may include an identifier for the customer 202, may include a destination for the message, and may include the content of the message. For example, the message may be a message, from the customer 202, to restart one or more virtual machine instances associated with the customer 202. Because restarting virtual machine instances can have harmful effects, authenticating the message using the short-term credentials provided by the session token can help ensure that the customer 202 is authorized to restart the virtual machine instances.

In an embodiment, the operations to verify the session token 206 and to verify 212 the signature 214 before processing the request 224 (or authorizing the message) are performed by the security service 220 prior to sending the request or the message to a different service of the computing resource service provider. In another embodiment, the operations to verify the session token 206 and to verify 212 the signature 214 are performed by the security service 220 after the different service of the computing resource service provider has received the request or the message. That is, the different service of the computing resource service provider receives the request or message and forwards the request or message to the security service 220 for verification of the session token and signature. In another embodiment, the different service may be configured to verify the session token 206 and/or to verify 212 the signature 214 by, for example, obtaining the session encryption key from the security service.

Figure 3:
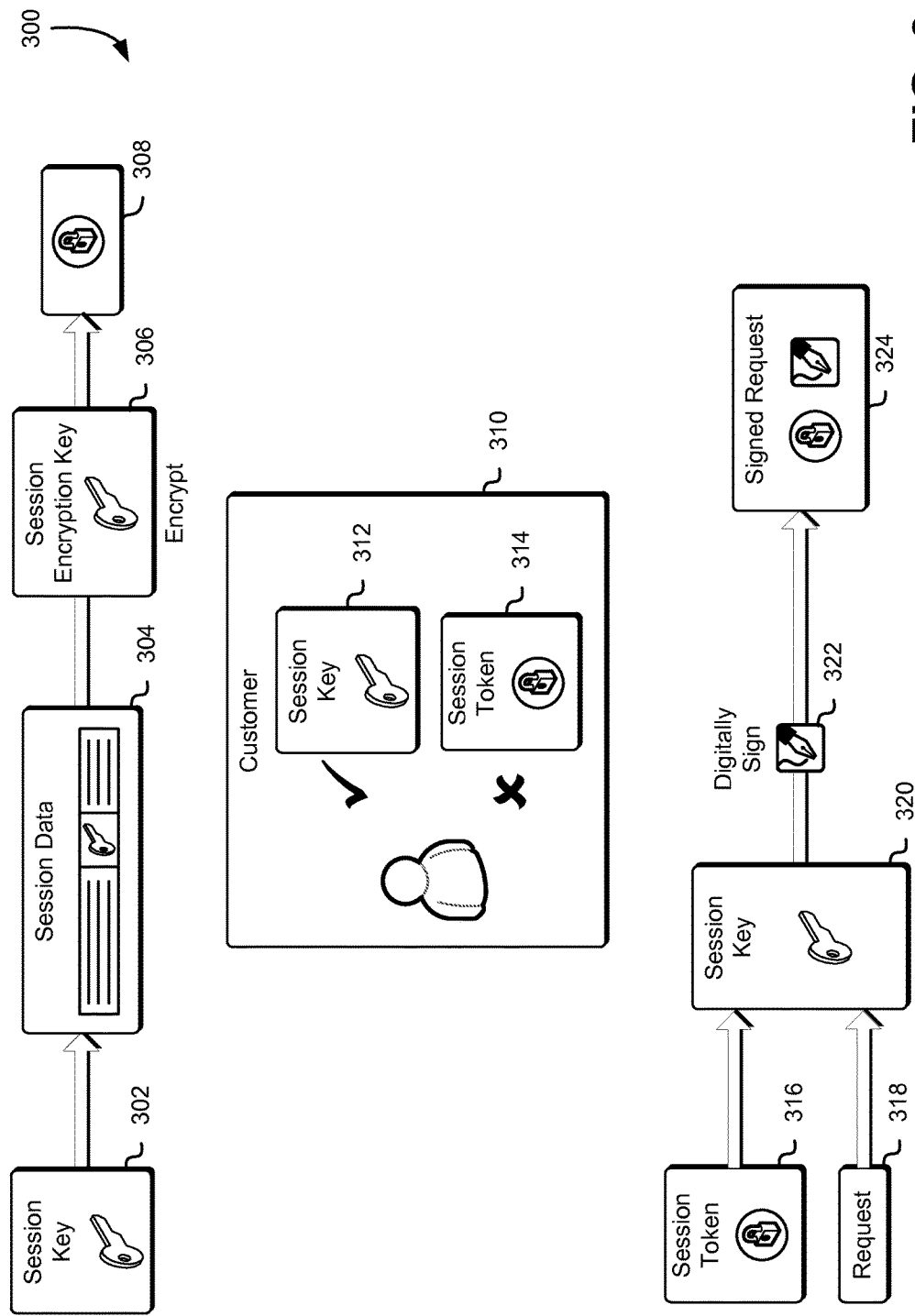
FIG. 3 illustrates a diagram showing encryption operations associated with using session credentials.

FIG. 3 illustrates an example diagram 300 showing encryption operations associated with using session credentials as described in connection with FIG. 1 and in accordance with an embodiment. The first part of the example diagram 300 illustrated in FIG. 3 shows how a session key and a session encryption key are used to produce the session token as described above. The operations illustrated in the first part of the example diagram 300 may be performed by a security service such as the security service 106 described in connection with FIG. 1. The session key 302 is added to the unencrypted session data 304. The unencrypted session data (also referred to herein more simply as the "session data") may contain additional data and/or metadata associated with the session including, but not limited to, identifiers associated with users (or customers), identifiers associated with user (or customer) accounts, identifiers associated with resources, zones of operation (also referred to herein as "regions") of the computing resource service provider where the session may be used, policies associated with the session, permissions associated with the session, roles associated with the session, keys used to generate the session token, expiration conditions (e.g., dates or times) associated with the session, or other such data and/or metadata associated with the session.

The session data 304 may be encrypted using the session encryption key 306 as described herein to produce the session token 308. Although not illustrated in the first part of the example diagram 300, the session encryption key may also be preserved as a secret within the security service, stored in a session encryption keychain, or otherwise maintained for later use in the verification operations. It should be noted that the session key 302 and the session encryption key 306 are different keys. The session key 302 is stored in the session data 304 and is, in some embodiments, provided to the customer. The session encryption key 306 is used to encrypt the session data 304 to produce the session token 308 and is maintained as a secret (i.e., is not provided to the customer).

The second part of the example diagram 300 illustrated in FIG. 3 shows how some parts of the data sent to the customer 310 in response to the request for the session token are accessible to the customer 310, while some parts of the data sent to the customer 310 in response to the request for the session token are not accessible to the customer 310. In the example illustrated in the second part of the example diagram 300 illustrated in FIG. 3, the session token 314 is not accessible to the customer 310 as illustrated by the "x-shaped mark" next to the session token 314. The session token 314 may be usable by the customer 310 to generate signed requests as described above, but the customer 310 may not be able to extract the session data 304 to produce extracted session data from the session token because the customer 310 may not have access to the session encryption key 306 (or a corresponding session decryption key).

Conversely, in the example illustrated in the second part of the example diagram 300 illustrated in FIG. 3, the session key 312 is accessible to the customer 310 as illustrated by the "check mark" next to the session key 312. The session key 312 may be usable by the customer 310 to digitally sign requests for resources as described above and/or to digitally sign messages also as described above. As used herein, the terms "digital signature" and "digitally signing" refer to the process of performing one or more mathematical operations (i.e., cryptographic operations) to provide a means for authenticating the request and/or the message. If the digital signature is valid (i.e., it is verified), a service such as the security service 106 described in connection with FIG. 1 can verify that the request or message was generated by the customer, that the customer cannot later repudiate the message (i.e., cannot later deny that the customer sent the message), and that the message was not tampered with in transit. A session key can be used to digitally sign a request or message by using a signing algorithm associated with a digital signature scheme combined with the session key. The digital signature can then be verified using a corresponding signature verification algorithm with the session key (or with a corresponding key).

The third part of the example diagram 300 illustrated in FIG. 3 shows how the signed request is generated using the session token and signed with the session key. In the example illustrated in the third part of the example diagram 300 illustrated in FIG. 3, the session token 316 is combined with a request 318, and digitally signed 322 using the session key 320. The process to digitally sign the request using the session key 320 may include encrypting the request 318 using the session key 320 based on the signing algorithm associated with the digital signature scheme. The process to digitally sign a message using the session key 320 may also include encrypting the message using the session key 320 based on the signing algorithm associated with the digital signature scheme. In an embodiment, the signing algorithm used to sign messages is different than the signing algorithm used to sign requests such as the request 318.

Figure 4:
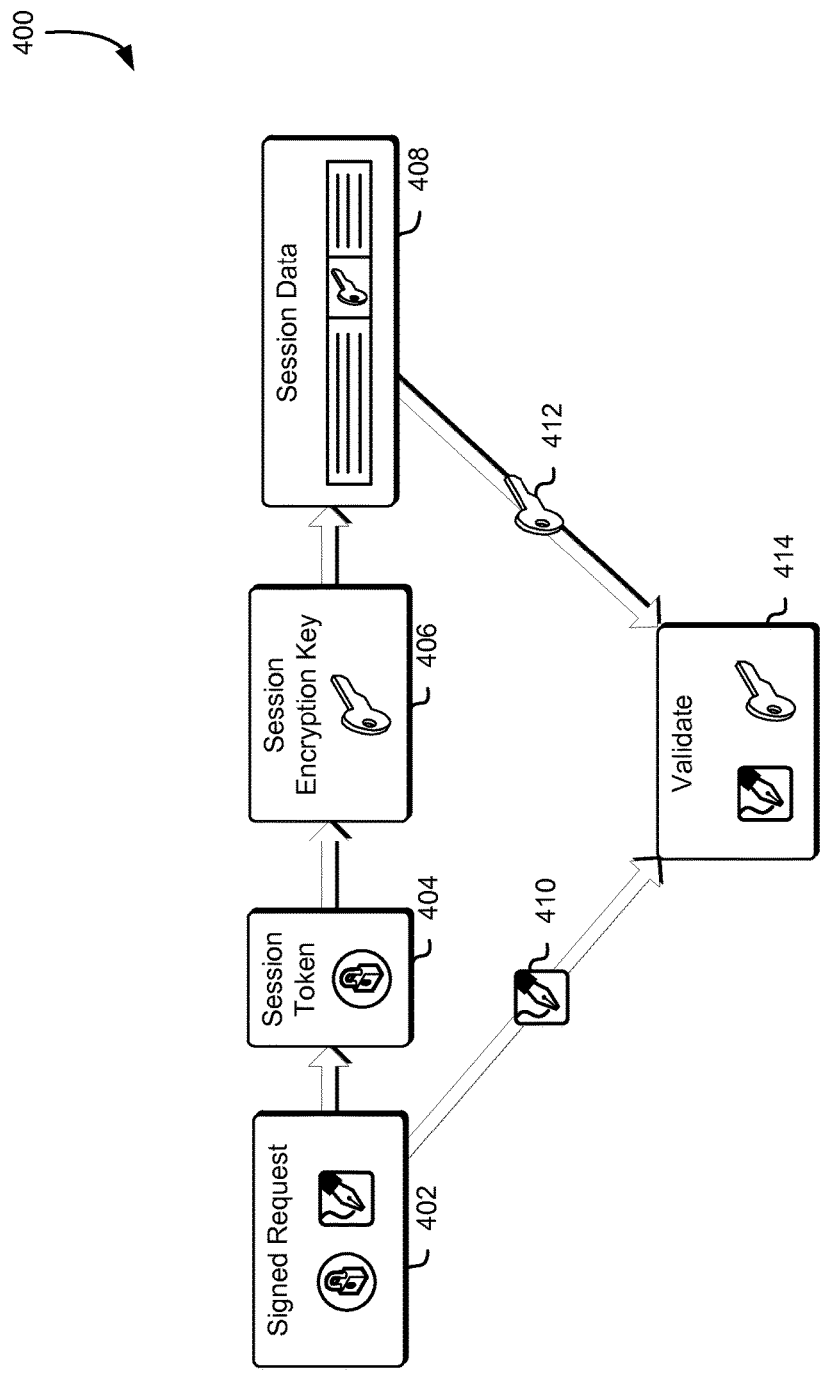
FIG. 4 illustrates a diagram showing decryption operations associated with using session credentials.

FIG. 4 illustrates an example diagram 400 showing decryption operations associated with using session credentials as described in connection with FIG. 1 and in accordance with an embodiment. A signed request 402 may be received and the session token 404 used to generate the request may be extracted from the signed request 402. The session data 408 may then be extracted from the session token by using the session encryption key 406. In an embodiment, the session encryption key 406 is the same key that was used to encrypt the session token as described above. In another embodiment, the session encryption key 406 is a key corresponding to the key that was used to encrypt the session token but that is different than the key that was used to encrypt the session token. For example, the session encryption key 406 and the key that was used to encrypt the session token may be two keys of a public key cryptography key pair, where one of the keys is a public key of the public key cryptography key pair and the other key is a private key of the public key cryptography key pair. In such an example, the public key of the public key cryptography key pair may be generated to match the private key of the public key cryptography key pair by, for example, performing one or more key generation operations on the private key to produce the public key.

After the session data 408 is extracted from the session token by using the session encryption key 406, the session key 412 from the session data 408 extracted from the session token 404 may be used to validate 414 the digital signature 410 as described above. In the example illustrated in FIG. 4, the session key 412 (also referred to herein as the "extracted session key") may be used to validate 414 the digital signature 410 by using the session key 412 in conjunction with a digital signature verification algorithm associated with the digital signature scheme used to digitally sign the signed request 402 (e.g., Diffie-Hellman, RSA cryptography, Hash trees, Rabin signatures, GMR signatures, elliptic curve cryptography, or some other digital signature scheme). As may be contemplated, the digital signature schemes described herein are merely illustrative examples and other such digital signature schemes may be considered as within the scope of the present disclosure.

Figure 5:
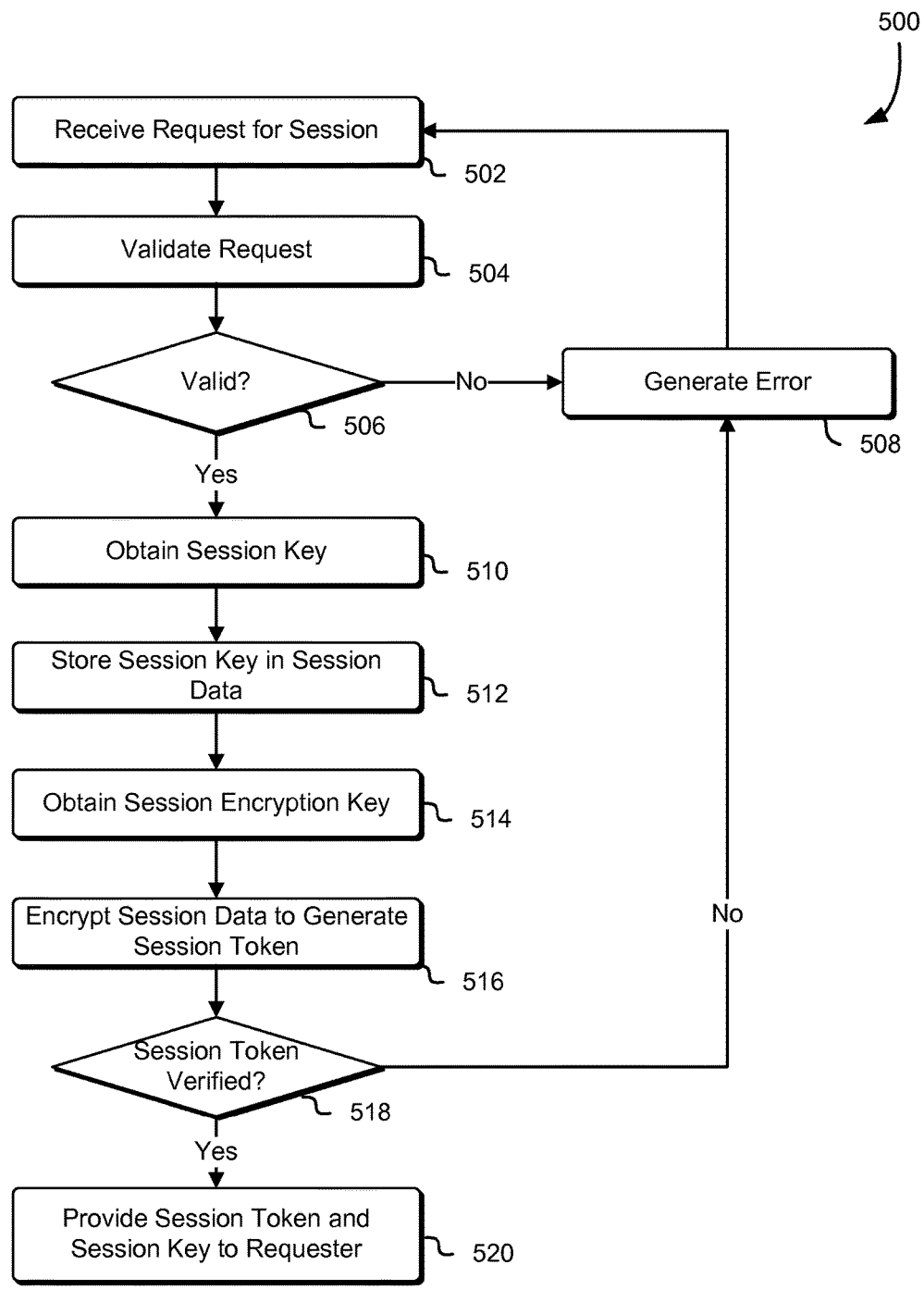
FIG. 5 illustrates a process for validating requests using session credentials.

FIG. 5 illustrates an example process 500 for validating requests using session credentials as described in connection with FIG. 1 and in accordance with an embodiment. A security service such as the security service 106 described in connection with FIG. 1 may perform the process illustrated in FIG. 5. The security service may first receive a request for a session 502 (also referred to herein as receiving a request for a "session token"). In an embodiment, the request for a session token is signed with a digital signature using a credential associated with the requester such as, for example, the customer long-term key described above. In such an embodiment, the request may first be validated 504 by verifying the credential to ensure that the request for the session was properly generated, that it was generated by the customer, and/or that it was not tampered with during transmission.

A request that is not valid 506 may cause the security service to generate an error 508 in response to the invalid request. The security service may generate an error 508 and send a report of the error to the customer, or to an administrative account associated with the customer, or to a computing device associated with the customer, or to a message log system or service associated with the customer. The security service may also communicate the error to the customer using an email, a short message service ("SMS") message, a console message, an application programming interface ("API") call (also referred to herein as an application programming interface request), a webservice call, a library call, or some other such communication modality.

Similarly, the security service may generate an error 508 and report the error to a user, account, device, or message log service associated with the security service and/or with the computing resource service provider. For example, a report of the error may be sent to an access monitoring service that monitors attempted access to resources associated with the computing resource service provider in order to identify potential malicious attacks. As may be contemplated, the actions taken by the security service in response to a request that is not valid described herein are illustrative examples and other such responses to requests that are not valid may be considered as within the scope of the present disclosure.

If the request for a session token is valid because, for example, the credentials associated with the request are verified, the security service may then obtain 510 a session key for the session. In an embodiment, the session key is obtained by generating the session key using a key generation algorithm associated with the encryption scheme for the session keys. In another embodiment, the session key is obtained by selecting the session key from a plurality of pre-generated session keys. In another embodiment, the session key is received from the requester (e.g., the customer) associated with the request for the session token. In such an embodiment, the session key may be included with the request for the session token or the session key may be received by the security service in response to a request sent to the customer.

After obtaining the session key, the security service may then store 512 the session key in the session data as described above. The security service may then obtain 514 a session encryption key usable to encrypt the session data to produce the session token. In an embodiment, the session encryption key is obtained by generating the session encryption key using a key generation algorithm associated with the encryption scheme for the session encryption keys. In such an embodiment, the encryption scheme for the session encryption keys may be different from the encryption scheme for the session keys. In another embodiment, the session encryption key is obtained by selecting the session encryption key from a plurality of pre-generated session encryption keys. In another embodiment, the session encryption key is generated from a combination of personal and global keys as described below.

In an embodiment, the session encryption key is a designated key of a plurality of keys maintained by the security service in a session encryption keychain. For example, a plurality of session encryption keys may be maintained by the security service in a session keychain with a corresponding time interval. Periodically (e.g., each hour) a new session encryption key may be generated and stored in the session encryption keychain and an oldest session encryption key (i.e., the key that was generated the longest time ago) may be deleted, invalidated, or otherwise removed from use. In such an embodiment, the newest key may be designated for use as the session encryption key (i.e., may be the only key used to encrypt the session data to generate the session token) while the other keys may be used to decrypt the session token to extract the session data.

After obtaining the session encryption key, the security service may then use the session encryption key to encrypt 516 the session data to generate the session token as described above. The security service may then verify 518 the session token by performing one or more cryptographic operations on the session token (e.g., the security service may use the session encryption key and/or a corresponding key to decrypt the session token and compare the results to the session data). If the security service is not able to verify 518 the session token, the security service may generate 508 an error as described above. If the security service is able to verify 518 the session token, the security service may provide 520 the session token and the session key to the requester. In an embodiment where the requester has provided the session key, the security service may provide 520 only the session token to the requester.

Figure 6:
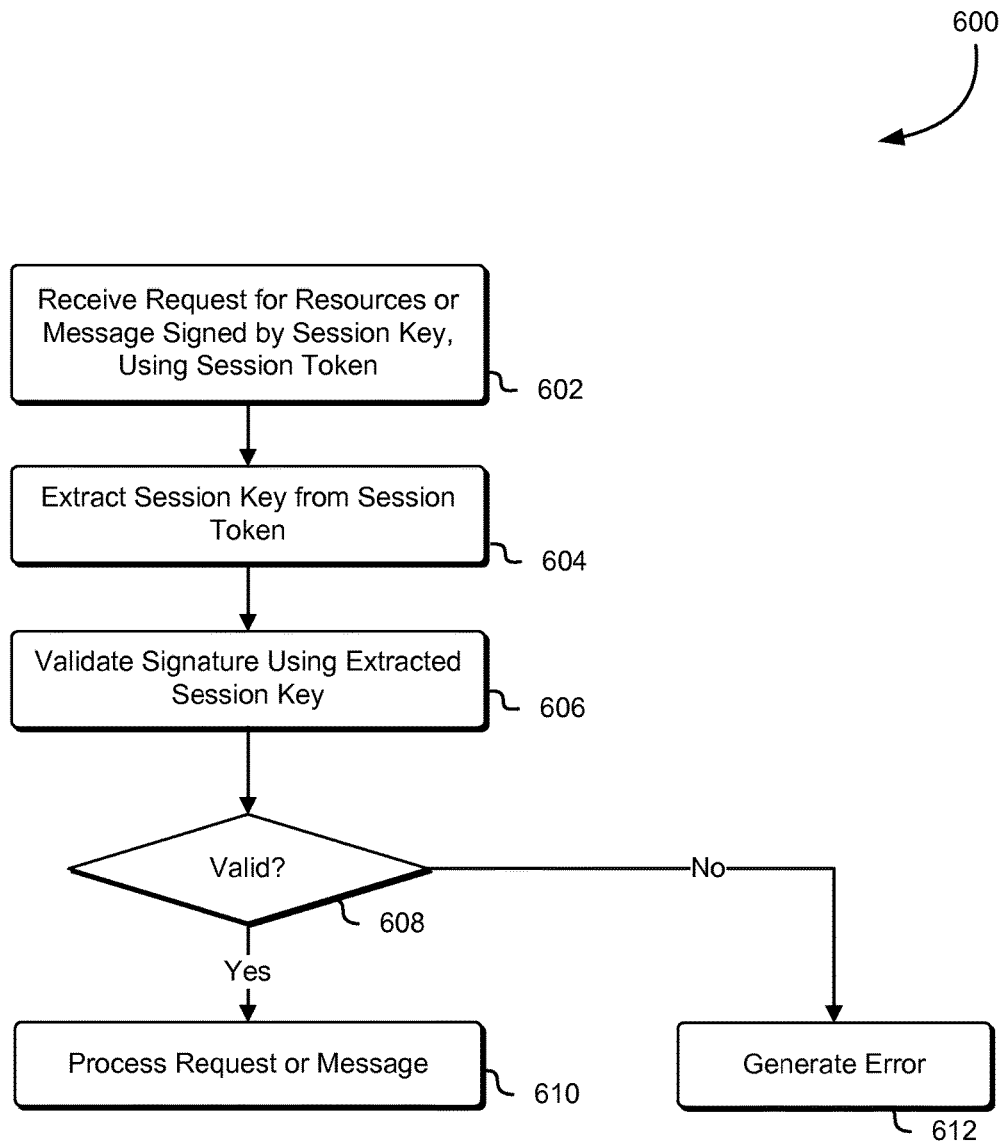
FIG. 6 illustrates a process for using a session token to generate resource requests using session credentials.

FIG. 6 illustrates an example process 600 for using a session token to generate resource requests using session credentials as described in connection with FIG. 1 and in accordance with an embodiment. A security service such as the security service 106 described in connection with FIG. 1 may perform the process illustrated in FIG. 6. The security service may first receive 602 a request for resources or a message as described above. The request for resources or the message may be digitally signed by a session key and may also be generated using a session token, also as described above.

Next, the security service may extract 604 the session key from the session token used to generate the session token and may validate 606 the digital signature using the extracted session key. If the signature is valid 608 (i.e., if the request or the message is authenticated), the security service may next process 610 the request or the message by, for example, providing access to the resources, processing the message, or performing some other action. If the signature is not valid 608 (i.e., if the request or the message is not authenticated) the security service may generate 612 an error as described above.

Figure 7:
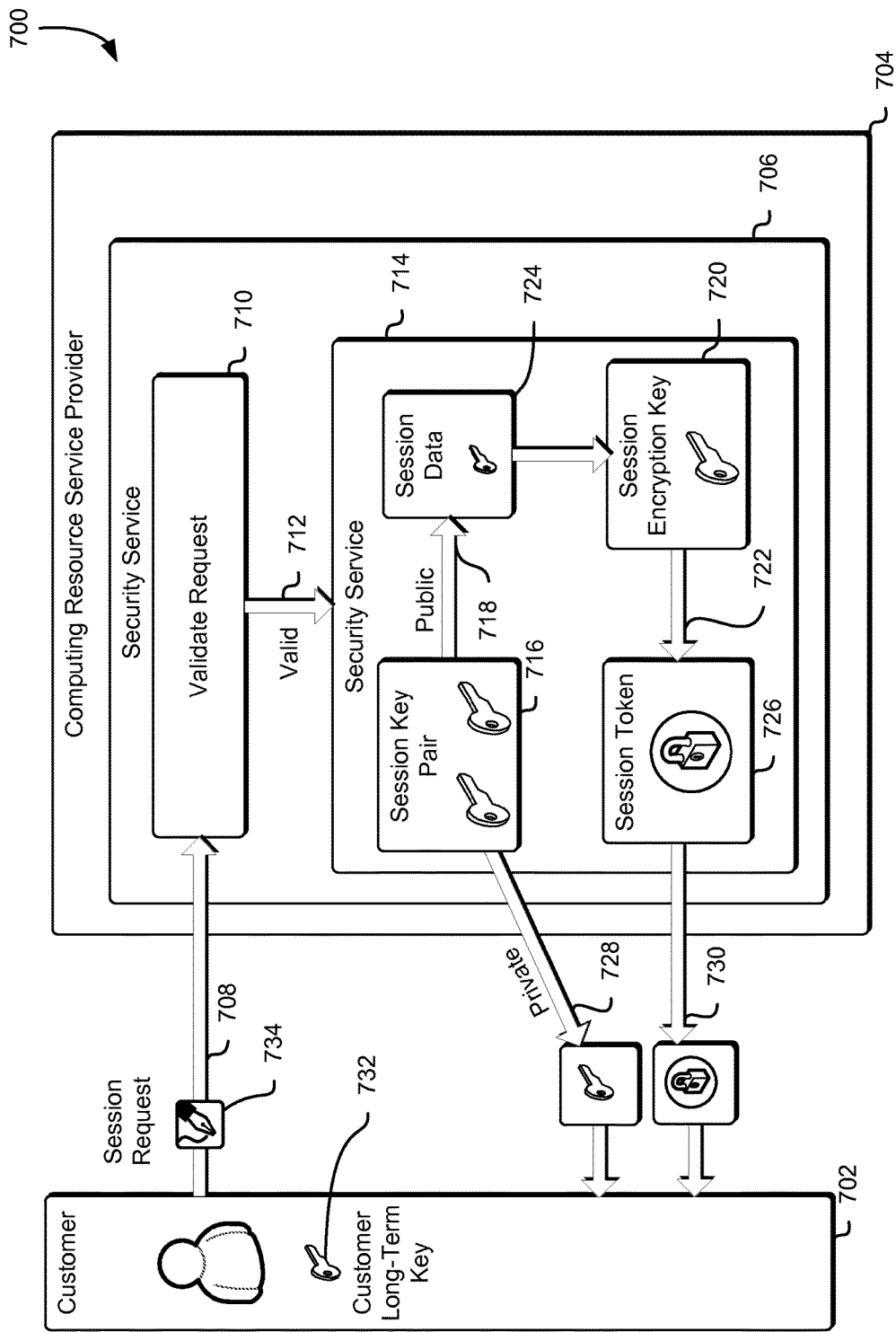
FIG. 7 illustrates an environment where session credentials are generated with asymmetric keys.

FIG. 7 illustrates an environment 700 where session credentials are generated with asymmetric keys using session credentials as described in connection with FIG. 1 and in accordance with an embodiment. A customer 702 of a computing resource service provider 704 may generate a session request 708 from a security service that may be used as a short-term credential and which may be used to authenticate messages from the customer 702 to the computing resource service provider 704 and which may also be used to generate requests for resources from the computing resource service provider 704. The customer 702, the computing resource service provider 704, and the security service 706 may be the same as the customer 102, the computing resource service provider 104, and the security service 106 described above in connection with FIG. 1.

The session request 708 may be digitally signed 734 by the customer so that the security service 706 may validate 710 the session request. In the example illustrated in FIG. 7, the session request 708 is digitally signed 734 with a customer long-term key 732 associated with the customer 702. As described above, a customer long-term key 732 is a secure credential with a long-term period of validity (e.g., three months, six months, or more) that is uniquely associated with the customer 702. In another embodiment, the session request 708 is digitally signed 734 with a username and password of an account associated with the customer 702. In another embodiment, the session request is digitally signed 734 with a short-term credential such as those described herein (i.e., a session request 708 may be digitally signed 734 by a session token that may be specific to such requests). In another embodiment, the session request is digitally signed 734 by a certificate such as, for example, an X.509 certificate, or some other public or identify certificate. In another embodiment, the session request is digitally signed 734 by a combination of such cryptographic methods. As may be contemplated, the examples of cryptographic methods that may be used to digitally sign the session request described herein are illustrative examples and other such cryptographic methods that may be used to digitally sign the session request may be considered as within the scope of the present disclosure.

When the security service 706 receives the session request 708 that is digitally signed 734 by, for example, the customer long-term key 732, the security service may first validate 710 the session request. Operations to validate 710 the session request may include, but may not be limited to validating the identity of the customer 702, validating that the customer 702 is authorized to generate the session request 708, validating that the customer account used to generate the request is authorized to generate the session request 708, and/or validating that the request came from a computing device associated with the customer 702 that is authorized to generate the session request 708. In the example illustrated in FIG. 7, the security service 706 validates the request by verifying that the session request 708 is digitally signed 734 by the customer long-term key 732 and that the customer long-term key 736 is being used by the customer 702 associated with the key. Although not illustrated in FIG. 7, in the event that the session request 708 is not valid (i.e., that one or more of the operations to validate 710 the session request may yield a result indicating the request is not valid), an error may be generated and/or one or more notifications may be sent to the customer, an administrator, or some other such entity.

If the session request 708 is valid 712, the security service 706 may then process 714 the request. The security service 706 may first process 714 the request by obtaining a session key pair 716 and a session encryption key 720. The session key pair 716 may be any cryptographic key, certificate, or credential with a public entity (e.g., a public key) and a private entity (e.g., a private key). The session key pair 716 may be generated by the security service 706 or may be provided by another service of the computing resource service provider 704. In embodiment, the public key portion of the session key pair 716 may be provided by the customer 702 while the private key portion of the session key pair 716 may be maintained as a secret by the customer 702. The session encryption key 720 may also be any cryptographic key, certificate, or credential and may be generated by the security service 706 or may be provided by another service by the computing resource service provider 704. In an embodiment, the session key pair 716 and/or the session encryption key 720 are generated by dedicated hardware and/or software within the computing resource service provider 704 environment configured to generate such keys.

The security service 706 may then store 718 the public session key of the session key pair 716 in a set of session data 724 and may encrypt 722 the session data 724 using the session encryption key 720 to generate 722 a session token 726. The security service 706 may then provide 730 the session token 726 to the customer 702. In the example illustrated in FIG. 7, because the session token 726 is encrypted using the session encryption key 720, the customer cannot access the session data 724 and may not otherwise alter the session data 724, including the public session key of the session key pair 716 stored in the session data 724. Additionally, the security service 706 may provide 728 the private session key of the session key pair 716 to the customer 702 so that the customer 702 can use the private session key of the session key pair 716 to digitally sign messages and/or requests that are combined with the session token 726 as described herein. In an embodiment where the customer provides the public session key to the security service and maintains the private session key as a secret, the security service does not provide 728 the private session key of the session key pair 716 to the customer 702. The examples described below illustrate how the short-term credentials in the session token 726 are combined with the digital signature of the private session key of the session key pair 716 to verify requests and/or authenticate messages.

Figure 8:
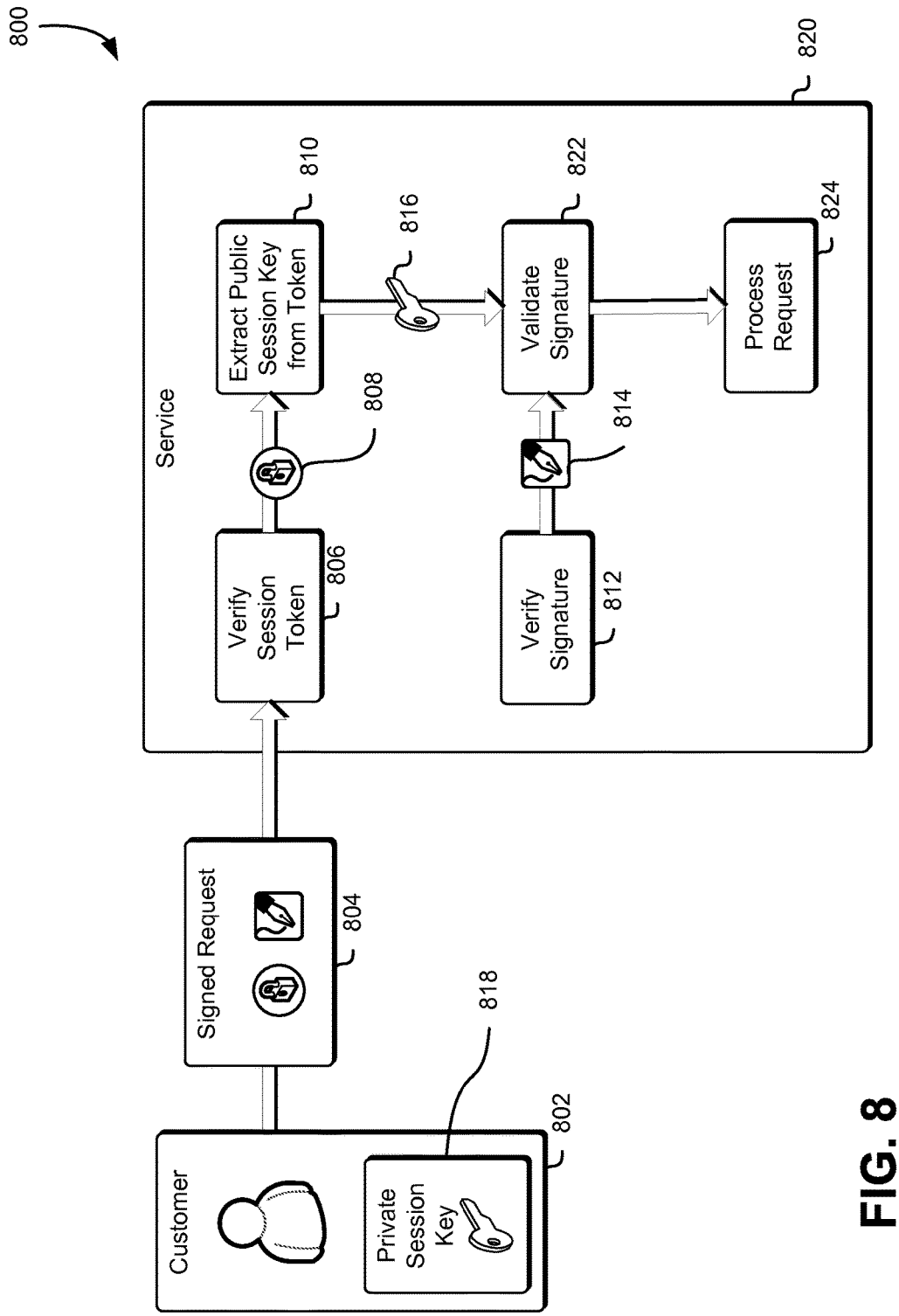
FIG. 8 illustrates an environment where requests are validated using session credentials with asymmetric keys.

FIG. 8 illustrates an environment 800 where requests are validated using session credentials with asymmetric keys using session credentials as described in connection with FIG. 1 and in accordance with an embodiment. A customer 802 may use the session token described above to generate a signed request 804. The signed request 804, which includes the session token, is signed by the private session key 818. The signed request is illustrated herein with a "lock" symbol in a circle, which represents the session token and the "pen and line" symbol in the square, which represents the digital signature.

The signed request 804 may be received by a security service 820, which may be the same as the security service 106 described in connection with FIG. 1. The security service 820 may first verify the session token 806 by extracting the public session key 810 from the session token 808 that is included in the signed request 804. The security service 820 may extract the public session key 810 from the session token 808 to produce an extracted public key by, for example, decrypting the session token using the session encryption key or a session decryption key corresponding to the session encryption key. The session encryption key, which may be the same as the session encryption key 120 described in connection with FIG. 1, may be maintained as a secret by the security service 820 using one or more of the methods described herein.

The security service 820 may then verify 812 the signature 814 of the signed request 804 by using the extracted public session key 816 obtained by extracting the public session key 810 from the session token 808 that is included in the signed request 804. The security service 820 may validate the signature 822 of the signed request by, for example, using the extracted public session key 816 to perform a cryptographic operation to validate the digital signature generated by the private session key 818. If the security service 820 is able to verify the session token 806 and is able to verify 812 the signature 814, the security service may process the request 824 by, for example, providing resources associated with the request and/or forwarding the request to another service of the computing resource service provider.

In an embodiment, the operations to verify the session token 806 and to verify 812 the signature 814 before processing the request 824 (or authorizing the message) are performed by the security service 820 prior to sending the request or the message to a different service of the computing resource service provider. In another embodiment, the operations to verify the session token 806 and to verify 812 the signature 814 are performed by the security service 820 after the different service of the computing resource service provider has received the request or the message. That is, the different service of the computing resource service provider receives the request or message and forwards the request or message to the security service 820 for verification of the session token and signature. In another embodiment, the different service may be configured to verify the session token 806 and/or to verify 812 the signature 814 by, for example, obtaining the session encryption key from the security service.

Figure 9:
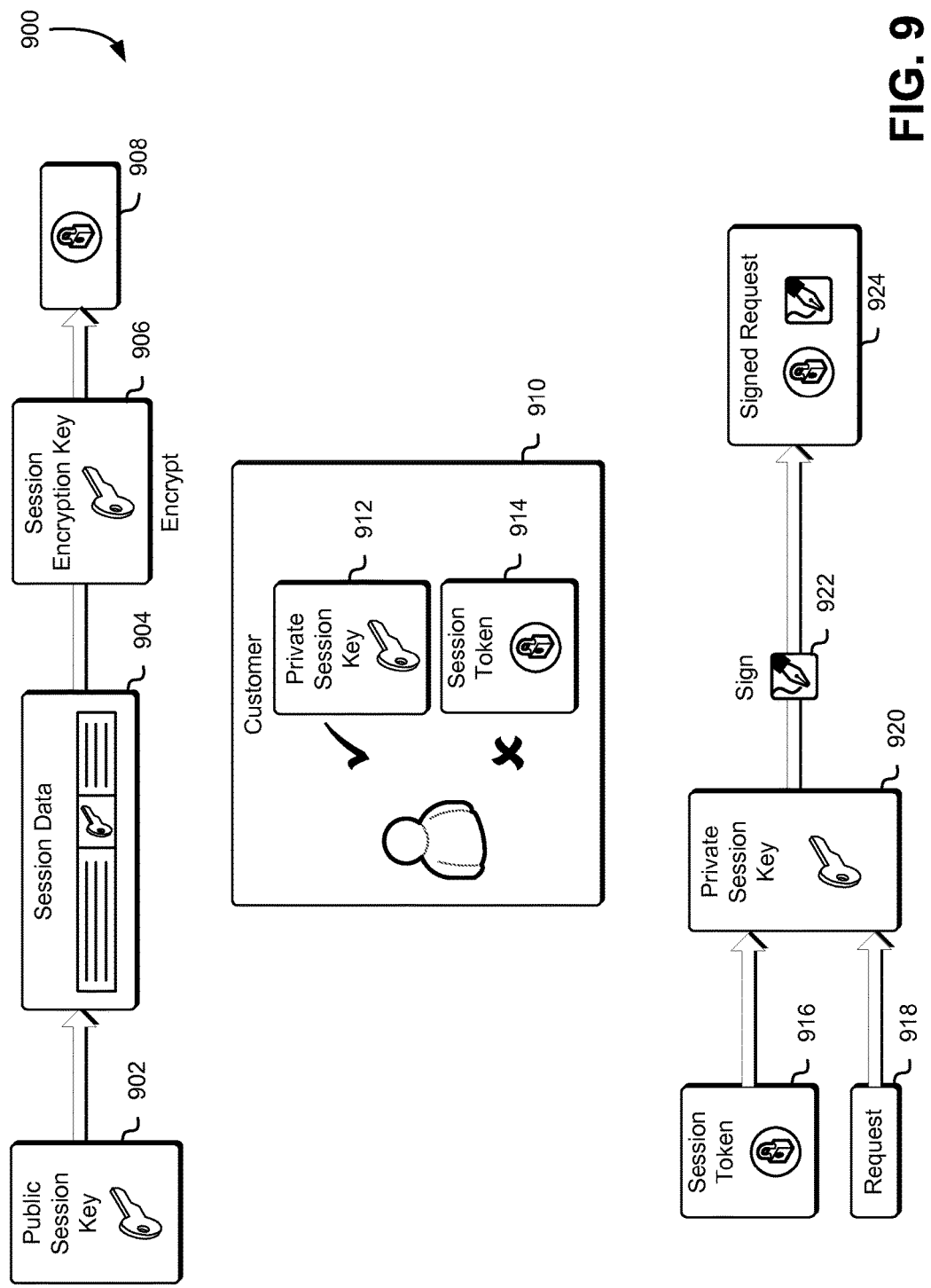
FIG. 9 illustrates a diagram showing encryption operations associated with using session credentials with asymmetric keys.

FIG. 9 illustrates a diagram 900 showing encryption operations associated with using session credentials with asymmetric keys using session credentials as described in connection with FIG. 1 and in accordance with an embodiment. The first part of the diagram 900 illustrated in FIG. 9 shows how a public session key and a session encryption key are used to produce the session token as described above. The operations illustrated in the first part of the diagram 900 may be performed by a security service such as the security service 106 described in connection with FIG. 1 The public session key 902 is added to the unencrypted session data 904. The session data 904 may be encrypted using the session encryption key 906 as described herein to produce the session token 908. As described above, although not illustrated in the first part of the diagram 900, the session encryption key may also be preserved as a secret within the security service, stored in a session encryption keychain, or otherwise maintained for later use in the verification operations. It should be noted that the public session key 902 and the session encryption key 906 are different keys. The public session key 902 is stored in the session data 904 and is accessible by the customer. The session encryption key 906 is used to encrypt the session data 904 to produce the session token 908 and is maintained as a secret (i.e., is not accessible by the customer).

The second part of the diagram 900 illustrated in FIG. 9 shows how some parts of the data sent to the customer 910 in response to the request for the session token are accessible to the customer 910, while some parts of the data sent to the customer 910 in response to the request for the session token are not accessible to the customer 910. In the example illustrated in the second part of the diagram 900 illustrated in FIG. 9, the session token 914 is not accessible to the customer 910 as illustrated by the "x-shaped mark" next to the session token 914. The session token 914 may be usable by the customer 910 to generate signed requests as described above, but the customer 910 may not be able to extract the session data 904 from the session token because the customer 910 may not have access to the session encryption key 906 (or a corresponding session decryption key).

Conversely, in the example illustrated in the second part of the diagram 900 illustrated in FIG. 9, the private session key 912 is accessible to the customer 910 as illustrated by the "check mark" next to the private session key 912. As described above, the private session key may be provided by the customer in some embodiments. The private session key 912 may be usable by the customer 910 to digitally sign requests for resources as described above and/or to digitally sign messages also as described above.

The third part of the diagram 900 illustrated in FIG. 9 shows how the signed request is generated using the session token and signed with the private session key. In the example illustrated in the third part of the diagram 900 illustrated in FIG. 9, the session token 916 is combined with a request 918, and digitally signed 922 using the private session key 920. The process to digitally sign the request using the private session key 920 may include encrypting the request 918 using the private session key 920 based on the signing algorithm associated with the digital signature scheme. The process to digitally sign a message using the private session key 920 may also include encrypting the message using the private session key 920 based on the signing algorithm associated with the digital signature scheme. In an embodiment, the signing algorithm used to sign messages is different than the signing algorithm used to sign requests such as the request 918.

Figure 10:
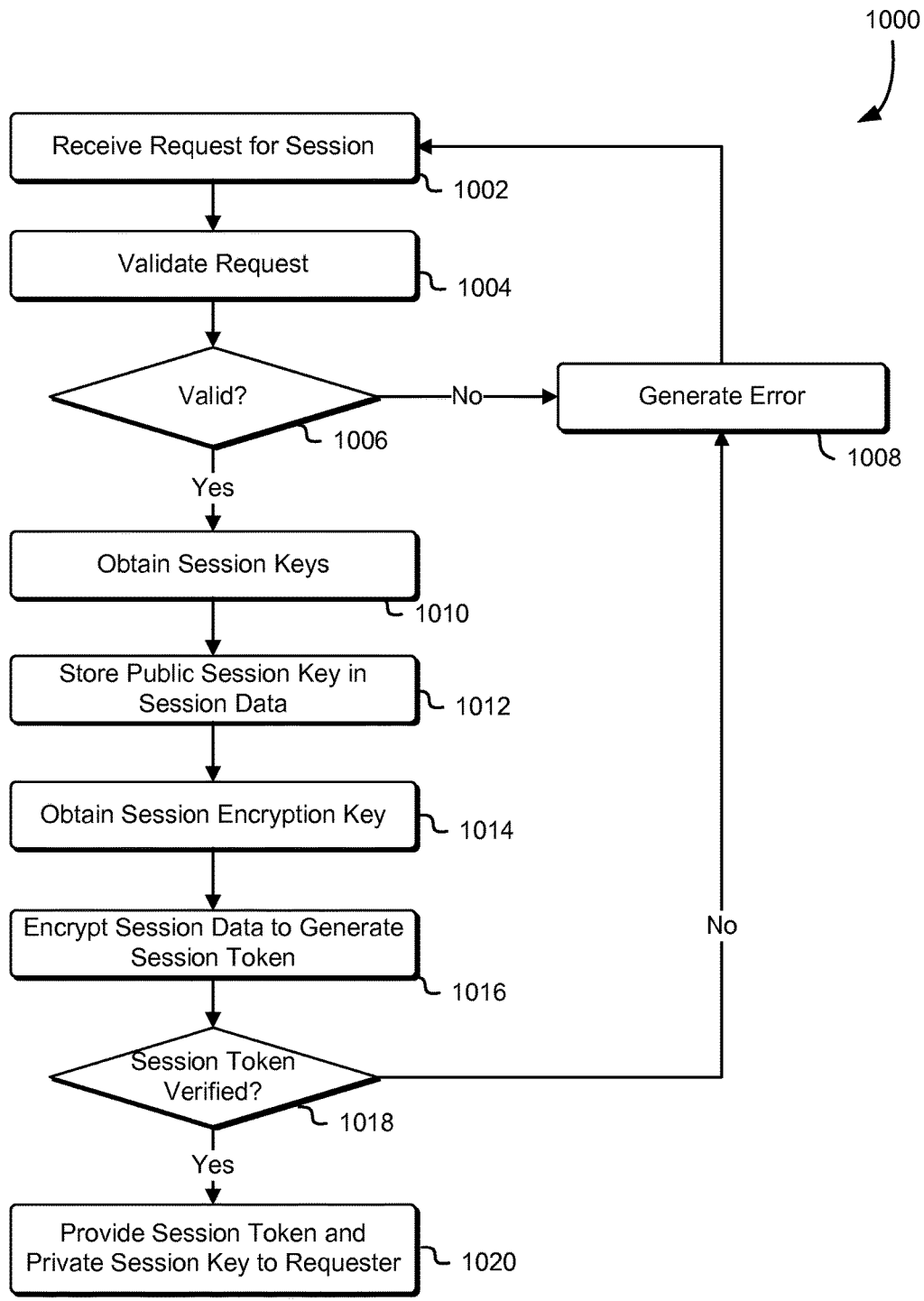
FIG. 10 illustrates a process for validating requests using session credentials with asymmetric keys.

FIG. 10 illustrates a process 1000 for validating requests using session credentials with asymmetric keys using session credentials as described in connection with FIG. 1 and in accordance with an embodiment. A security service such as the security service 106 described in connection with FIG. 1 may perform the process illustrated in FIG. 10. The security service may first receive a request for a session 1002 (also referred to herein as receiving a request for a "session token"). In an embodiment, the request for a session token is signed with a digital signature using a credential associated with the requester such as, for example, the customer long-term key described above. In such an embodiment, the request may first be validated 1004 by verifying the credential to ensure that the request for the session was properly generated, that it was generated by the customer, and/or that it was not tampered with during transmission.

A request that is not valid 1006 may cause the security service to generate an error 1008 in response to the invalid request as described above. If the request for a session token is valid because, for example, the credentials associated with the request are verified, the security service may then obtain 1010 a pair of session keys for the session. In an embodiment, the pair of session keys is obtained by generating the session keys using a key generation algorithm associated with the encryption scheme for the session keys. In such an embodiment, the private session key may be generated first and the public session key generated based at least in part on the private session key. In another embodiment, the session keys are obtained by selecting one or both of the session keys from a plurality of pre-generated session keys. In another embodiment, the private and/or the public session keys are received from the requester (e.g., the customer) associated with the request for the session token. In such an embodiment, the session keys may be included with the request for the session token or the session keys may be received by the security service in response to a request sent to the customer.

After obtaining the session keys, the security service may then store 1012 the public session key in the session data as described above. The security service may then obtain 1014 a session encryption key usable to encrypt the session data to produce the session token. In an embodiment, the session encryption key is obtained by generating the session encryption key using a key generation algorithm associated with the encryption scheme for the session encryption keys. In such an embodiment, the encryption scheme for the session encryption keys may be different from the encryption scheme for the session keys. In another embodiment, the session encryption key is obtained by selecting the session encryption key from a plurality of pre-generated session encryption keys. In another embodiment, the session encryption key is generated from a combination of personal and global keys as described below.

After obtaining the session encryption key, the security service may then use the session encryption key to encrypt 1016 the session data to generate the session token as described above. The security service may also verify 1018 the session token by performing one or more cryptographic operations on the session token (e.g., the security service may use the session encryption key and/or a corresponding key to decrypt the session token and compare the results to the session data). If the security service is not able to verify 1018 the session token, the security service may generate 1008 an error as described above. If the security service is able to verify 1018 the session token, the security service may provide 1020 the session token and the private session key to the requester. In an embodiment where the requester has provided the private session key, the security service may provide 1020 only the session token to the requester.

Figure 11:
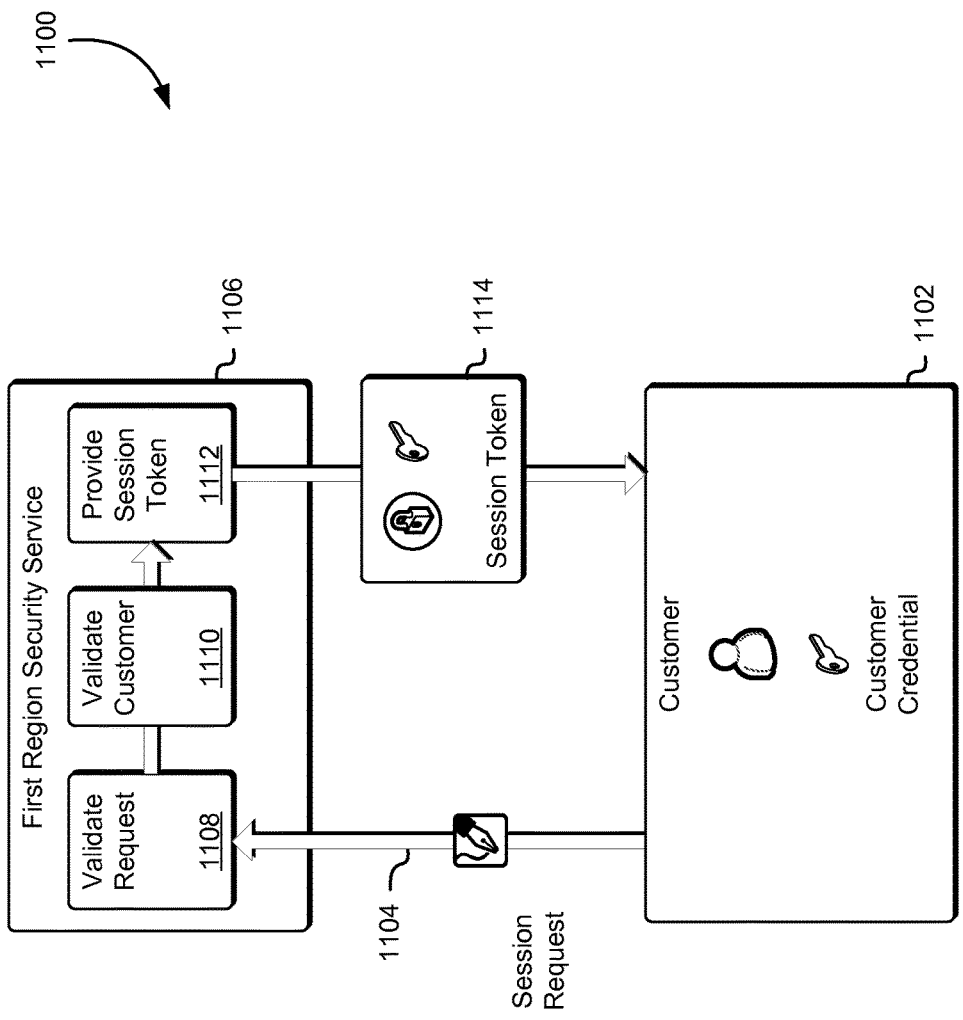
FIG. 11 illustrates an environment where a session associated with a region is retrieved using session credentials.

FIG. 11 illustrates an example environment 1100 where a session associated with a region is retrieved using session credentials as described in connection with FIG. 1 and in accordance with an embodiment. As used herein, a "region" is a logical and/or physical partitioning of the resources provided by a computing resource service provider. As described above, a computing resource service provider may host a variety of services and provide a variety of resources in multiple locations. Each of these locations may include one or more regions (also referred to herein as "zones"), which are logical and/or physical partitions of the services and/or resources. For example, a first datacenter in a first location (a physical or geographical location) may encompass a single region, which may be identified by that datacenter and/or that location. Conversely, a second datacenter in a second location may encompass multiple logical regions. Additionally, a region may include multiple physical locations such as, for example, a region identified by a collection of datacenters in one or more countries (e.g., "Western Europe").

Regions provide additional data security for customers by limiting access to resources to users or accounts within that region. For example, a customer may have multiple customer accounts and may have data and/or resources located in multiple regions. Such a customer may have a default policy that limits access to the resources in a first region to accounts that are authorized in that first region and that limits access to the resources in a second region to accounts that are authorized in that second region. Thus, a first region user account would not have access to second region resources and a second region user account would not have access to first region resources.

In the example illustrated in FIG. 11, a customer 1102 uses a customer credential (e.g., a long-term key) to sign a session request 1104 as described above. The customer 1102 may issue a request from an account authorized in the first region (referred to herein as a "first region account") to a first region security service 1106 (i.e., a security service in that first region) that has authorization credentials usable to validate the account in the first region. It should be noted that an account that is not authorized in a particular region (e.g., the first region) may not generally be used to access services and/or resources in that region because there is no method to validate the customer credentials in that first region in order to determine whether the account is authorized to access those services and/or resources. Services generally have a policy to deny unknown users and, when accounts are regional, those accounts are unknown in regions where they are not authorized. It should also be noted that an account may be authorized in multiple regions by propagating authorization credentials usable to authorize the account to those multiple regions.

The first region security service 1106 may validate 1108 the session request 1104 by validating the digital signature of the session request as described above. The first region security service 1106 may also validate 1110 that the customer 1102 is authorized for the first region, also as described above. In an embodiment, when the security service validates the session request by validating the digital signature of the session request, that serves to validate 1110 that the customer 1102 is authorized for the first region. In an embodiment, the first region security service 1106 validates the customer before validating the session request. In another embodiment, the first region security service 1106 validates the session request before validating the customer.

After the request and/or the customer is validated, the first region security service 1106 may provide 1112 a session token 1114 to the customer as described above and may also, in some embodiments, provide the session key used for signing requests and messages. The session token 1114 may be usable only in the first region or may be usable in multiple regions. The region or regions where the session token is usable may be included in the session data that is encrypted to produce the session token. The region or regions where the session token is usable may also be stored in a policy and permission service so that, for example, the service records a session identifier and associates a list of allowable regions where the session token may be used with that session identifier.

The region or regions where the session token is usable may also be determined by where the session encryption key (i.e., the key used to encrypt the session token) or a corresponding session decryption key (i.e., the key corresponding to the key used to encrypt the session token that may be used to decrypt the session token) may be propagated. That is, if the session encryption key or the session decryption key is propagated only to the first region, then the session token may generally only be usable in that first region.

Figure 12:
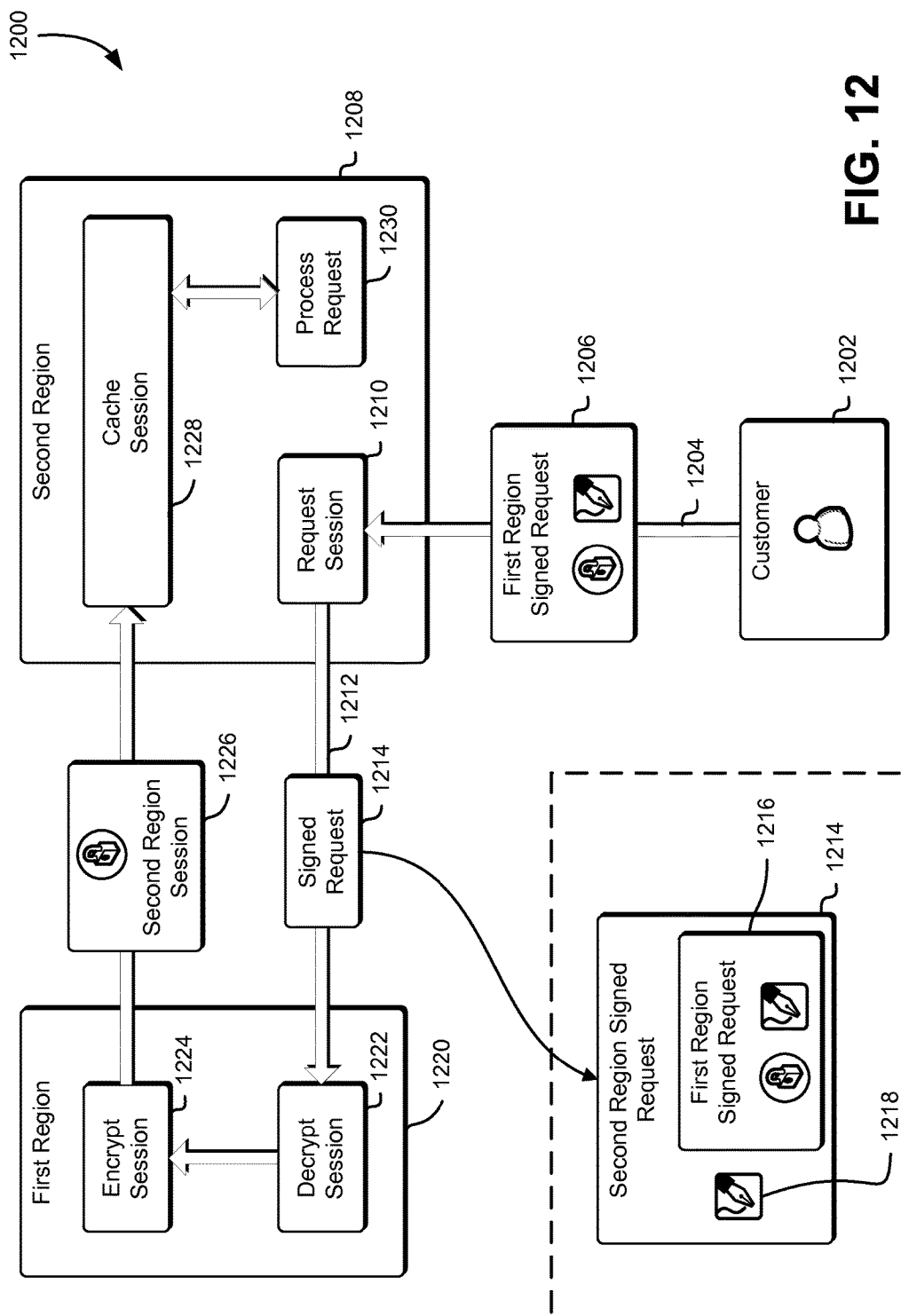
FIG. 12 illustrates an environment where a retrieved session is used across regions using session credentials.

FIG. 12 illustrates an example environment 1200 where a retrieved session is used across regions using session credentials as described in connection with FIG. 1 and in accordance with an embodiment. A customer 1202 may use a session token such as the session token 1114 described in connection with FIG. 11 to generate 1204 a request. In the example illustrated in FIG. 12, the customer account is authorized in the first region, the customer account is not authorized in the second region, and the session token is generated in first region. The request illustrated in FIG. 12 is denoted as a first region signed request 1206, meaning that the request is generated in the first region, signed with first region credentials (in this case, the first region session key provided by the security service) and includes a session token usable in the first region.

In the second region 1208, a service such as the security service 106 described in connection with FIG. 1 may determine that the signature and/or the session token is not usable in the second region 1208 and that the signature and/or the session token is associated with a first region 1220. The service may then request 1210 that the first region 1220 provide a session usable in the second region. The customer account associated with the customer 1202 and used to generate 1204 the request may be authorized in the second region 1208. In an embodiment, the service in the second region 1208 will validate the customer prior to generating the request 1210 to the first region 1220 to provide a session usable in the second region. In another embodiment, the service in the second region 1208 will validate the customer after receiving a response to the request 1210 to the first region 1220 to provide a session usable in the second region.

The request 1214 to the first region 1220 to provide a session usable in the second region may be a signed request such as those described herein. The request 1214 may be digitally signed 1218 by a second region credential and may include the first region signed request 1216 which may be the same as the first region signed request 1206. The request 1214 to the first region 1220 to provide a session usable in the second region and that is signed 1218 by a second region credential is denoted as a second region signed request, meaning that the request is digitally signed in the second region. In the example illustrated in FIG. 12, the request 1214 to the first region 1220 to provide a session usable in the second region includes a request that is denoted as a first region signed request 1216, meaning that it is digitally signed with first region credentials (in this case, the first region session key provided by the security service) and includes a session token usable in the first region.

It should be noted that the credentials used to sign the request 1214 to the first region 1220 to provide a session usable in the second region must be verifiable in the first region so that, for example, a first region may validate the request 1214. In an embodiment, the request 1214 to the first region 1220 to provide a session usable in the second region is signed by a private key associated with the second region. In such an embodiment, the service in the second region configured to validate the request 1214 may do so by obtaining a corresponding public key from the second region such as, for example, a key corresponding to the private key used to digitally sign the request 1214.

When the request 1214 to the first region 1220 to provide a session usable in the second region is received at the first region 1220, a service (e.g., a security service) of the first region 1220 may validate the request as described above and then may decrypt 1222 the session token to extract the session data. The service of the first region 1220 may then encrypt 1224 the session data using credentials usable in the second region 1208. In an embodiment, the service of the first region 1220 uses a public key provided by the second region 1208 to encrypt the 1224 the session so that a service in the second region 1208 can use a corresponding private key to decrypt the session and generate a session usable in the second region 1208. After the second region 1208 receives the encrypted second region session token 1226, the second region 1208 may decrypt the encrypted second region session token 1226 and may use the session to process 1230 the request. In an embodiment, the second region 1208 caches 1228 the decrypted second region session token (also referred to herein as a cached session token) so that the session token may be used to process further requests. In another embodiment, the second region 1208 discards the decrypted second region second token after processing the request so that the session token may not be used to process further requests.

Figure 13:
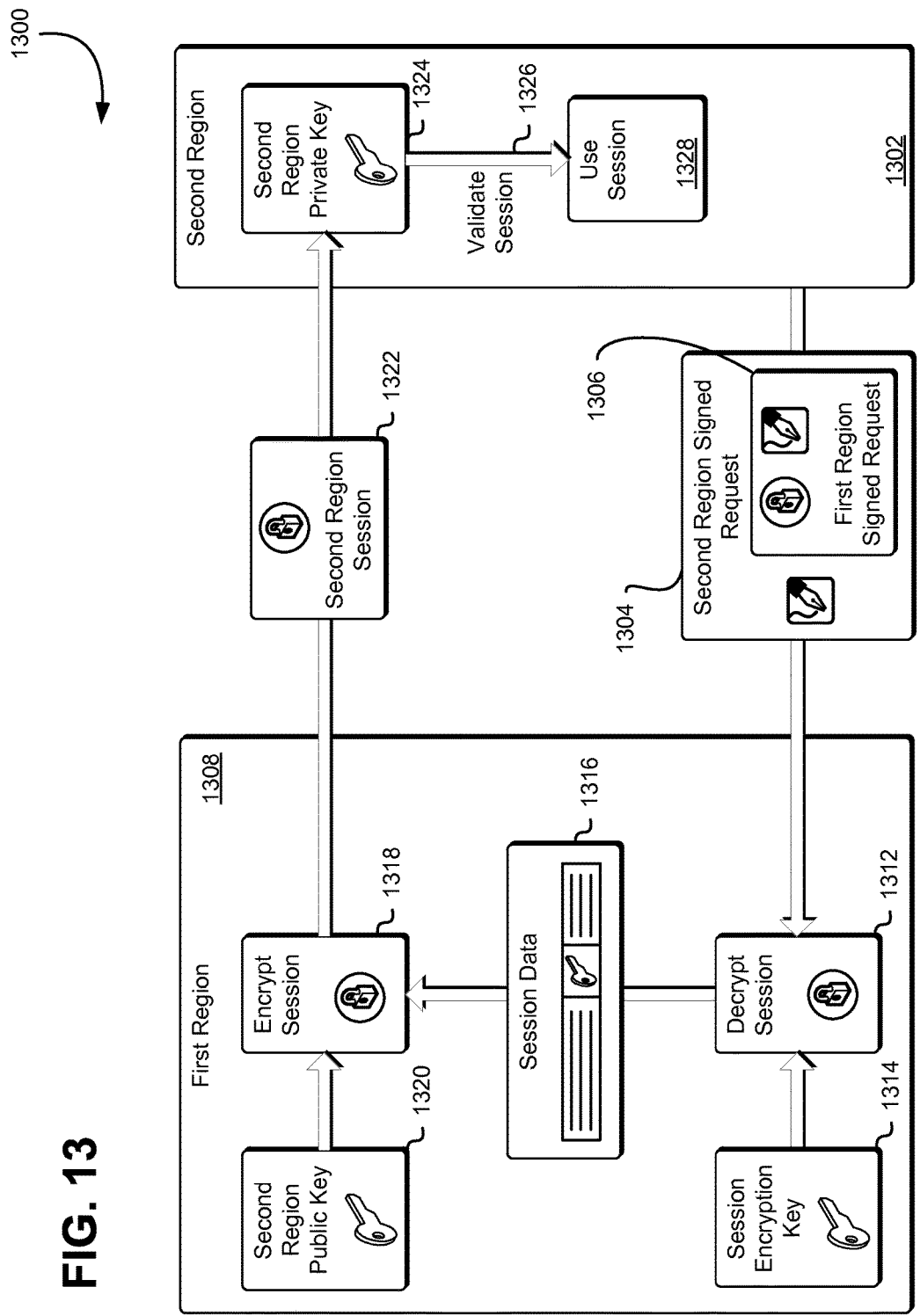
FIG. 13 illustrates an environment where session data is used across regions to generate a cross-region session using session credentials.

FIG. 13 illustrates an example environment 1300 where session data is used across regions to generate a cross-region session using session credentials as described in connection with FIG. 1 and in accordance with an embodiment. A service such as the security service 106 described in connection with FIG. 1 generates a cross-region resource request. A cross-region resource request is a request where a second region signed request 1304 that contains a first region signed request 1306 is used to provide a session usable in the second region from the request generated in the first region as described above. In the example illustrated in FIG. 13, the second region signed request 1304 is a request to the first region 1308 to provide a session usable in the second region 1302 and the first region signed request 1306 is a request for resources or a message to the second region as described above in connection with FIG. 12.

A service of the first region 1308 may first decrypt 1312 the session token using the session encryption key 1314 as described herein. The resulting session data 1316 may then be encrypted 1318 using a session encryption key selected so that the second region 1302 can use the session. In the example illustrated in FIG. 13, the first region 1308 uses a second region public key 1320 that is obtained from the second region 1302 to encrypt the session data 1316. The resulting session includes the session data 1316, but is a second region session 1322 due to being encrypted by the second region public key 1320. When the second region session 1322 is received at the second region 1302, a service of the second region 1302 may then use the second region private key 1324 that corresponds to the second region public key to extract the session data, validate 1326 the session and use 1328 the session to process requests and/or authenticate messages.

Figure 14:
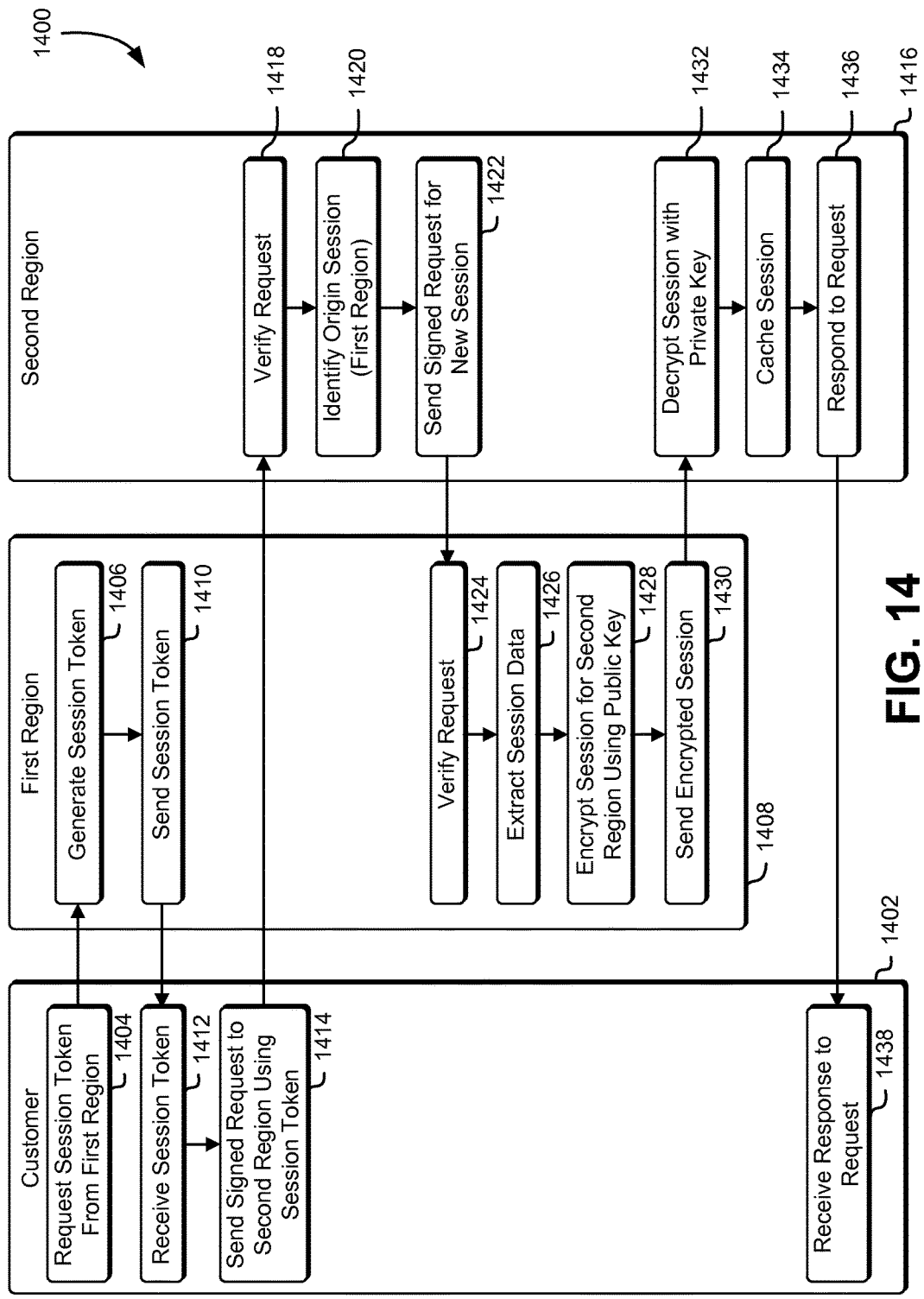
FIG. 14 illustrates a process for generating a cross-region session using session credentials.

FIG. 14 illustrates an example process 1400 for generating a cross-region session using session credentials as described in connection with FIG. 1 and in accordance with an embodiment. One or more security services such as the security service 106 described in connection with FIG. 1 may perform a part of the process described in FIG. 14. A computing device associated with a customer such as the customer 102 described in connection with FIG. 1 may also perform a part of the process described in FIG. 14. The example process 1400 illustrated in FIG. 14 shows the actions of the customer 1402 (e.g., of a device associated with a user account of the customer), the actions of a service (e.g., a security service such as the security service 106 described in connection with FIG. 1) of a first region 1408, and the actions of a service (e.g., a security service such as the security service 106 described in connection with FIG. 1) of a second region 1416 to request, generate, and use a cross-region session such as those described above.

The customer 1402 may first request 1404 a session from the first region 1408 using credentials verifiable in the first region 1408 such as, for example, a long-term session key that is verifiable in the first region 1408. It should be noted that, as used herein, the actions of the customer 1402 to send and/or receive requests and responses from the services may be understood to be sent and/or received from a computing device associated with the user account of the customer. Similarly, the actions ascribed to the first region 1408 and/or the second region 1416 may be understood to be performed by the services associated with the respective regions such as, for example, the security services.

The service in the first region 1408 may receive the request and, after validating the request, may generate 1406 a session token as described above. The service in the first region 1408 may then send 1410 the session token to the customer 1402 also as described above. The customer 1402 may then receive 1412 the session token and may use the session token generated to send 1414 a signed request to the second region 1416 using the session token such as the first region signed request 1206 described in connection with FIG. 12.

The service in the second region 1416 may first verify 1418 the signed request and may then identify 1420 the origin session (e.g., the first region 1408) based at least in part on, for example, a region identifier included in the signed request. The service in the second region 1416 may then send 1422 a signed request for a new session usable in the second region 1416 to the identified first region 1408 as described above. The signed request for a new session usable in the second region 1416 sent from the second region 1416 to the first region 1408 may be a second region signed request such as the second region signed request 1214 described in connection with FIG. 12.

The service in the first region 1408 may then verify 1424 the second region signed request and may extract 1426 the session data using the session encryption key used to generate 1406 the session token or a session decryption key corresponding to the session encryption key used to generate 1406 the session token. Finally, the service in the first region 1408 encrypt 1428 the session data into a session token usable in the second region 1416 using, for example, a public key of the second session as described above and may send 1430 the encrypted session token usable in the second region to the service in the second region 1416.

When the service in the second region 1416 receives the encrypted session token usable in the second region, the service in the second region 1416 may decrypt 1432 the encrypted session token usable in the second region using, for example, a private key corresponding to public key that was used by the service of the first region 1408 to encrypt the encrypted session token usable in the second region. The service of the second region 1416 may then cache 1434 the decrypted session token as a cached session token for later use and may also use the decrypted session token to respond 1436 to the request for resources. The customer 1402 may receive 1438 the response to the request, which may include access to resources, an indication that a message was authenticated, or some other response.

Figure 15:
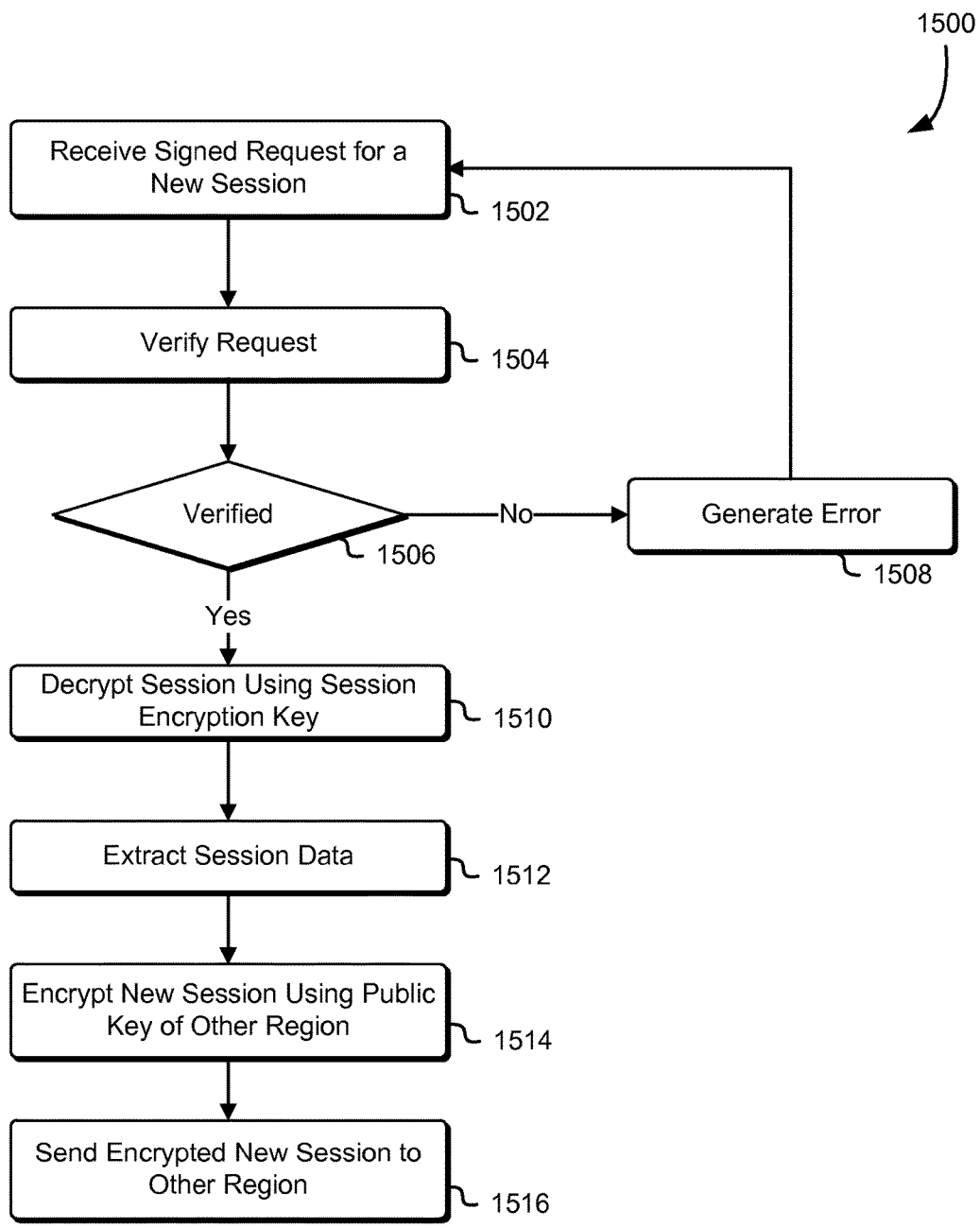
FIG. 15 illustrates a process for extracting session data from a cross-region session using session credentials.

FIG. 15 illustrates an example process 1500 for extracting session data from a cross-region session using session credentials as described in connection with FIG. 1 and in accordance with an embodiment. A security service such as the security service 106 described in connection with FIG. 1 may perform the process described in FIG. 15. A service of a first region may receive 1502 a signed request for a new session from a second region and may verify 1504 the request as described above. If the request is not verified 1506, an error may be generated 1508 such as the error 508 described in connection with FIG. 5.

If the request is verified 1506, the service of the first region may decrypt 1510 the session token using a session encryption key or a key corresponding to the session encryption key and extract 1512 the session data including, but not limited to, a session key of a symmetric session, a public session key of an asymmetric session, a session identifier, a region identifier, or a combination of data items as described herein. The service of the first region may then use credentials provided by the second region (also referred to herein as the "other region") to encrypt 1514 a new session token that is usable in the other region. Finally, the service of the first region may send 1516 the new session token to the other region so that the new session may be used in the other region to provide access to resources in response to resource requests from the customer and/or to authenticate messages from the customer.

Figure 16:
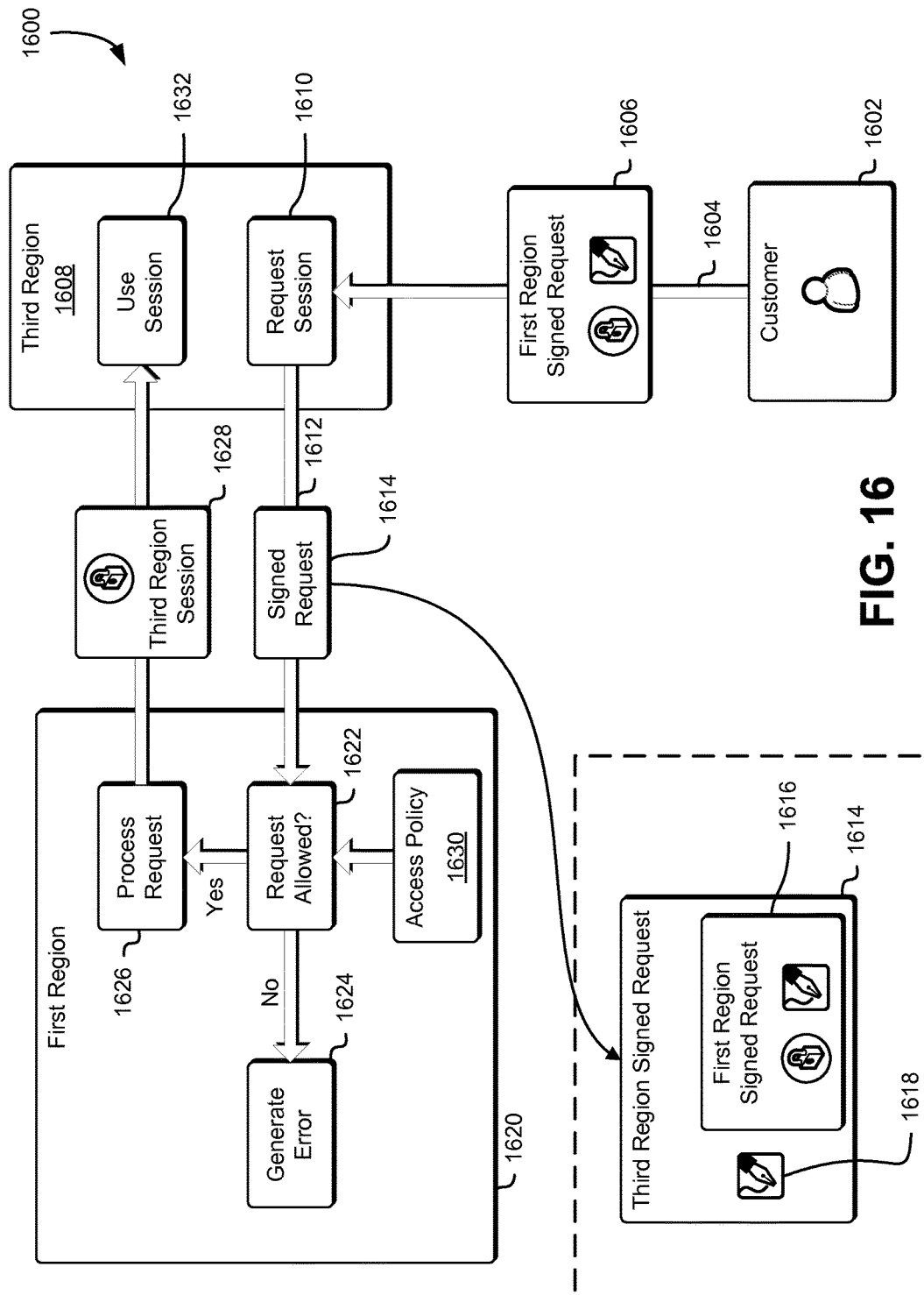
FIG. 16 illustrates an environment where a cross-region session is validated using session credentials.

FIG. 16 illustrates an example environment 1600 where a cross-region session is validated using session credentials as described in connection with FIG. 1 and in accordance with an embodiment. The example illustrated in FIG. 16 follows after the example illustrated in FIG. 11 where a session associated with a region is retrieved using session credentials. In the example illustrated in FIG. 11, a customer uses a customer credential to sign a session request (i.e., a request for a session token). The first region security service may then validate the session request and also validate that the customer is authorized for the first region. After the request and/or the customer is validated, the first region security service may provide a session token to the customer and may also, in some embodiments, provide the session key used for signing requests and messages. The session token described in connection with FIG. 11 may be usable only in the first region or may be usable in multiple regions as described above.

A customer 1602 may use a session token such as the session token 1114 described in connection with FIG. 11 to generate 1604 a request. In the example illustrated in FIG. 16, the customer account is authorized in the first region, the customer account is not authorized in the third region (which may be different than the second region described in connection with FIG. 11), and the session token is generated in first region. The customer account may not be authorized in the third region because, for example, the third region may be an untrusted region (i.e., may be a region that the computing resource service provider, the customer, or both the customer and the computing resource service provider do not wish to have data and or credentials stored or accessed therein). The request illustrated in FIG. 16 is denoted as a first region signed request 1606, meaning that the request is generated in the first region, signed with first region credentials (in this case, the first region session key provided by the security service) and includes a session token usable in the first region.

In the third region 1608, a service such as the security service 106 described in connection with FIG. 1 may determine that the signature and/or the session token is not usable in the third region 1608 and that the signature and/or the session token is associated with a first region 1620 as described above. The service may then request 1610 that the first region 1620 provide a session usable in the third region 1608. The request 1614 may be digitally signed 1618 by a third region credential as described above. The request 1614 to the first region 1620 to provide a session usable in the third region and that is signed 1618 by a third region credential is denoted as a third region signed request, meaning that the request is digitally signed in the third region. In the example illustrated in FIG. 16, the request 1614 to the first region 1620 to provide a session usable in the third region includes a request that is denoted as a first region signed request 1616, meaning that it is digitally signed with first region credentials (in this case, the first region session key provided by the security service) and includes a session token usable in the first region.

When the request 1614 to the first region 1620 to provide a session usable in the third region is received at the first region 1620, a service (e.g., a security service) of the first region 1620 may first determine whether the request is allowed 1622 based on an access policy 1630 associated with the first region 1620. For example, if the account associated with the customer 1602 is not authorized to operate in the third region 1608, the request may not be allowed 1622. In another example, if the third region is an untrusted region (i.e., the third region is not trusted by the computing resource service provider or by the customer 1602), the request may not be allowed 1622. In a third example, if the request is a request for resources and the resources are not available in the third region 1608, the request may not be allowed 1622. As may be contemplated, the reasons why a request may not be allowed that are described herein are illustrated examples and other such reasons why a request may not be allowed may be considered as within the scope of the present disclosure.

If the request is not allowed 1622, the service associated with the first region 1620 may generate 1624 an error as described above. Conversely, if the request is allowed 1622, the service of the first region may process 1626 the request by, for example, validating the request, decrypting the session token to extract the session data, and encrypting the session data using credentials usable in the third region 1608 as described above at least in connection with FIG. 12. After the third region 1608 receives the encrypted third region session token 1628, the third region 1608 may decrypt the encrypted third region session token and may use 1632 the session to process requests and/or to authenticate messages.

Figure 17:
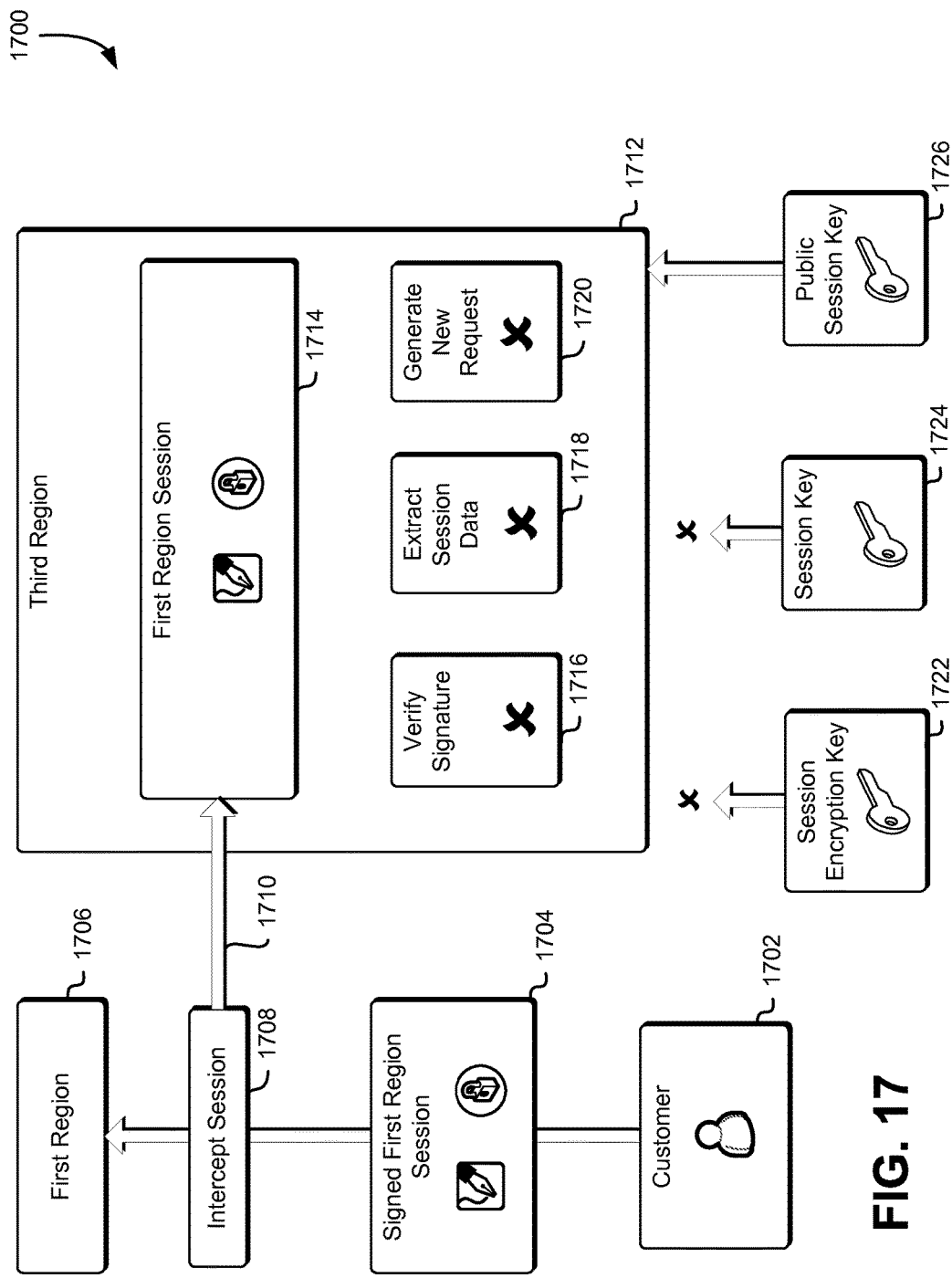
FIG. 17 illustrates an environment where a service intercepts a session using session credentials.

FIG. 17 illustrates an example environment 1700 where a service intercepts a session using session credentials as described in connection with FIG. 1 and in accordance with an embodiment. A customer 1702 uses a signed first region session 1704 to connect to a first region 1706 and, during transmission of the request, the session is intercepted 1708 and sent 1710 to a third region 1712. In the example illustrated in FIG. 17, a service in the third region 1712 (e.g., a security service such as the security service 106 described in connection with FIG. 1), may have the first region session 1714, but may not able to perform any operations associated with that session.

For example, the third region may not be able to perform operations to verify the signature 1716 of the first region session 1714 because the third region 1712 may not have access to the necessary credentials. As described above, the session key used to sign the first region session 1714 may be, for example, a symmetric key or an asymmetric key. If the session key used to sign the first region session is a symmetric key, the service in the third region 1712 may not have access to the verifying key (e.g., the session key 1724) because that key is stored in the encrypted session token and the encrypted session token cannot be decrypted without the session encryption key 1722 or a decryption key corresponding to the session encryption key 1722. Unless the service in the third region 1712 can obtain the session encryption key 1722 or a decryption key corresponding to the session encryption key 1722 as described above, the service in the third region 1712 cannot verify the symmetric session key.

It should be noted that, if the session key used to sign the first region session is an asymmetric key, the service in the third region 1712 may be able to obtain access to the verifying key if that verifying key is, for example, a public key 1726 corresponding to the private key used to sign the first region session. However, the service in the third region 1712 may still not be able to extract the session data 1718 and/or use that session data to generate a new request 1720 without access to the session encryption key 1722 or a decryption key corresponding to the session encryption key 1722. Again, unless the service in the third region 1712 is able to obtain the session encryption key 1722 or a decryption key corresponding to the session encryption key 1722 as described above, the service in the third region 1712 may not extract the session data 1718 from the encrypted session token and also may not generate a new request 1720 to, for example, masquerade as a service in the first region 1706.

In the example illustrated in FIG. 17, the session is intercepted 1708 during transmission of the request by, for example, a malicious actor. However, the operations illustrated in the third region 1712 that cannot be performed because of lack of access to the first region session credentials (e.g., the session encryption key 1722 and/or the session key 1724) may also be not performable if the signed first region session 1704 was deliberately sent to the third region (e.g., in a request for resources), or if the account associated with the customer 1702 is not authorized in the third region 1712, or for some other reason.

Figure 18:
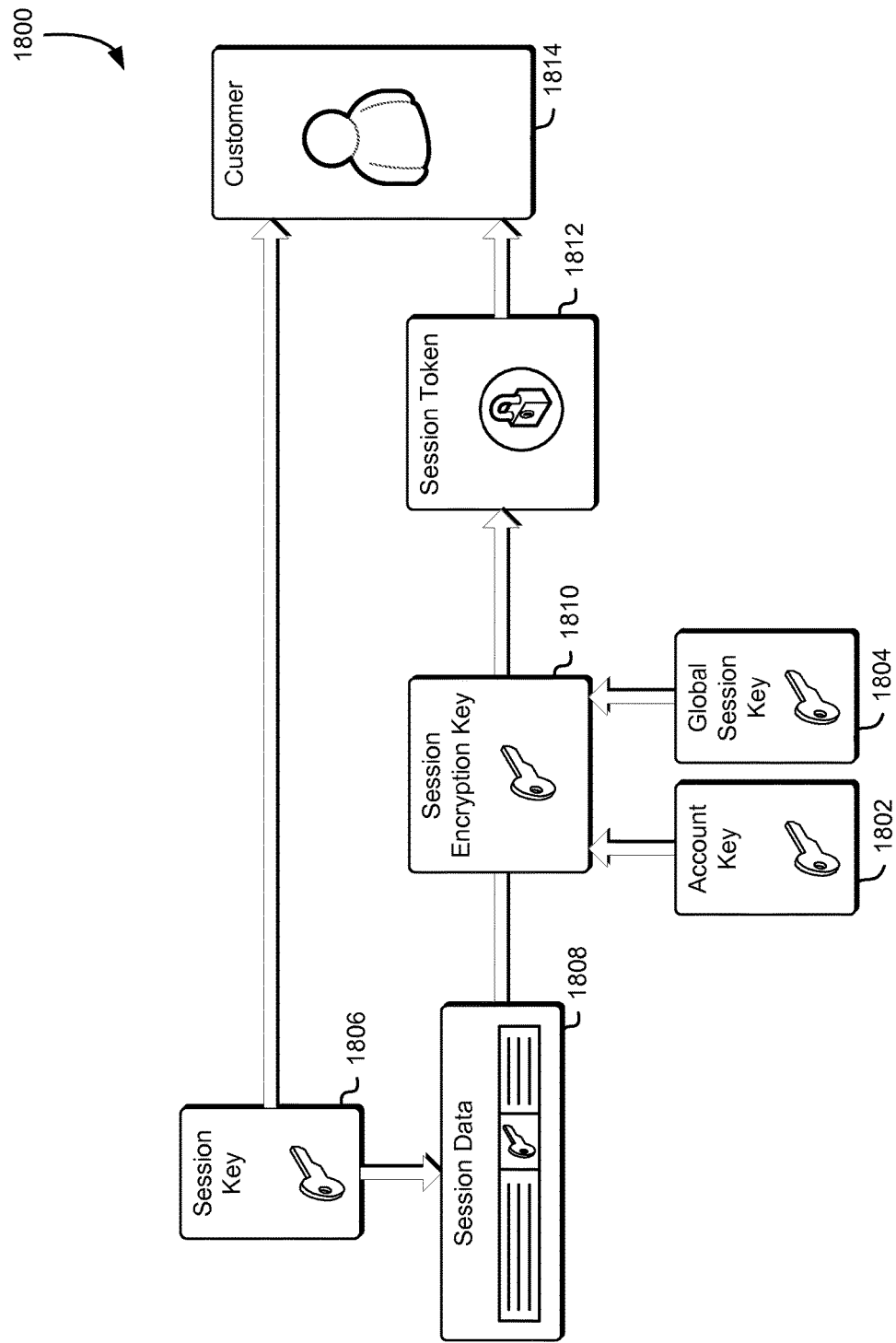
FIG. 18 illustrates an environment where an account key and a global key are used to generate a session key for use in generating session credentials.

FIG. 18 illustrates an example environment 1800 where an account key and a global key are used to generate a session key for use in generating session credentials as described in connection with FIG. 1 and in accordance with an embodiment. As described above, a session encryption key is used to encrypt the session data 1808 that contains the session key 1806, which may be a symmetric session key or a public key of an asymmetric session key pair. The resulting session token 1812 and, in some embodiments, the session key 1806 are sent to the customer 1814 so that the customer 1814 can use the session token 1812 and the session key 1806 to generate signed requests for resources and/or to authenticate messages.

In the example illustrated in FIG. 18, the session encryption key 1810 used to encrypt the session data 1808 to produce the session token 1812 is generated from two different keys. The first key is an account key 1802, which is a credential associated with the customer 1814 or a user account associated with the customer 1814. The account key 1802 may be a key uniquely associated with the customer 1814 and/or the user account associated with the customer 1814 so that, for example, each customer and/or each user account has a key only used for that customer or that user account. In an embodiment, a single account key is assigned to each customer so that each customer has one unique account key (i.e., no two customers have the same account key). In another embodiment, a single account key is assigned to each user account so that each user account has one unique account key (i.e., no two user accounts have the same account key). In another embodiment, each customer has multiple account keys that are not shared with any other account key. For example, a customer may have multiple roles, users, identities, or accounts associated with the customer. In such an example, the customer may assign account keys according to policies or procedures associated with those roles, users, identities, or accounts. In yet another embodiment, each user account has multiple account keys that are not shared with other user accounts. An account key may be generated by a service such as the security service 106 described in connection with FIG. 1, and may be maintained as secrets by that service so that, for example, they are uniquely associated with a user account but never communicated to a user associated with that account.

The second key used to generate the session encryption key is a global session key 1804 which may be maintained as a secret by the security service as described above. It should be noted that a global session key should not be construed as meaning a key corresponding to a session key such as the session key 116 described in connection with FIG. 1. A global session key is used to generate, and is only related to, a session encryption key such as the session encryption key 120 described in connection with FIG. 1.

The global session key 1804 may be shared by a plurality of regions such as those described above. For example, in a computing resource service provider environment where there are four regions as described above, the global session key 1804 may be shared with each of the four regions and used by a security service in each of the four regions to generate session encryption keys as described herein. It should be noted that, although the examples illustrated and described herein show the generation of the session encryption key 1810 from the account key 1802 and the global session key 1804, this is not to imply that a session encryption key 1810 must be generated as a separate operation from the operation of encrypting the session data 1808 to produce the session token 1812. For example, the session data 1808 can, in some embodiments, be encrypted using the account key 1802 and the global session key 1804 to produce the session token 1812 without the intermediary step of generating the session encryption key 1810.

Figure 19:
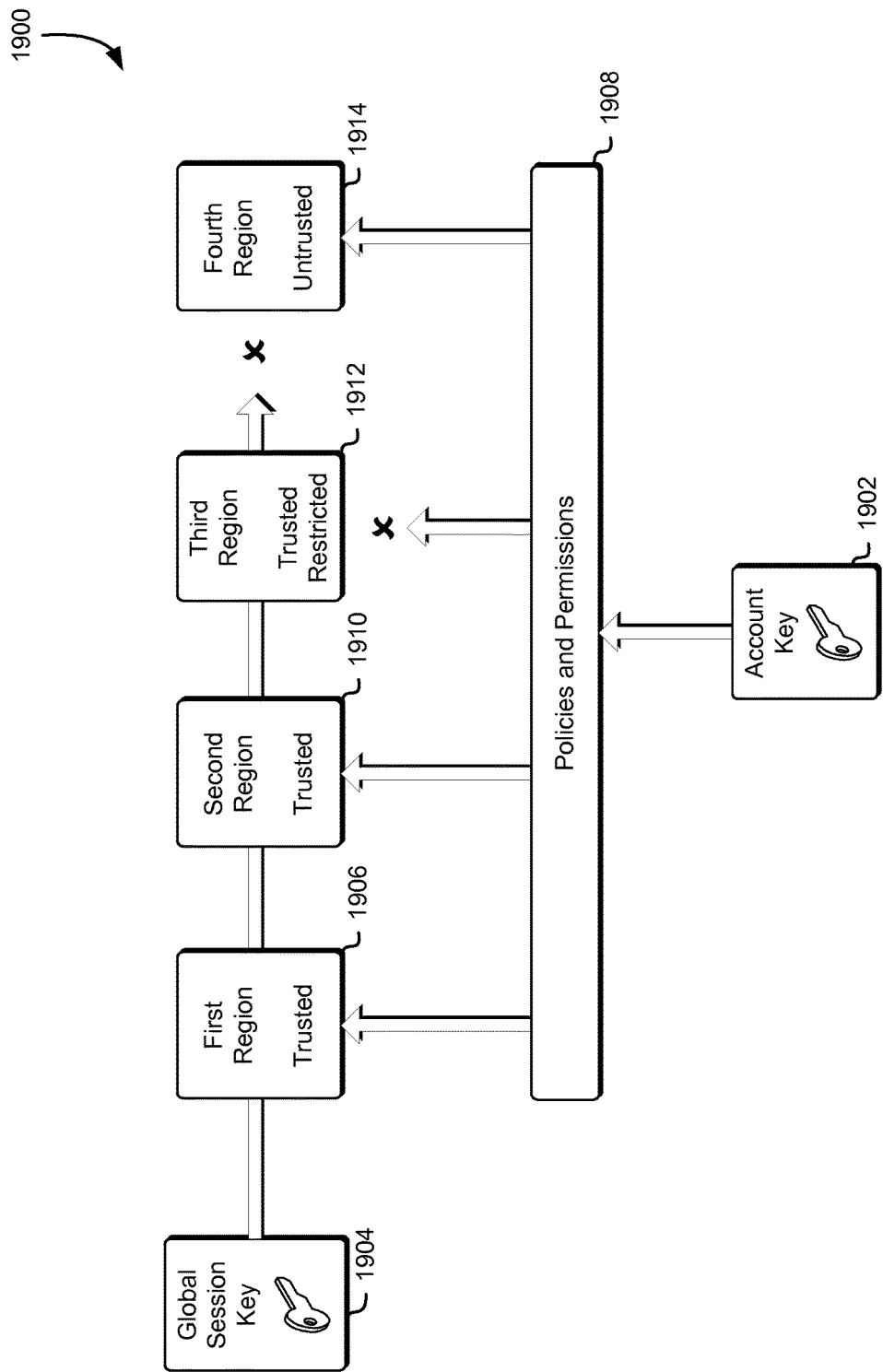
FIG. 19 illustrates an environment where an account key is distributed to different regions for use in isolating regions using session credentials.

FIG. 19 illustrates an example environment 1900 where an account key is distributed to different regions for use in isolating regions using session credentials as described in connection with FIG. 1 and in accordance with an embodiment. In the example illustrated in FIG. 19, a global session key 1904 is propagated (i.e., made available to) a first region 1906, a second region 1910, and a third region 1912. The first region 1906, the second region 1910, and the third region 1912 are regions that are trusted by the computing resource service provider. As used herein, a region that is "trusted" by the computing resource service provider is a region where, for example, proper security protocols have been implemented. A region may be "untrusted" if, for example, it has become compromised or it has not implemented the proper safety protocols, or it is outside of the computing resource service provider environment (e.g., if it is a third party region). In the example illustrated in FIG. 19, there is a fourth region 1914 that is untrusted (also referred to herein as "not trusted") and the global session key has not been propagated to this fourth region 1914 so that the fourth region 1914 may not be able to encrypt session data to produce session tokens as described herein.

In the example illustrated in FIG. 19, the global session key 1904 is shown as a single global session key that is propagated to the first region 1906, the second region 1910, and the third region 1912 and that is not propagated to the fourth region 1914. In an embodiment, each region has a different global session key (also referred to herein as a "regional session key"). In another embodiment, each region has a regional session key in addition to the global session key 1904. In another embodiment, the global session key 1904 is one of a plurality of global session keys maintained in, for example, a session encryption keychain as described herein.

In the example illustrated in FIG. 19, an account key 1902 is propagated to the first region 1906, the second region 1910, and the fourth region 1914 according to a set of policies and permissions 1908. The first region 1906 and the second region 1910 are regions that are trusted by the customer and thus are regions that, by the policies and permissions 1908, are regions where the customer or a user account associated with the customer may request a session token. Conversely, the third region 1912 is a region that, while trusted by the computing resource service provider, is not trusted by the customer. For example, the customer may have resources in the third region that should not be made available to a first region only user account as described herein. The policies and permissions 1908 associated with the user account may, in this example, be configured to prevent the user account from being able to generate a session token in the third region and, therefore, the third region may be untrusted by the customer for this account (also referred to herein as "restricted").

In the example illustrated in FIG. 19, the account key 1902 is shown as being propagated to the fourth region 1914 because, even though the fourth region 1914 may be untrusted by the computing resource service provider, the fourth region 1914 may be trusted by the customer. It should be noted that the account key being present in the fourth region 1914 may still preclude session tokens being generated in the fourth region due to the fact that the global session key 1904 is not present in the fourth region 1914.

Figure 20:
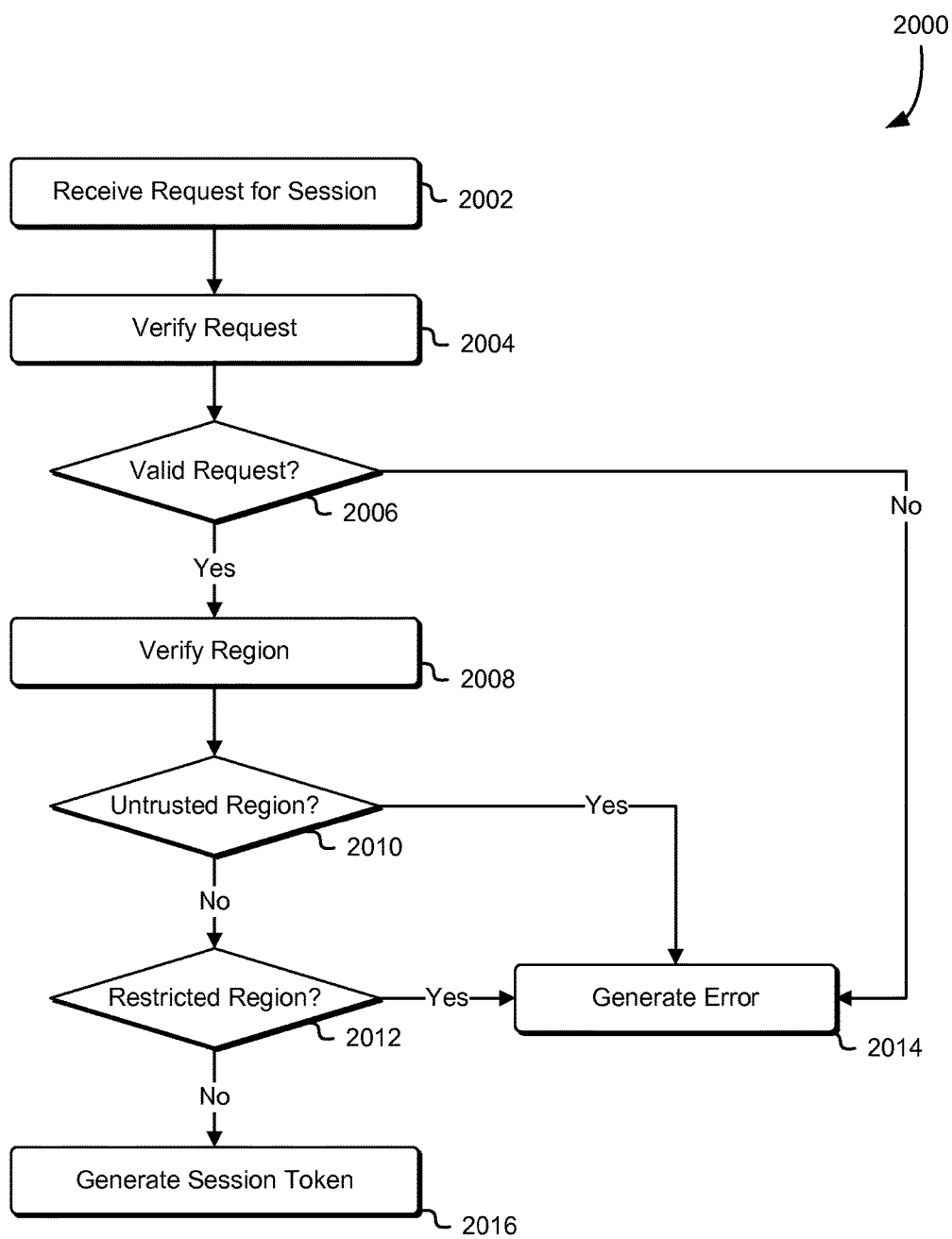
FIG. 20 illustrates a process for distributing an account key to different regions for use in isolating regions using session credentials.

FIG. 20 illustrates an example process 2000 for distributing an account key to different regions for use in isolating regions using session credentials as described in connection with FIG. 1 and in accordance with an embodiment. A security service such as the security service 106 described in connection with FIG. 1 may perform the process illustrated in FIG. 20. The security service may first receive 2002 a request for a session and may verify 2004 that request as described above. A request that is not valid 2006 may cause the security service to generate an error 2014 in response to the invalid request. The security service may generate an error 2014 and send a report of the error to the customer and/or to the computing resource service provider as described above in connection with FIG. 5.

A request that is valid 2006 may cause the security service verify 2008 the region by determining if the region is an untrusted region 2010 (i.e., a region not trusted by the computing resource service provider) and/or if the region is a restricted region 2012 (i.e., a region not trusted by the customer). A region may be determined to be an untrusted region 2010 because, for example, there are policies and/or permissions explicitly stating such or because, for example, the global session key is not present in the region. Similarly, a region may be determined to be a restricted region 2012 because, for example, there are policies and/or permissions explicitly stating such or because, for example, the account key is not present in the region.

If the region is an untrusted region 2010 and/or if the region is a restricted region 2012, the security service may generate an error 2014 and send a report of the error to the customer and/or to the computing resource service provider. Conversely, if the region is not an untrusted region 2010 and if the region is not a restricted region 2012, the security service may use the global session key and the account key to generate 2016 a session token as described above.

Figure 21:
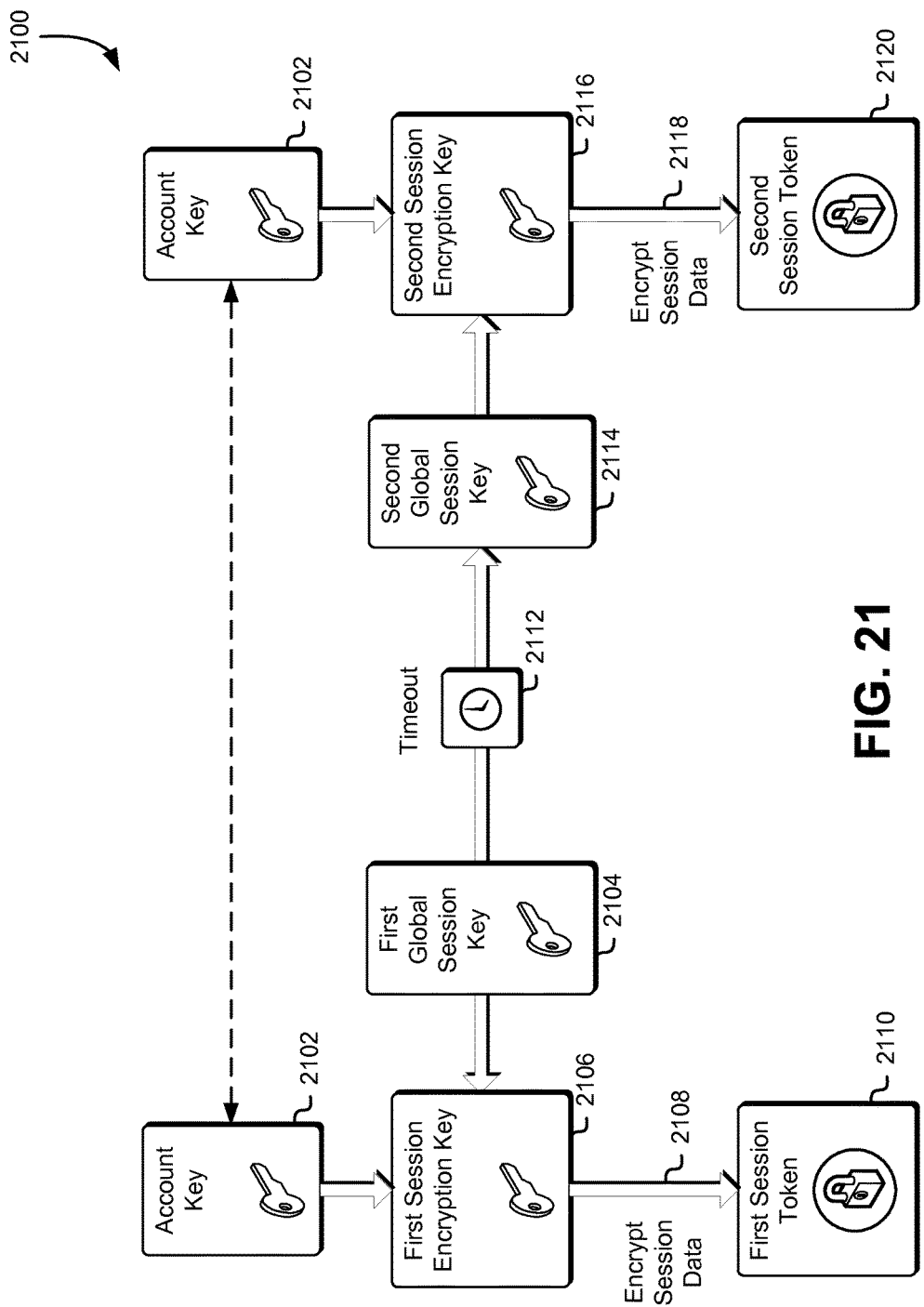
FIG. 21 illustrates an environment where global session keys are combined with account keys to generate session credentials.

FIG. 21 illustrates an example environment 2100 where global session keys are combined with account keys to generate session credentials as described in connection with FIG. 1 and in accordance with an embodiment. An account key 2102 may be combined with a first global session key 2104 to produce a first session encryption key 2106, which may be used to encrypt 2108 session data to produce a first session token 2110 as described above. In an embodiment, the first session encryption key 2106 is generated on demand when the session token is requested. In another embodiment, the first session encryption key 2106 is generated in response to a request such as, for example, a first request for a session token and is stored by a service such as the security service for later use (e.g., for later decryption of the session token). In another embodiment, the account key 2102 and the first global session key 2104 are used to encrypt 2108 the session data directly, without producing an intermediary first session encryption key such as the first session encryption key 2106. In another embodiment, the account key 2102 and/or the first global session key 2104 are discarded after a period of time, or a number of uses, or according to some other security policy.

In the example illustrated in FIG. 21, the first global session key 2104 may be valid only for a predetermined amount of time and, after that predetermined amount of time has expired and a timeout 2112 occurs, a second global session key 2114 may be generated, which may be combined with the account key 2102 to produce a second session encryption key 2116. The second session encryption key 2116 may then be used to encrypt 2118 session data to produce a second session token 2120 as described above. Although not illustrated in FIG. 21, the second global session key 2114 may also be generated as a result of a key generation event that may be generated by the computing resource service provider or a service operating therein. A key generation event may be a key rotation event, a key timeout event, a key invalidation event, a keychain update event, or some other key generation event. An example of a key generation event is a key rotation event, where on a periodic basis (e.g., hourly) the oldest key (based on a creation time associated with the key) is removed or invalidated and a new key (with a new creation time) is generated. Another example of a key generation event is a keychain update event, where one or more keys in a keychain are updated according to one or more update criteria.

A key generation event may be generated by a security service, causing a global session key such as the first global session key 2104 to be replaced with a new global session key when a region is compromised and/or potentially compromised. Similarly, a key generation event may be generated by a policy service, causing a global session key such as the first global session key 2104 to be replaced with a new global session key when one or more policies regarding access to a region have changed. In an embodiment, the removal and/or replacement of a global session key causes the session tokens encrypted with that session key to be invalidated. In another embodiment, a global session key that is removed and/or replaced remains available for some time in order to extract session data from session tokens encrypted with that global session key.

Figure 22:
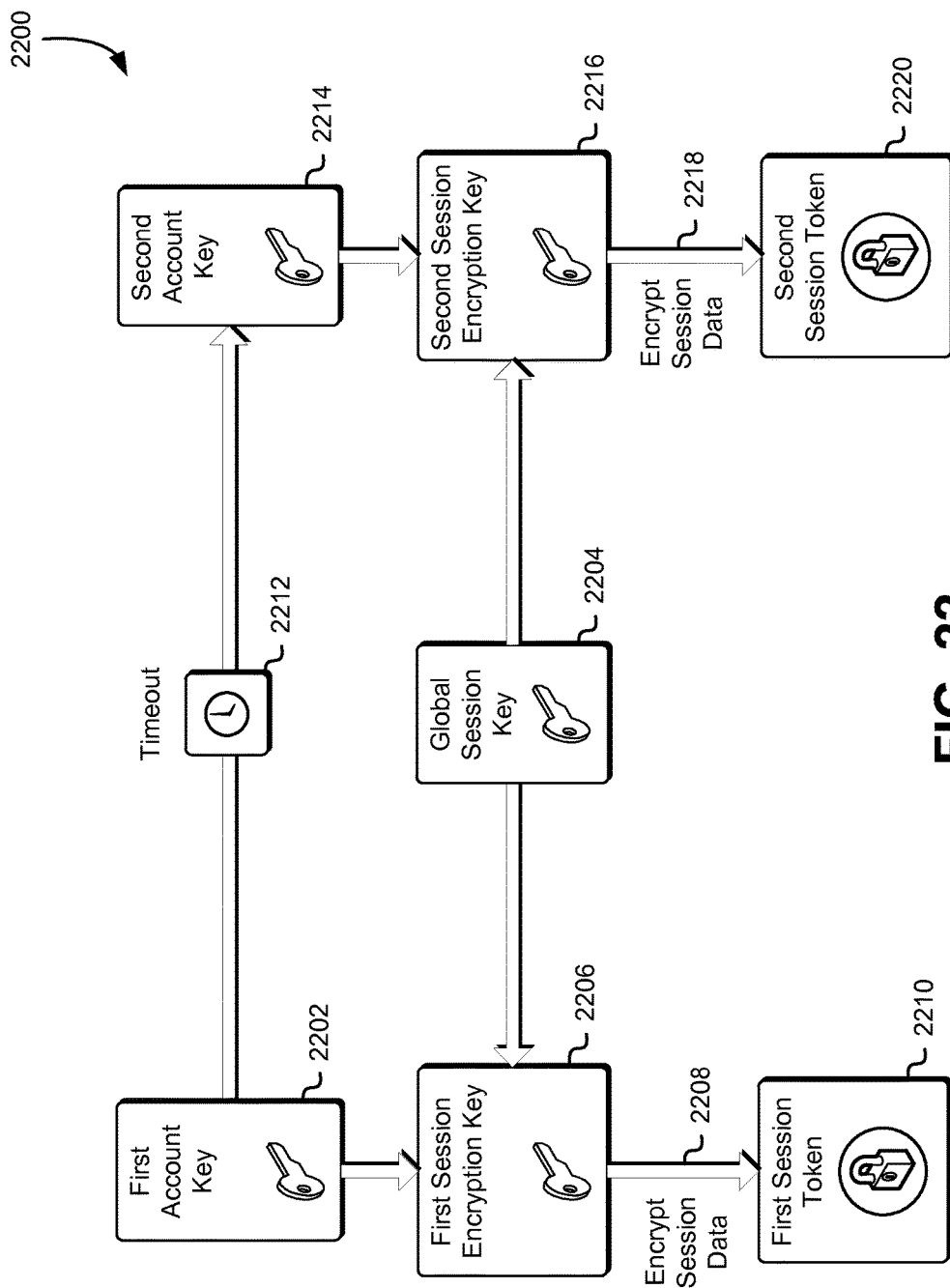
FIG. 22 illustrates an environment where global session keys are combined with account keys to generate session credentials.

FIG. 22 illustrates an example environment 2200 where global session keys are combined with account keys to generate session credentials as described in connection with FIG. 1 and in accordance with an embodiment. A first account key 2202 may be combined with a global session key 2204 to produce a first session encryption key 2206, which may be used to encrypt 2208 session data to produce a first session token 2210 as described above. Just as with the first global session key 2104 described in connection with FIG. 21, the first account key 2202 may be valid only for a predetermined amount of time and, after that predetermined amount of time has expired and a timeout 2212 occurs, a second account key 2214 may be generated, which may be combined with the global session key 2204 to produce a second session encryption key 2216. The second session encryption key 2216 may then be used to encrypt 2218 session data to produce a second session token 2220 as described above.

It should be noted that while the timeout 2112 described in connection with FIG. 21 may be on the order of several hours (e.g., twelve, twenty-four, or thirty-six hours), the timeout 2212 may be on the order of several months (e.g., two, three, or six months). The longer timeout 2212 associated with an account key as compared to the timeout 2112 associated with a global session key may be based at least in part on there being only a few global session keys that are valid at one time (e.g., keys for the last twenty-four or thirty-six hours) while there may be millions of account keys when, for example, each user account of a computing resource service provider has a different unique account key. Because there may be many more account keys in a computing resource service provider environment, they may be used for longer periods of time than global session keys.

Figure 23:
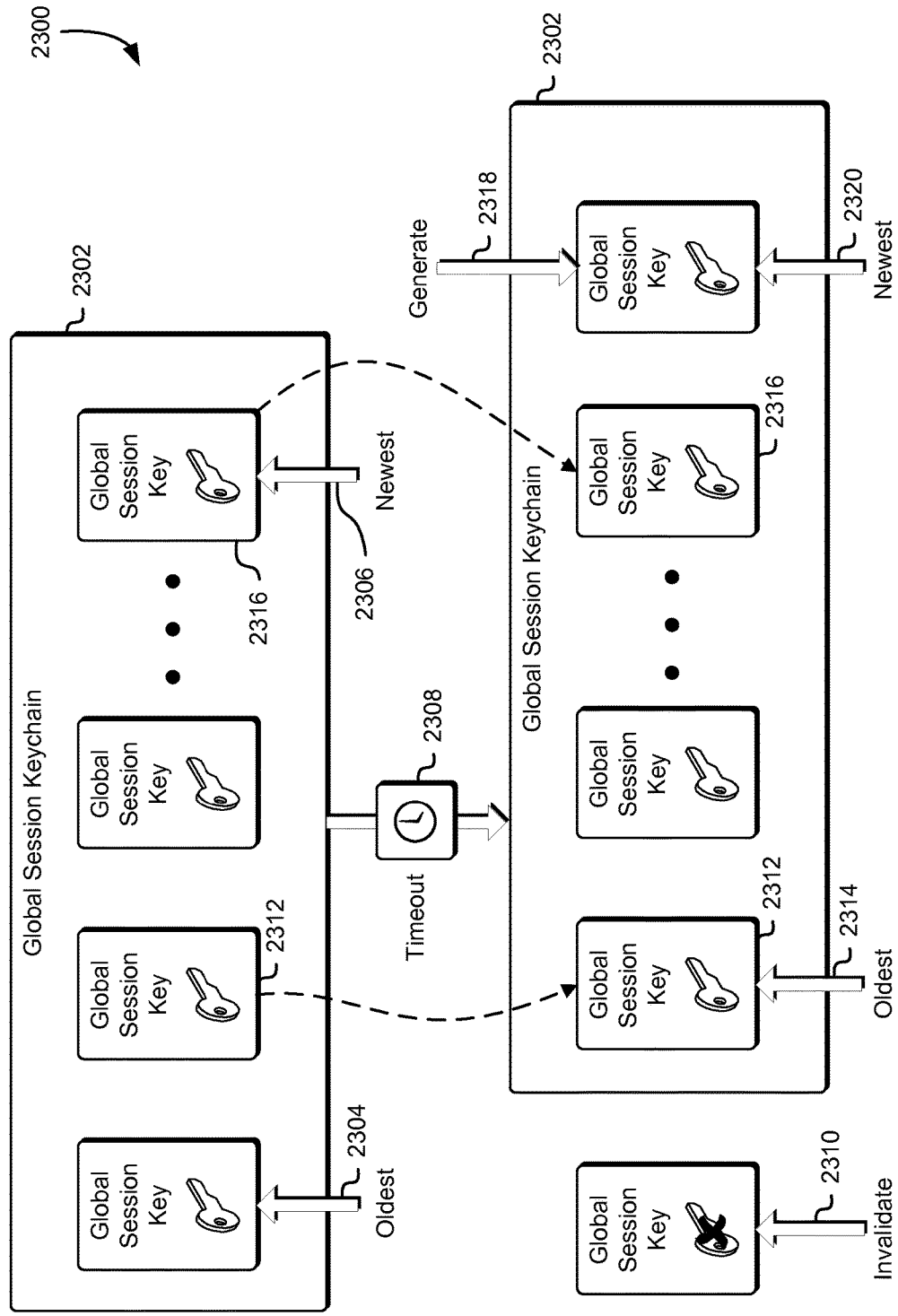
FIG. 23 illustrates an environment where global session keys are maintained for use in generating session credentials.

FIG. 23 illustrates an example environment 2300 where global session keys are maintained for use in generating session credentials as described in connection with FIG. 1 and in accordance with an embodiment. In the example illustrated in FIG. 23, a global session keychain 2302 stores a plurality of global session keys, one of which is the oldest 2304 global session key (i.e., the global session key that was generated least recently) and one of which is the newest 2306 global session key (i.e., the global session key that was generated the most recently). When a key generation event such as a timeout 2308 occurs, the global session keychain 2302 may be updated by, for example, invalidating 2310 the oldest 2304 global session key designating the next oldest global session key 2312 as the new oldest 2314 global session key, generating 2318 a new global session key, designating that new global session key as the newest 2320 global session key, and changing the designation of the former newest global session key 2316.

In an embodiment, only the newest global session key is used to encrypt session tokens and the other global session keys in the global session keychain are used to decrypt session tokens. In such an embodiment, using the example illustrated in FIG. 23, a session token is encrypted using the newest 2306 global session key immediately before the timeout 2308 and is encrypted using the newest 2320 global session immediately after the timeout 2308 (and, until the next key generation event occurs).

Figure 24:
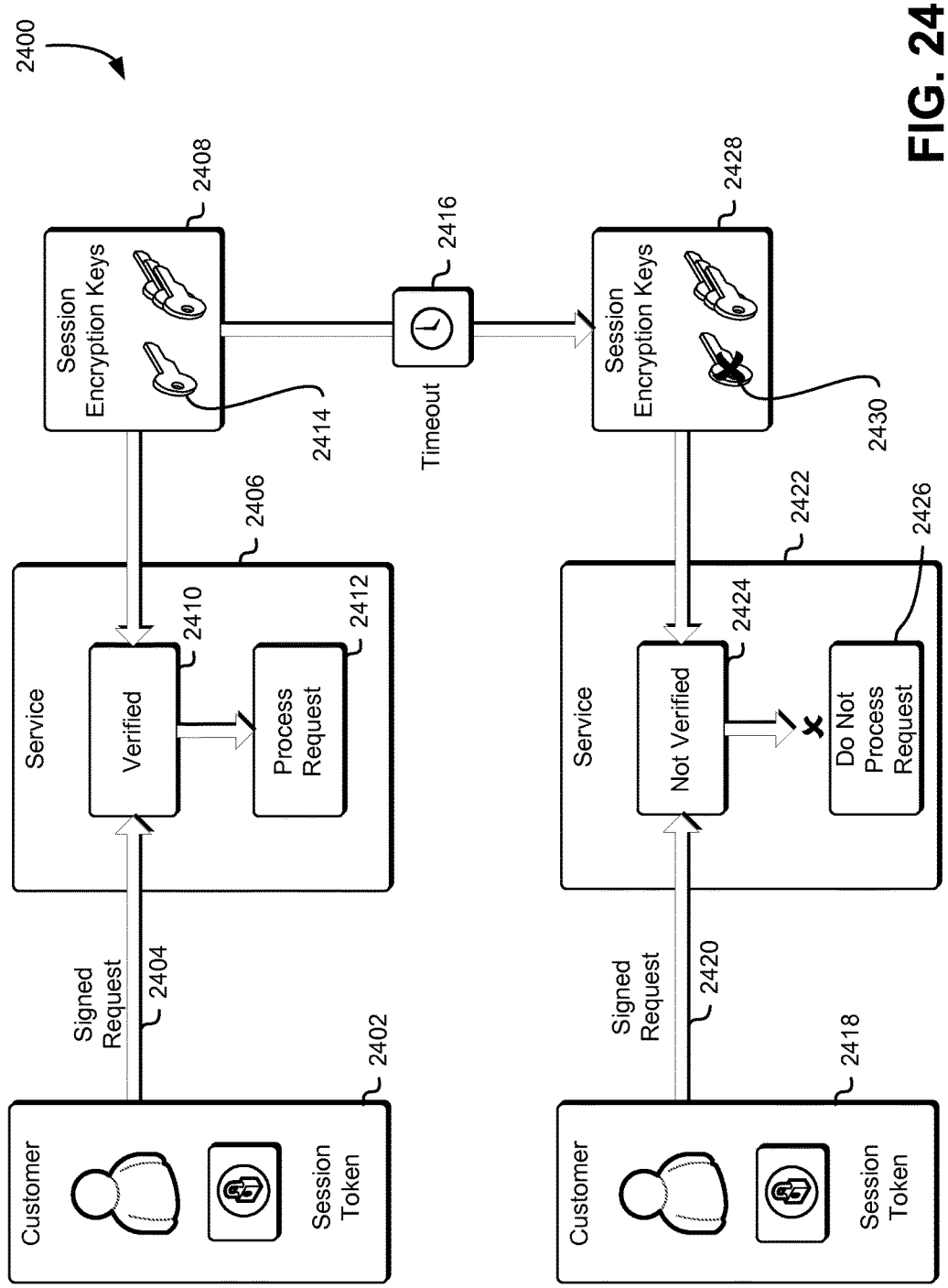
FIG. 24 illustrates an environment where sessions are expired using session credentials.

FIG. 24 illustrates an example environment 2400 where sessions are expired using session credentials as described in connection with FIG. 1 and in accordance with an embodiment. A customer 2402 may first generate a signed request 2404 using a session token as described herein. In the example illustrated in FIG. 24, the session token used to generate the signed request 2404 was generated using a session encryption key 2414, which may be one of a plurality of session encryption keys 2408. In an embodiment, the session encryption keys 2408 and the session encryption key 2414 are generated using a global session key and an account key as described at least in connection with FIG. 18.

The signed request 2404 may be verified 2410 by a service 2406 (e.g., a security service such as the security service 106 described in connection with FIG. 1) and the signed request may be processed 2412 because the session encryption key 2414 is still valid and is still one of the plurality of session encryption keys 2408. Conversely, after one or more key generation events such as a timeout 2416, the session encryption key 2414 may become an invalid session encryption key 2430, and may be replaced by one or more new session encryption keys in the plurality of session encryption keys 2428. For example, if a new session encryption key is generated every hour, and each session encryption key is valid for twenty-four hours, then there may be twenty-four session encryption keys in the plurality of session encryption keys 2428. In such an example, after twenty-four hours pass, the first session token used to generate the signed request 2404 may no longer be valid due to the session encryption key 2414 having expired.

In the example illustrated in FIG. 24, if the customer 2418 uses the session token generated using the session encryption key 2414 to generate a signed request 2420 after the session encryption key 2414 has expired and become the invalid session encryption key 2430, the service 2422 may not be able to verify 2424 the signed request 2420 (because, for example, the session token may not be decrypted) and, accordingly, the service 2422 may not process the request 2426.

Figure 25:
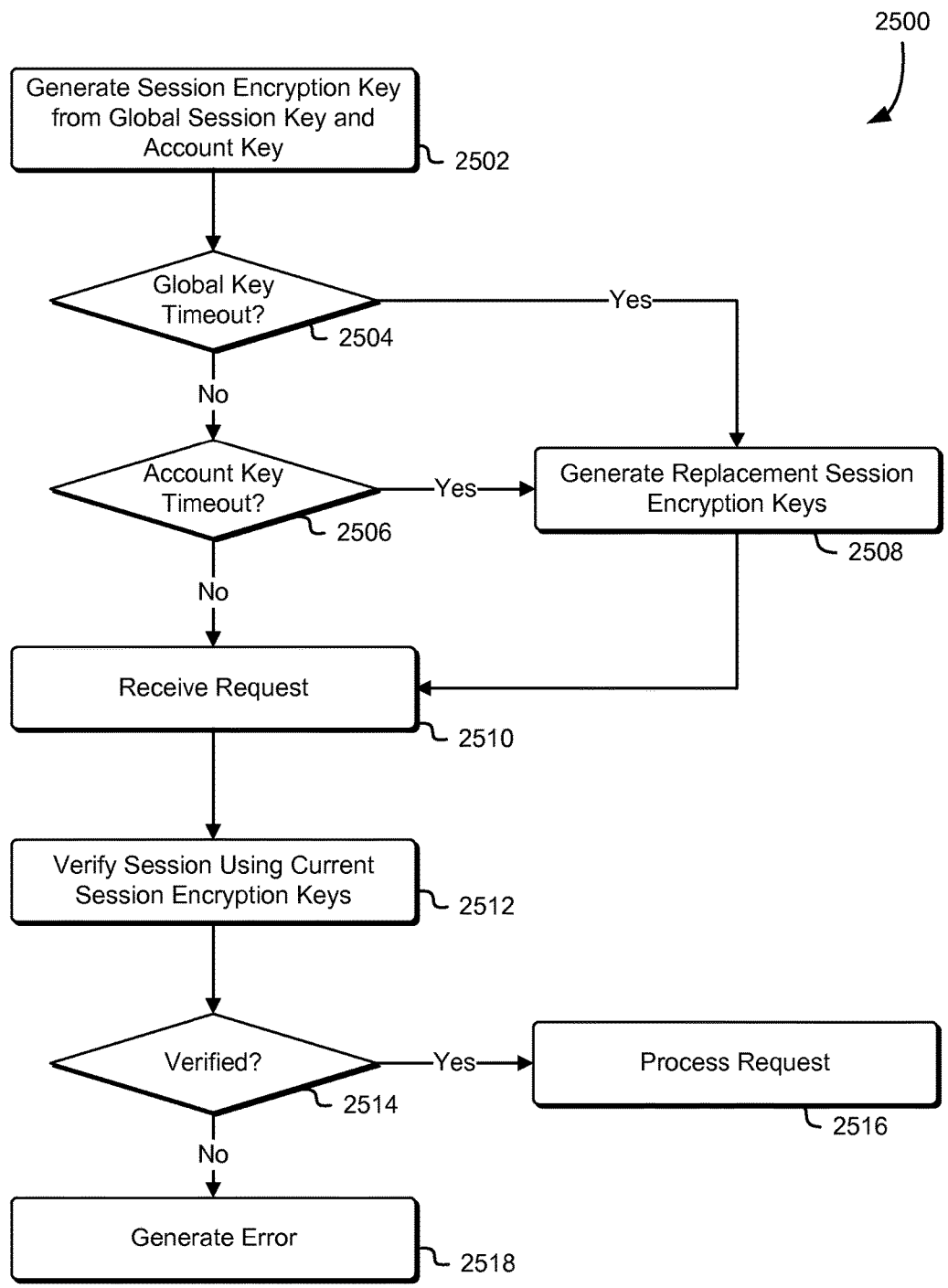
FIG. 25 illustrates a process for rotating session credentials.

FIG. 25 illustrates an example process 2500 for rotating session credentials as described in connection with FIG. 1 and in accordance with an embodiment. A security service such as the security service 106 described in connection with FIG. 1 may perform the process illustrated in FIG. 25. The security service may first generate 2502 the session encryption key from the global session key and the account key as described at least in connection with FIG. 18. If after a time period has expired and/or after a key generation event has occurred, the security service may generate new session encryption keys. For example, if a session encryption key expires or becomes invalid because of a global key timeout 2504, the security service may generate 2508 one or more replacement session encryption keys. Similarly, if a session encryption key expires or becomes invalid because of an account key timeout 2506, the security service may also generate 2508 one or more replacement session encryption keys.

The security service may next receive 2510 one or more signed requests using session tokens encrypted with the one or more session encryption keys as described above. It should be noted that, although the process illustrated in FIG. 25 shows the security service receiving the signed requests after a time period has expired and/or after a key generation event has occurred, the security service may generate new session encryption keys, the steps in the process to respond to a global key timeout 2504 and/or an account key timeout 2506 as well as to generate 2508 one or more replacement session encryption keys may occur before, during, or after the steps in the process to receive 2510 one or more signed requests using session tokens encrypted with the one or more session encryption keys.

After receiving the one or more signed requests, the security service may verify the session using a session encryption key corresponding to the session encryption key that was used to encrypt the session token associated with the signed request as described herein. If the session is verified (i.e., if the session token is validated), then the security service may process the request 2516. Conversely, if the session is not verified, the security service may generate an error 2518 as described above.

Figure 26:
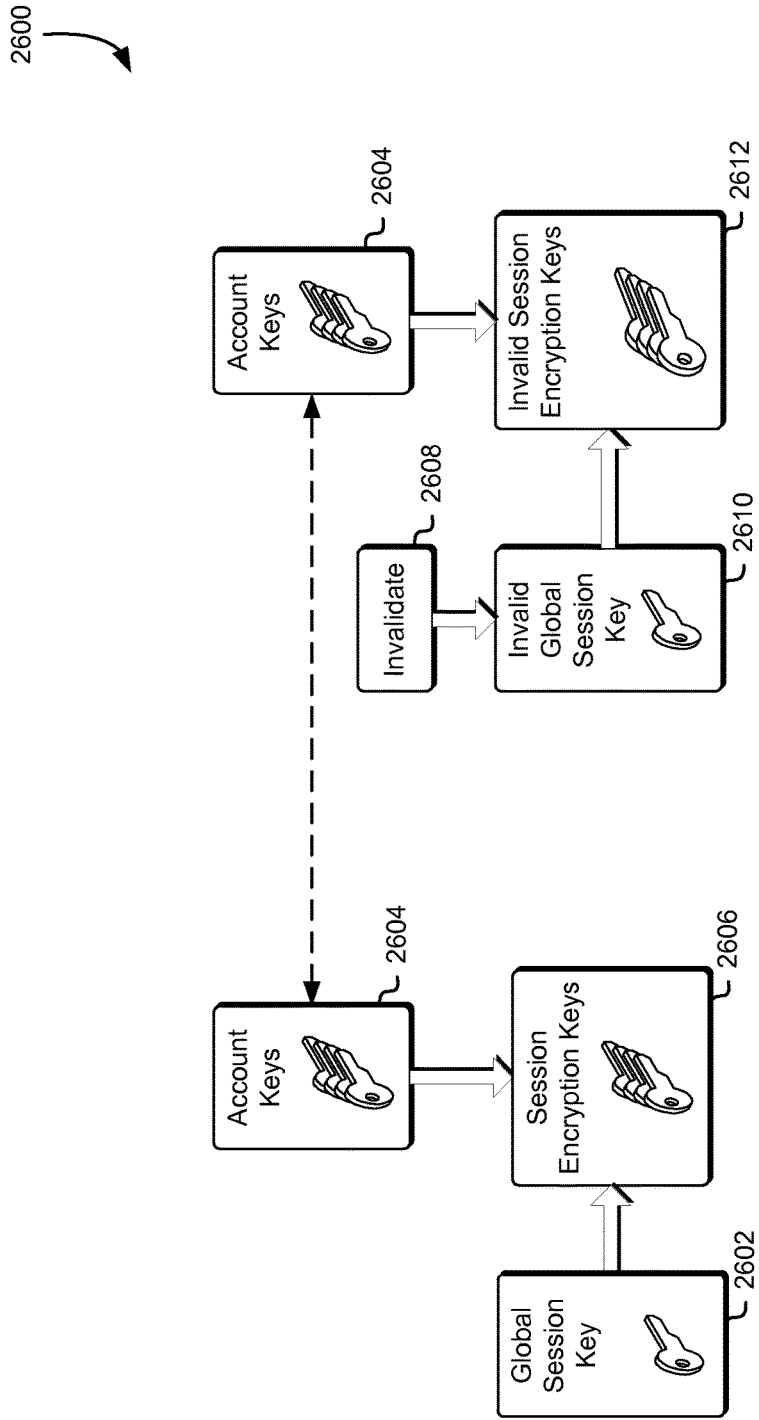
FIG. 26 illustrates an environment where a plurality of session keys can be invalidated using session credentials.

FIG. 26 illustrates an example environment 2600 where a plurality of session keys can be invalidated using session credentials as described in connection with FIG. 1 and in accordance with an embodiment. In the example illustrated in FIG. 26, a global session key 2602 may be combined with account keys 2604 to generate session encryption keys 2606 as described above. The session encryption keys 2606 may remain valid and the session tokens generated using the session encryption keys 2606 may also remain valid for a time period. When the time period has expired, the global session key 2602 may be invalidated 2608 and may become an invalid global session key 2610. As a result of the global session key 2602 becoming an invalid global session key 2610, the session encryption keys generated from the invalid global session key 2610 and the account keys 2604 may become invalid session encryption keys 2612 and session tokens generate using the formerly valid, but now invalid, session encryption keys such as the invalid session encryption keys 2612 may also become invalid due to being unverifiable.

Figure 27:
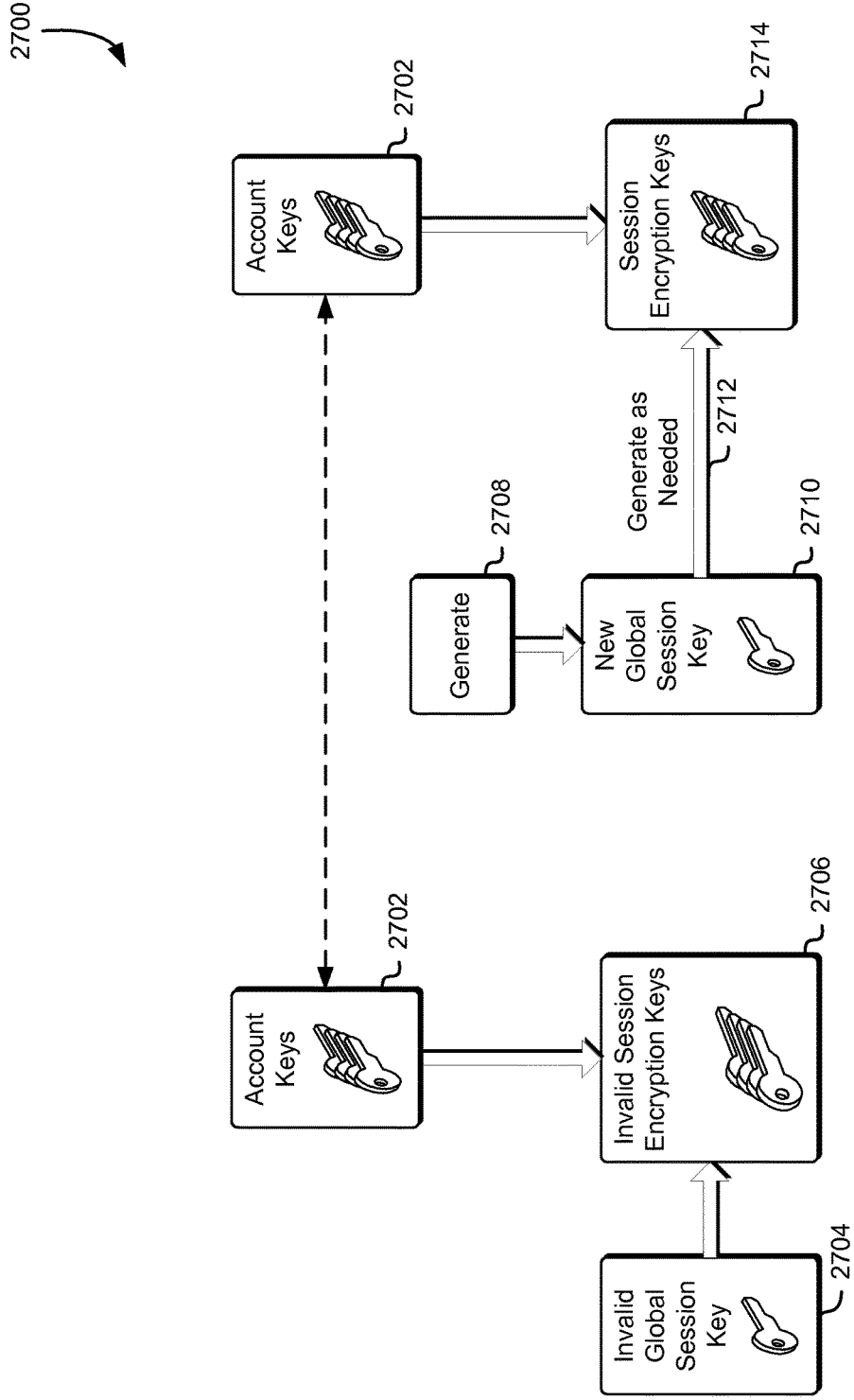
FIG. 27 illustrates an environment where a plurality of invalidated session keys can be regenerated using session credentials.

FIG. 27 illustrates an example environment 2700 where a plurality of invalidated session keys can be regenerated using session credentials as described in connection with FIG. 1 and in accordance with an embodiment. The example illustrated in FIG. 27 continues from the example illustrated in FIG. 26, where a global session key is an invalid global session key 2704 and, as a result, the session encryption keys generated from the invalid global session key 2704 and the account keys 2702 are invalid session encryption keys 2706. After the global session key has become an invalid global session key 2704, the security service may generate 2708 a new global session key 2710 to replace the invalid global session key 2704 and may use the new global session key 2710 combined with the account keys 2702 to generate 2712 session encryption keys 2714 as needed.

It should be noted that, in the examples illustrated in FIGS. 26 and 27, the account keys were not changed. As described above, an account may have a much longer period of validity than a global session key. Additionally, a computing resource service provider may provide thousands or millions of account keys and, accordingly, it may be considerably more efficient to regenerate session encryption keys by invalidating global session keys.

It should also be noted that session encryption keys may be generated as needed within a computing resource service provider environment. For example, a customer may use a user account to request a session token as described herein and may use that session token for a short period of time (e.g., two hours). Because of the expiration of global session keys, that session token may expire after, for example, twenty-four hours. If the customer does not use the session token again in that twenty-four hour period, the session encryption key used to generate the session token and corresponding to the account key for the user account may not be regenerated at the end of that twenty-four hour period (e.g., as a replacement for the expired or invalidated session encryption key). In an embodiment, the session encryption key used to generate session tokens corresponding to a user account is generated only when the customer generates a signed request using the previous session token. In such an embodiment, a session token may include an expiration time that may trigger such a regeneration of the session token.

Figure 28:
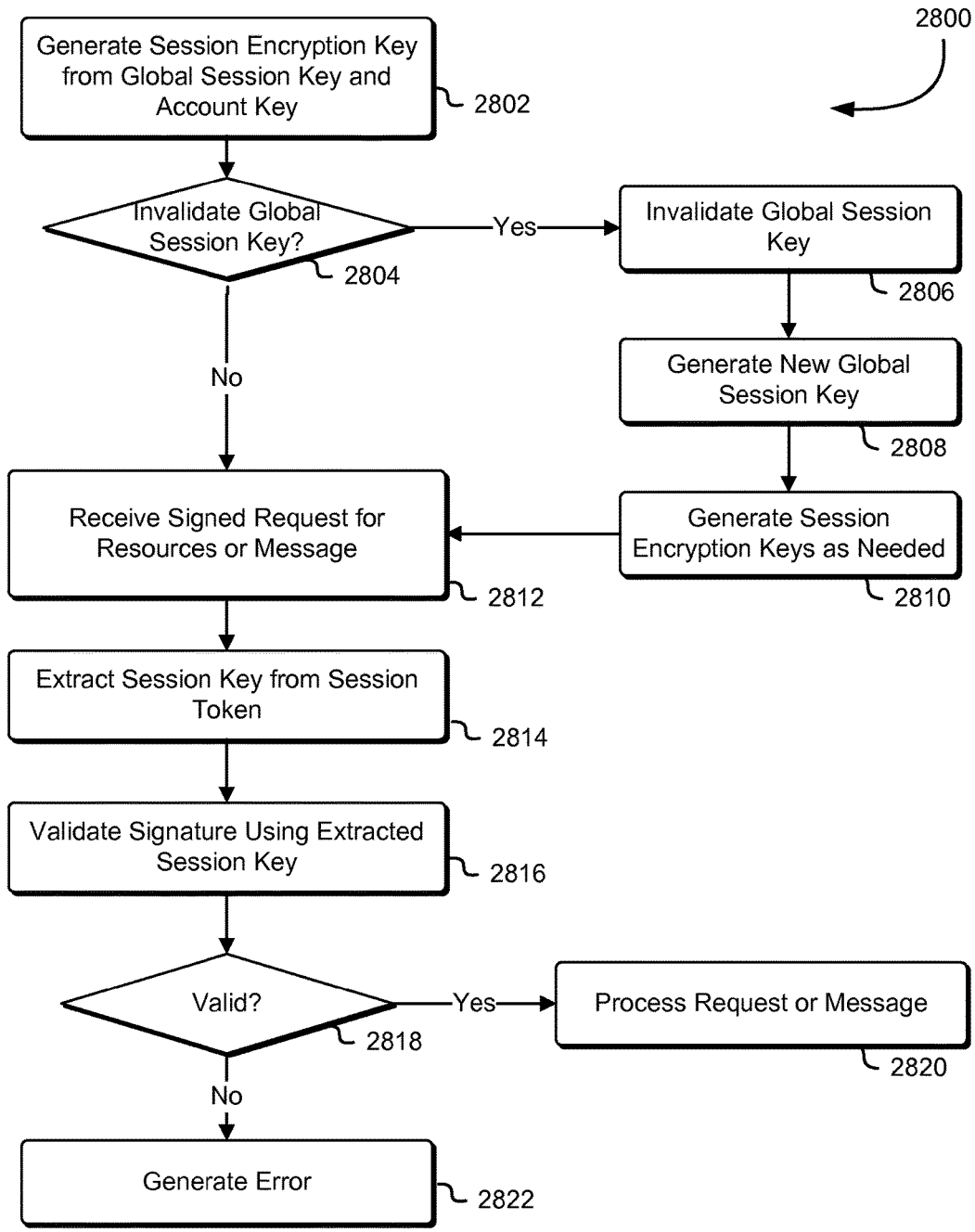
FIG. 28 illustrates a process for invalidating and regenerating a plurality of session keys using session credentials.

FIG. 28 illustrates an example process 2800 for invalidating and regenerating a plurality of session keys using session credentials as described in connection with FIG. 1 and in accordance with an embodiment. A security service such as the security service 106 described in connection with FIG. 1 may perform the process illustrated in FIG. 28. The security service may first generate 2802 session encryption keys using the global session key and the account keys as described above. The security service may next determine whether to invalidate 2804 one or more global session keys. If the security service does determine to invalidate 2804 one or more global session keys, the security service may first invalidate 2806 the selected global session key or keys, may generate 2808 one or more new global session keys to replace the invalidated global session keys and may begin the process of generating replacement session encryption keys as needed such as, for example, when a customer generates a request using a session token that was generated with a now invalid session encryption key as described above.

The security service may next receive 2812 a request for resources or a message as described above. It should be noted that, although the process illustrated in FIG. 28 shows the security service receiving a signed request or message after checking for invalidated global keys, the checking for invalidated global keys may be performed before, during, or after the processing of the requests. The request for resources or the message may be digitally signed by a session key and may also be generated using a session token, also as described above. Next, the security service may extract 2814 the session key from the session token used to generate the session token and may validate 2816 the digital signature. If the signature is valid 2818 (i.e., if the request or the message is authenticated), the security service may next process 2810 the request or the message by, for example, providing access to the resources, processing the message, or performing some other action. If the signature is not valid 2818 (i.e., if the request or the message is not authenticated) the security service may generate 2822 an error as described above.

Figure 29:
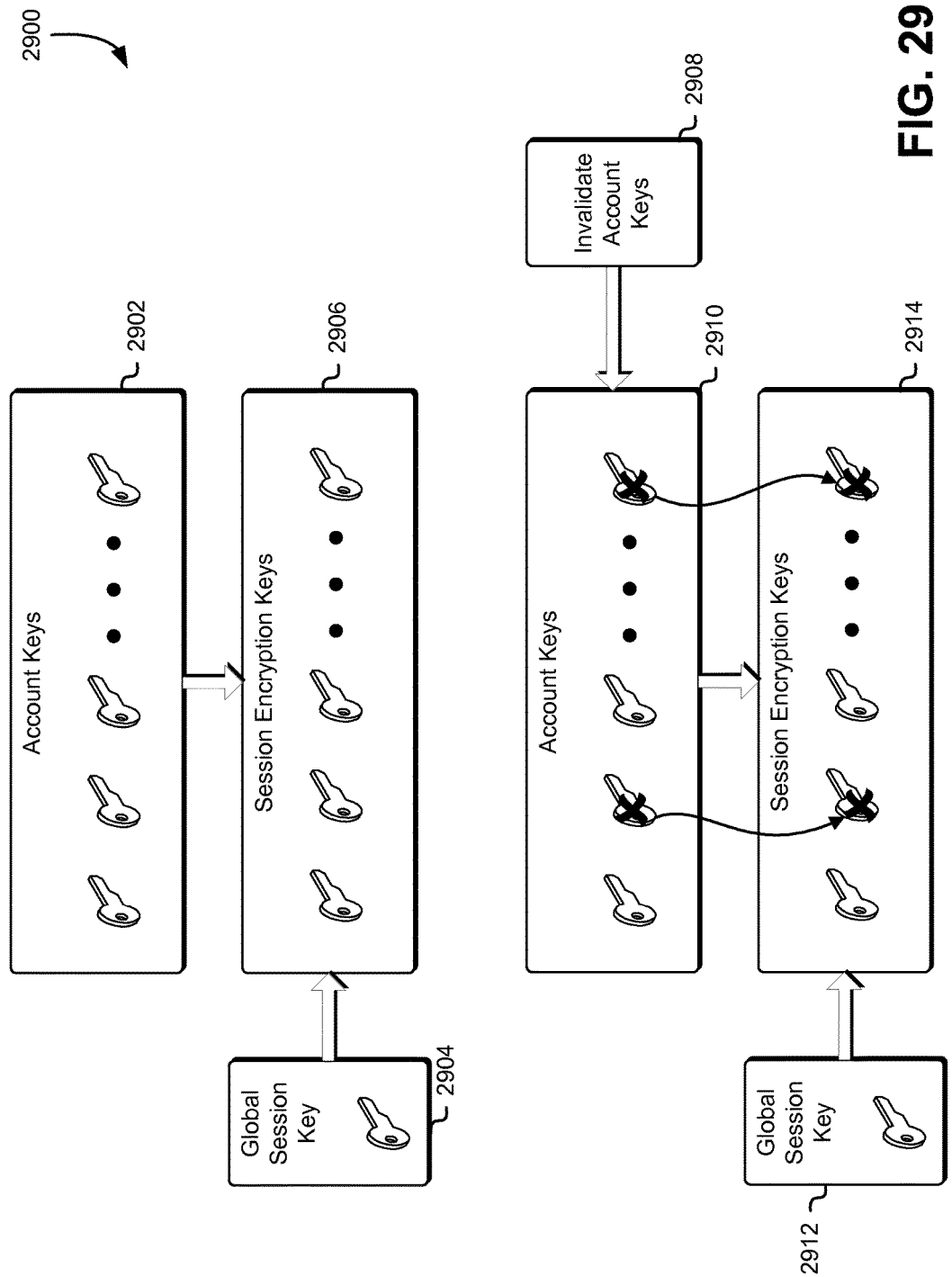
FIG. 29 illustrates an environment where account keys are invalidated in association with session credentials.

FIG. 29 illustrates an example environment 2900 where account keys are invalidated in association with session credentials as described in connection with FIG. 1 and in accordance with an embodiment. In the example illustrated in FIG. 29, a global session key 2904 may be used with one or more account keys 2902 to generate a corresponding one or more session encryption keys 2908 as described above. A security service may then invalidate 2908 one or more of the account keys 2910 to invalidate one or more session encryption keys 2914 generated with the account keys 2910 and a global session key 2912. In contrast to the example illustrated in FIGS. 26 and 27 where all session encryption keys were invalidated by invalidating the global session key, the example illustrated in FIG. 29 shows the selecting invalidation of session encryption keys and, accordingly, of session tokens generated using those invalidated session encryption keys. For example, a computing resource service provider may determine that one or more accounts associated with a customer may have been compromised. Invalidating the account keys associated with those compromised accounts renders the credentials associated with those accounts (e.g., the session tokens) invalid. Similarly, a customer may determine that one or more user accounts should not have access to short-term credentials and may invalidate the account keys associated with those accounts.

Figure 30:
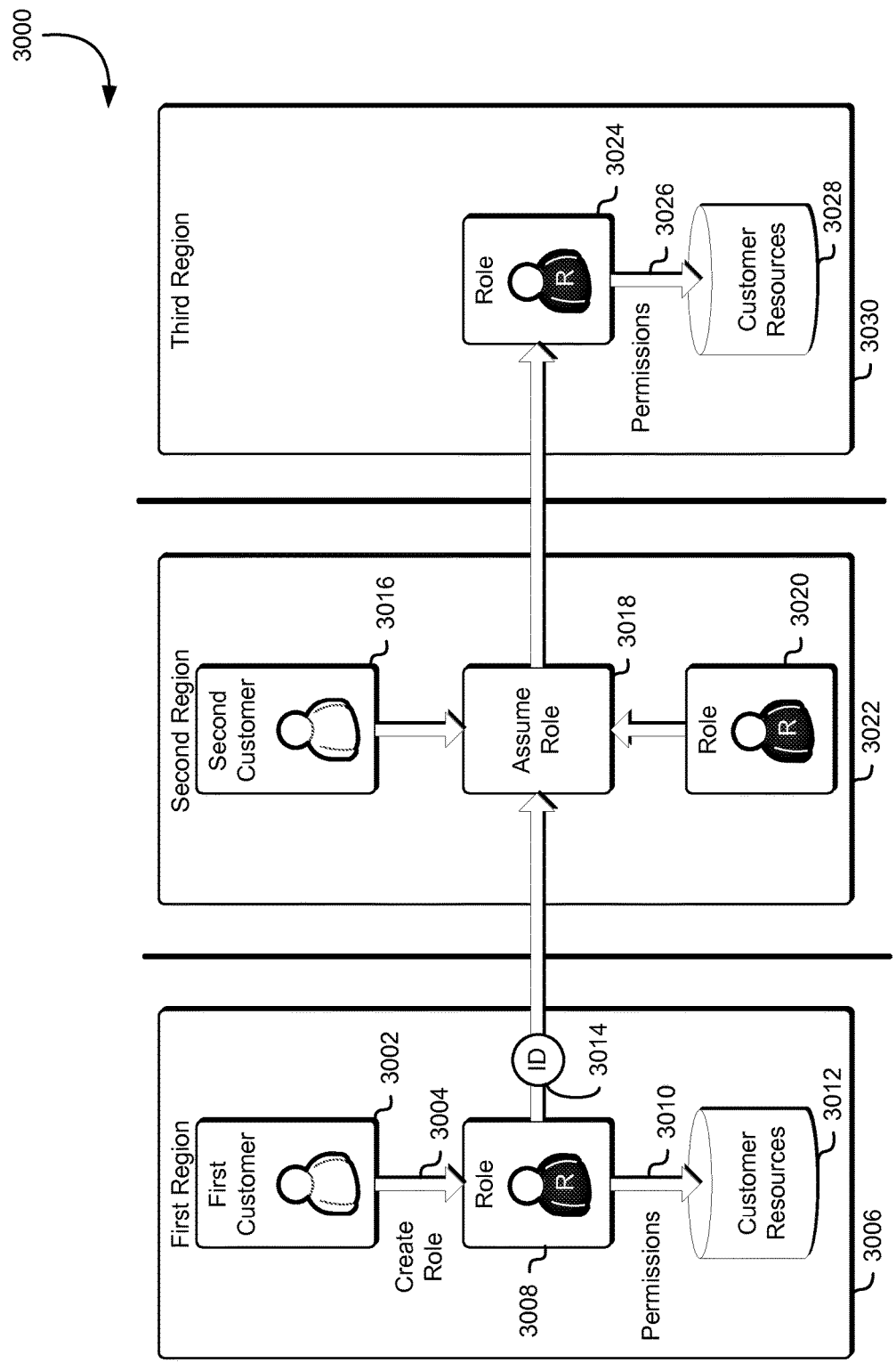
FIG. 30 illustrates an environment where cross-region roles are assumed across regions using session credentials.

FIG. 30 illustrates an example environment 3000 where cross-region roles are assumed across regions using session credentials as described in connection with FIG. 1 and in accordance with an embodiment. A first customer 3002 in a first region 3006 may create 3004 a role. The role 3008 may have a role identifier 3014 (illustrated herein as a circle with the letters "ID" inside) and a set of permissions 3010 for access to a set of customer resources 3012 in the first region. The customer resources 3012 are a set of resources associated with the first customer 3002.

For example, a customer may have a resource such as a database that is configured to store data associated with a webservice (e.g., a database that records each transaction for each user of the webservice). The customer may create first role for this database that provides permissions to read, but not write, data from the database. The customer may additionally create a second role for this database that provides permissions to read and write data to and from the database. The customer may additionally create a third role for this database that provides permissions to alter the database, including adding and removing records and changing the data schema (e.g., an "administrator" role). A user of a user account may then assume one or more of these roles to have access to the database. For example, a user may assume the first role if the user only requires permission to read data from the database. Using the first role, the user could analyze, but not alter, the data in the database. Similarly, a user may assume the second role if the user requires permissions to read from and write to the database. Using the second role, the user could update records in the database. The third role could be assumed to allow the user to alter the structure of the database to, for example, add a new table to the database schema. Each of the roles may have a set of permissions associated with access to the resources and may also have a set of access policies associated with the role so that, for example, only designated users and/or user accounts may have access to the role. These access policies may be enforced using credentials such as those described herein (e.g., keys, sessions, etc.). The access policies and the permissions associated with the roles are described in more detail below.

The role identifier 3014 may be used to identify the role in other regions. For example, the role 3008 may be propagated to a second region 3022 (where it is identified as the role 3020) and may also be propagated to a third region 3030 (where it is identified as the role 3024). In an embodiment, a role can only be assumed in regions where the role has been propagated because regions where the role has not been propagated may not have access to the permissions associated with the role. In the example illustrated in FIG. 30, the role has access to customer resources 3012 in the first region 3006 and customer resources 3028 in the third region 3030. The role 3024, which is the same as the role 3014, may have a set of permissions 3026 for access to a set of customer resources 3028 in the third region. The set of customer resources 3028 are a set of resources associated with the first customer 3002, but present in the third region. In the example illustrated in FIG. 30, no customer resources associated with the first customer 3002 are present in the second region 3022.

When a second customer 3016 in the second region 3022 assumes the role 3018 based at least in part on the role identifier 3014, the access policies associated with the role determine whether the second customer 3016 may assume the role. If the second customer 3016 assumes the role 3018, the second customer 3016 may have all of the permissions associated with the role so that, for example, the second customer 3016 may access the customer resources 3012 in the first region 3006 and may also access the customer resources 3028 in the third region 3030. It should be noted that the second customer 3016 does not have an account in the first region 3006 or in the third region 3030, but still may be authenticated to assume the role and access the resources by assuming the role.

In the example illustrated in FIG. 30, the role identifier 3014 is provided to the second customer 3016 in the second region 3022 so that the second customer 3016 in the second region may assume the role. In an embodiment, the role identifier is provided to the second customer by storing the role in a database of role identifiers. In another embodiment, the role identifier is provided to the second customer by sending the role identifier in an email, or a SMS message, or a console message, or using some other such communications methodology. In such an embodiment, the role identifier may be sent using an encryption method such as those described herein. In another embodiment, the role identifier is provided to the second customer by publishing the role identifier in documentation associated with the customer resources 3028. For example, the customer resources 3028 may have a webpage documenting the use of the resources that may include the role identifier to use when requesting access to the resources. As may be contemplated, the methods of providing the role identifier described herein are illustrative examples and other such methods of providing the role identifier may be considered as within the scope of the present disclosure.

Figure 31:
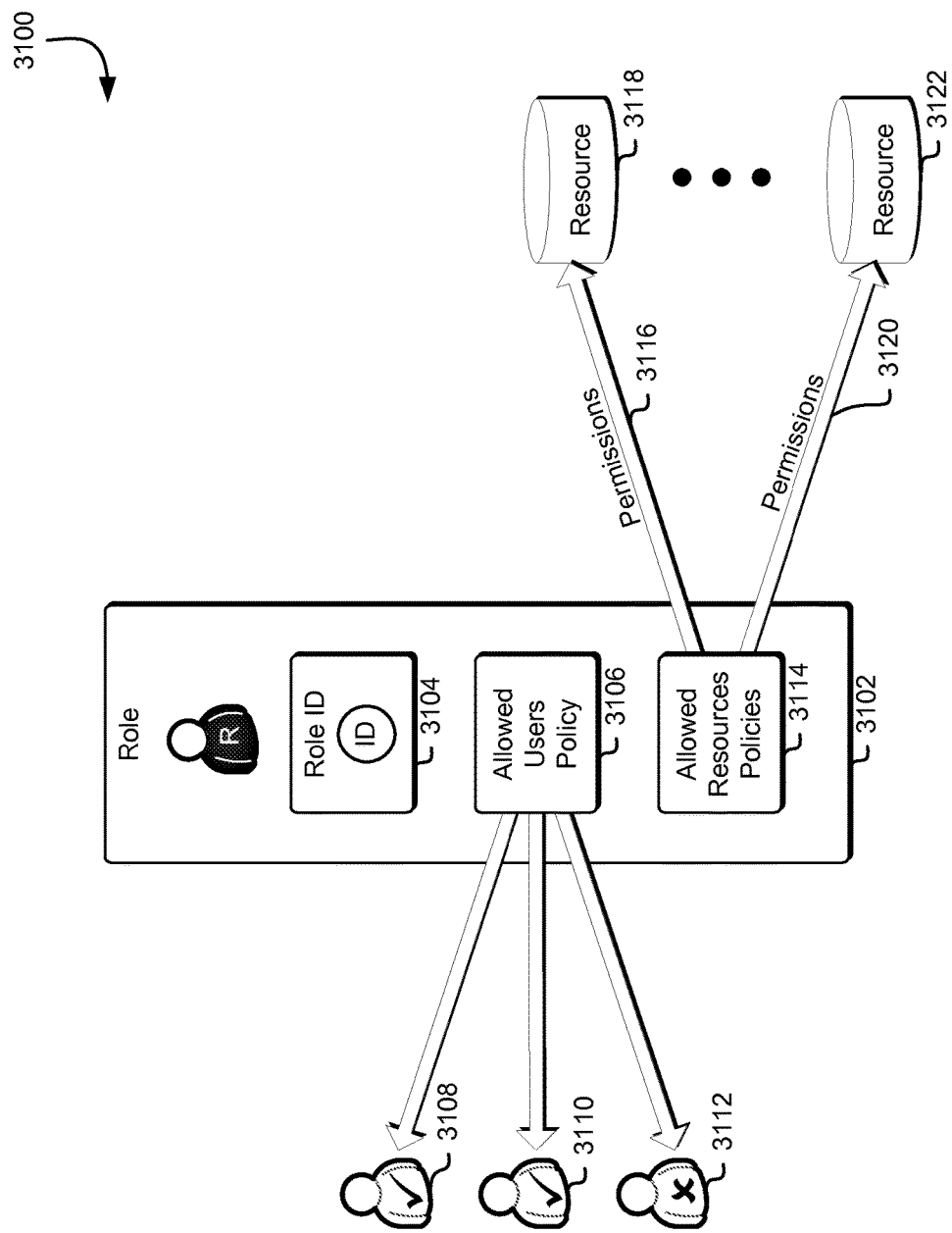
FIG. 31 illustrates an environment where policies associated with cross-region roles are applied using session credentials.

FIG. 31 illustrates an example environment 3100 where policies associated with cross-region roles are applied using session credentials as described in connection with FIG. 1 and in accordance with an embodiment. The role 3102 has a role identifier 3104, an allowed users policy 3106, and one or more allowed resources policies 3114. In the example illustrated in FIG. 31, the allowed users policy 3106 indicates that a first user 3108 may assume the role 3102, a second user 3110 may also assume the role 3102, and a third user 3112 may not assume the role 3102. The third user 3112 may be, for example, an untrusted user or may simply be associated with an account that should not have access to the permissions associated with the role. The allowed users policy 3106 may include a default policy to deny all users not explicitly allowed by the policy so that only users explicitly granted access to the role may assume the role.

In the example illustrated in FIG. 31, the allowed resources policies 3114 specify a set of permissions for access to a set of resources associated with the role. The permissions may be specific to, and based at least in part on, a region, a user, a resource, a resource type, or a combination of these and/or other such factors. For example, a set of permissions 3116 for a resource 3118 may specify that users from, for example, a first region may have unrestricted access to the resource 3118 and users from, for example, a second region may have restricted access to the resource 3118. Similarly, a set of permissions 3120 for a resource 3122 may specify that the role 3102 as assumed by the first user 3108 has different access permissions than the role 3102 as assumed by the second user 3110. As may be contemplated, the types of permissions granted by assuming a role described herein are merely illustrative examples and other types of permissions granted by assuming a role may be considered as within the scope of the present disclosure.

Figure 32:
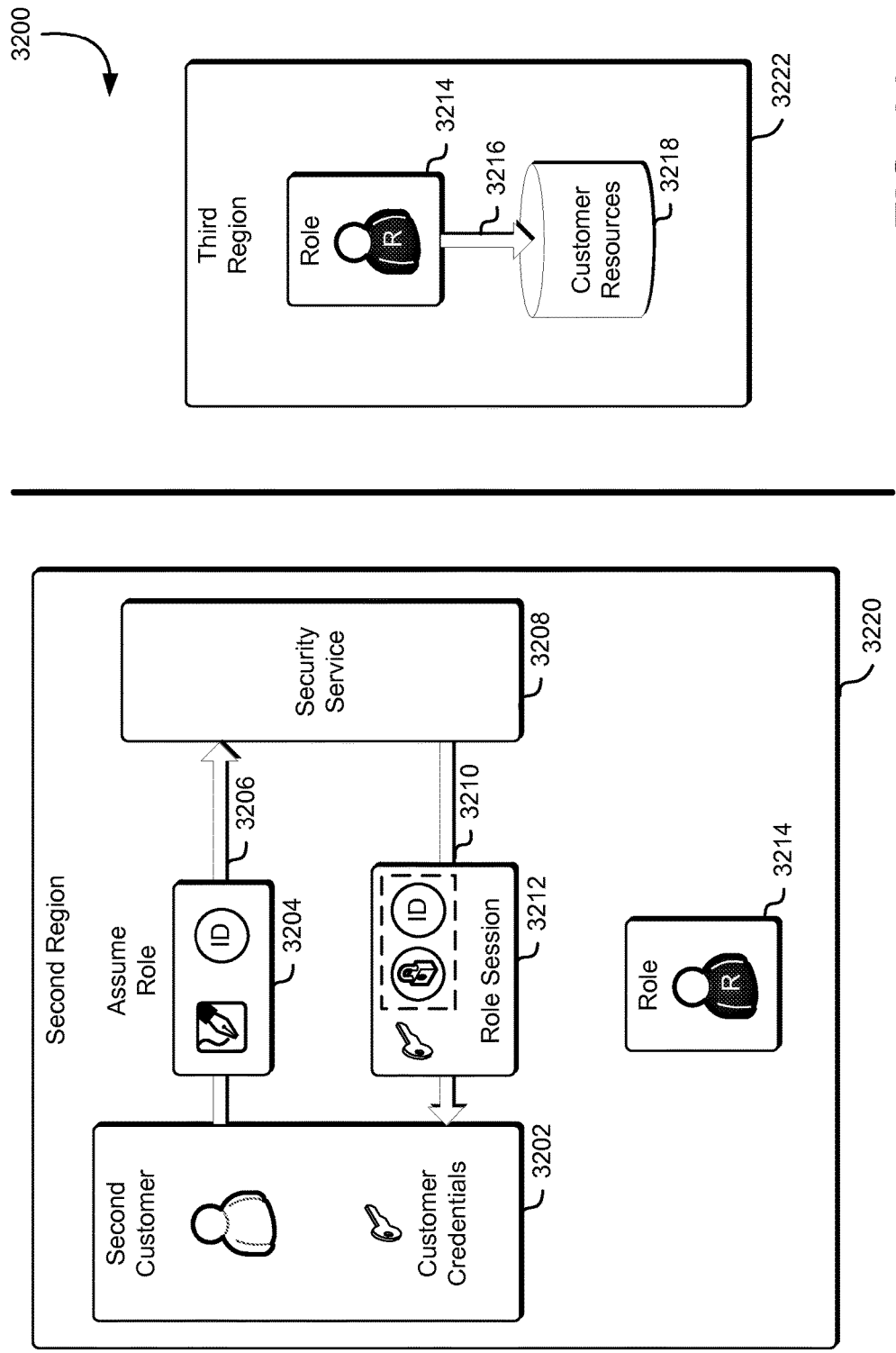
FIG. 32 illustrates an environment where a cross-region role is assumed using session credentials.

FIG. 32 illustrates an example environment 3200 where a cross-region role is assumed using session credentials as described in connection with FIG. 1 and in accordance with an embodiment. A second customer 3202, which may be the same as the second customer 3016 described in connection with FIG. 30, may send a signed request 3204 to assume a role 3206 to a security service 3208 of a second region 3220, which may be the same as the second region 3022 described in connection with FIG. 30. The security service 3208 of the second region 3220 may first verify that the role 3214 exists in the second region 3220 before verifying the request 3204, verifying that the second customer 3202 has permission to assume the role 3214, and validating the signature of the signed request 3204.

If the signed request 3204 is valid (i.e., if all of the verifications pass), the security service may generate a session associated with the role (designated herein as a role session 3212) using the methods described above. In an embodiment, the security service 3208 includes the role identifier in the session data prior to encrypting the session data to produce the session token as described above. In another embodiment, the security service 3208 provides the role identifier separate from the session token. In the example illustrated in FIG. 32, the role 3214 provides access 3216 to customer resources 3218 in a third region 3222, but the second customer 3202 does not have an account in the third region 3222. Access to the customer resources 3218 are provided to the second customer 3202 using the mechanism of the second customer 3202 assuming the role 3214.

Figure 33:
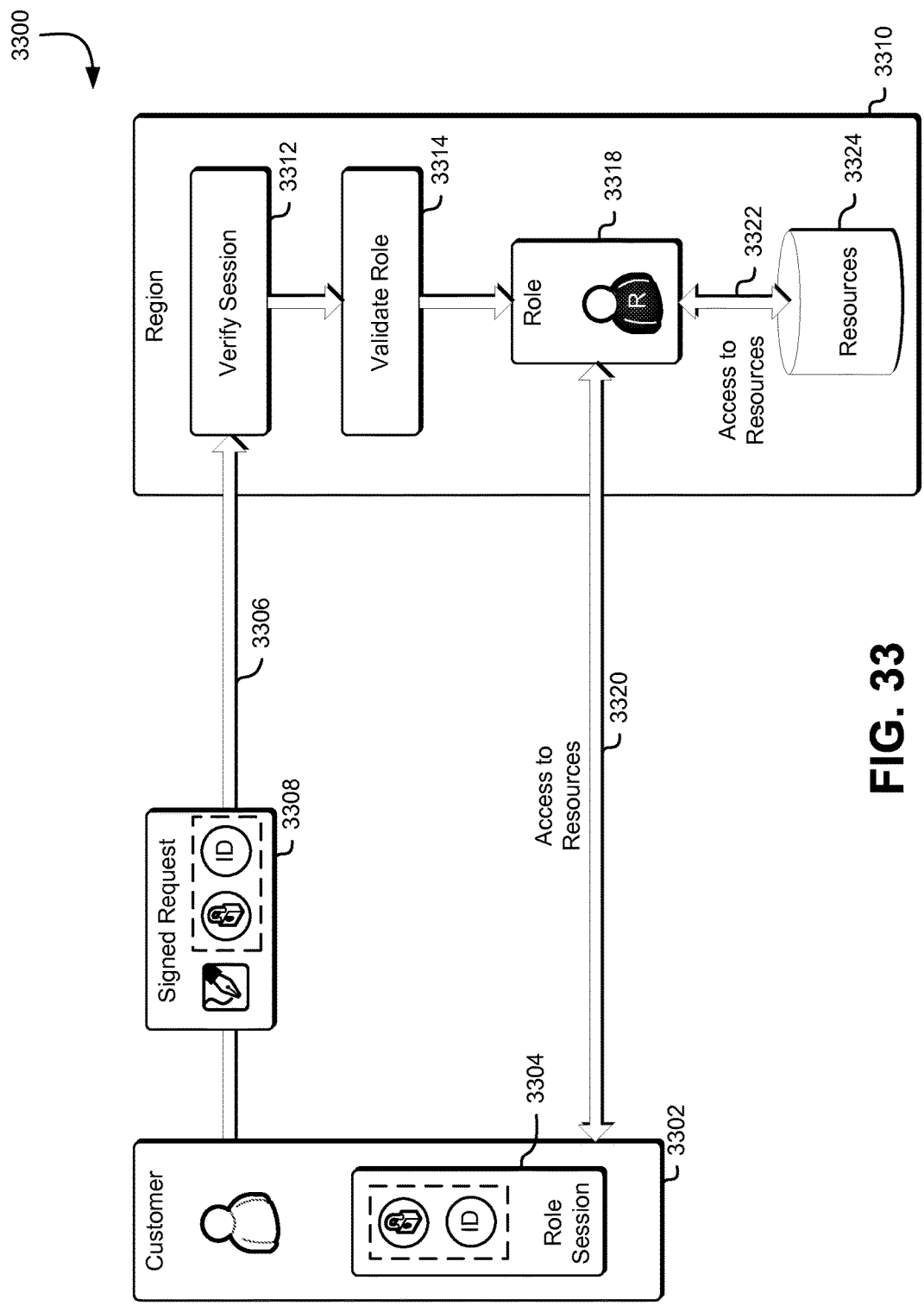
FIG. 33 illustrates an environment where a cross-region role is used to access resources across regions using session credentials.

FIG. 33 illustrates an example environment 3300 where a cross-region role is used to access resources across regions using session credentials as described in connection with FIG. 1 and in accordance with an embodiment. A customer 3302 may use a role session 3304 to generate a signed request 3308 and send 3306 the signed request to a region 3310 where the resources 3324 are located. A service of the region 3310 may verify 3312 the session using the techniques described herein and may validate 3314 that the customer 3302 may have access to the role 3318 based at least in part on the permissions associated with the role 3318. If the session is verified and the access is validated, access 3320 to the resources 3324 may be provided to the customer 3302 using the access 3322 to the resources 3324 provided by the role 3318.

In the example illustrated in FIG. 33, the role session 3304 provides the credentials associated with assuming the role 3318 using the short-term credentials provided by the session token. In an embodiment, the credentials associated with assuming the role 3318 are provided by a username and password associated with the customer 3302. In another embodiment, the credentials associated with assuming the role 3318 are provided by a certificate associated with the customer 3302. In another embodiment, the credentials associated with assuming the role 3318 are provided by a long-term key associated with the customer 3302. In such an embodiment, the credentials associated with assuming the role 3318 may be a symmetric key or may be an asymmetric key pair.

Figure 34:
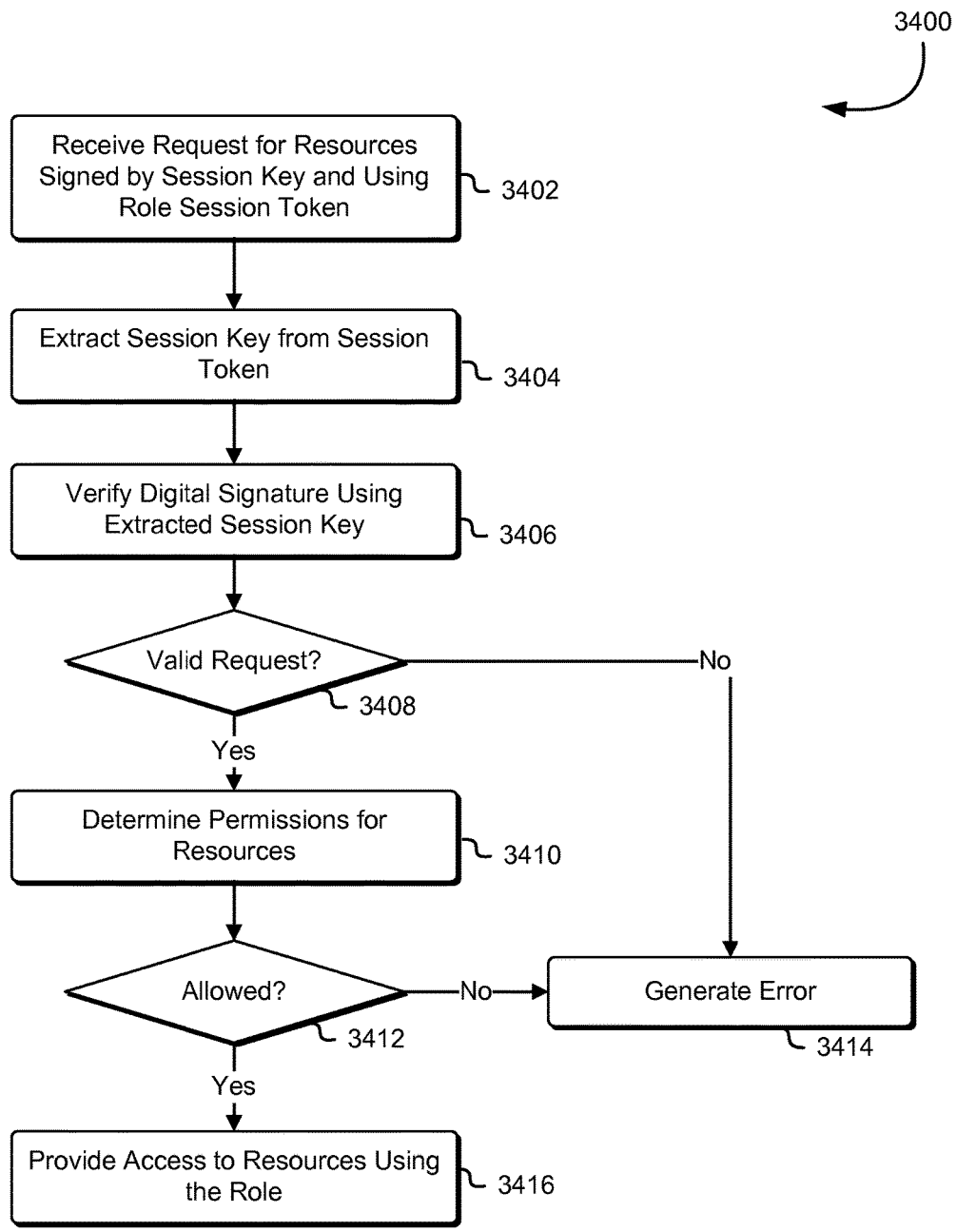
FIG. 34 illustrates a process for using a cross-region role session token to generate resource requests using session credentials.

FIG. 34 illustrates an example process 3400 for using a cross-region role session token to generate resource requests using session credentials as described in connection with FIG. 1 and in accordance with an embodiment. A security service such as the security service 106 described in connection with FIG. 1 may perform the process illustrated in FIG. 34. The security service may first receive 3402 a request for resources signed by a session key and using a role session token as described above. The request for resources may be digitally signed by a session key, may be generated using a session token, and may include a role identifier, also as described above.

Next, the security service may extract 3404 the session key from the session token used to generate the session token and may verify 3406 the digital signature using the extracted session key. If the request is valid 3408 (i.e., if the request is authenticated), the security service may next determine 3410 whether the permissions associated with the request allow such access. If the access is allowed 3412, the service may provide 3416 access to the resources using the role. If the request is not valid 3408 or if the access is not allowed 3412, the security service may generate 3414 an error as described above.

Figure 35:
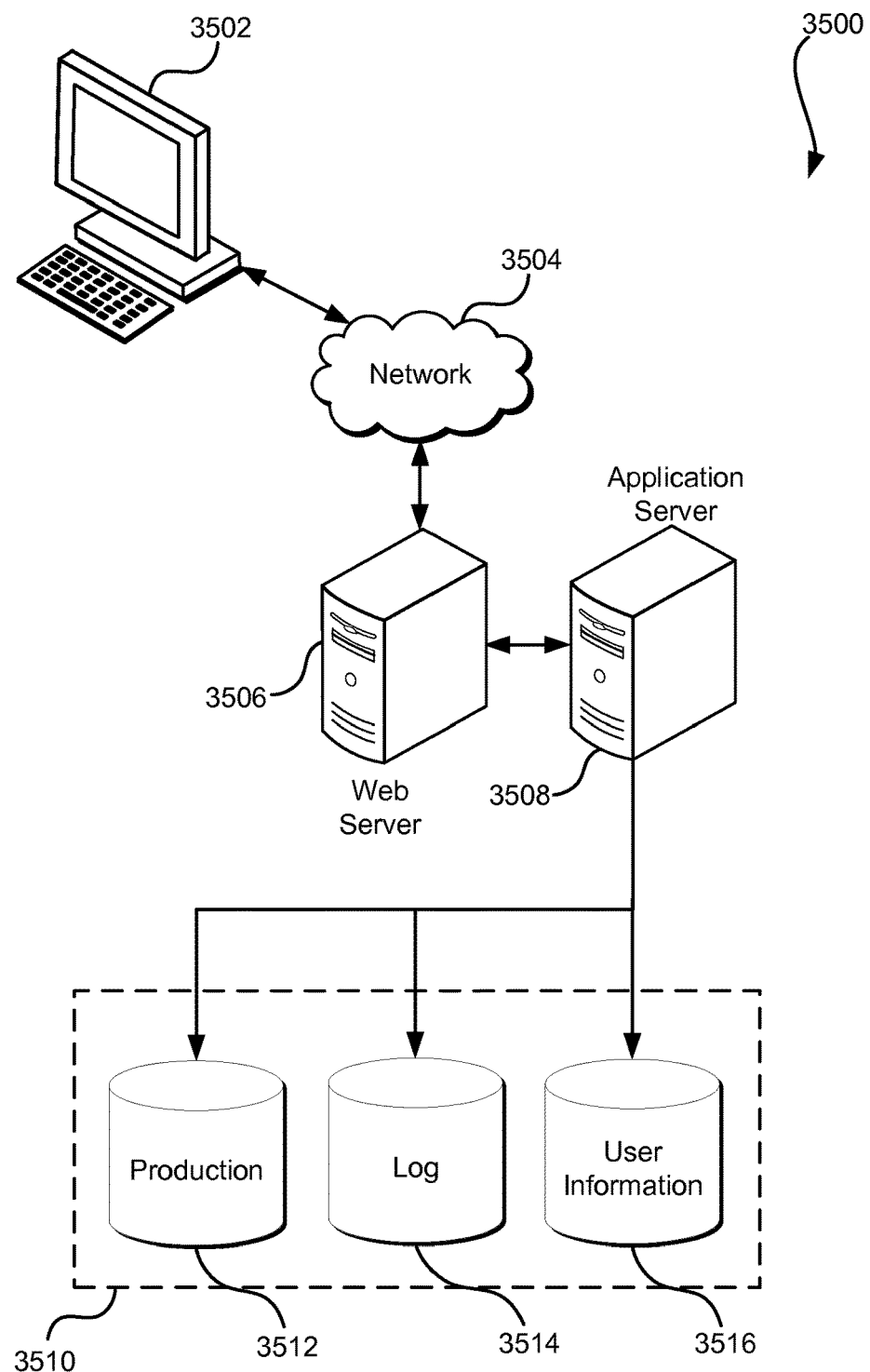
FIG. 35 illustrates an environment in which various embodiments can be implemented.

FIG. 35 illustrates aspects of an example environment 3500 for implementing aspects in accordance with various embodiments. As will be appreciated, although a web-based environment is used for purposes of explanation, different environments may be used, as appropriate, to implement various embodiments. The environment includes an electronic client device 3502, which can include any appropriate device operable to send and/or receive requests, messages, or information over an appropriate network 3504 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 3506 for receiving requests and serving content in response thereto, although for other networks an alternative device serving a similar purpose could be used as would be apparent to one of ordinary skill in the art.

The illustrative environment includes at least one application server 3508 and a data store 3510. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 3502 and the application server 3508, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 3510 can include several separate data tables, databases, data documents, dynamic data storage schemes and/or other data storage mechanisms and media for storing data relating to a particular aspect of the present disclosure. For example, the data store illustrated may include mechanisms for storing production data 3512 and user information 3516, which can be used to serve content for the production side. The data store also is shown to include a mechanism for storing log data 3514, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 3510. The data store 3510 is operable, through logic associated therewith, to receive instructions from the application server 3508 and obtain, update or otherwise process data in response thereto. The application server 3508 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 3502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 35. Thus, the depiction of the system 3500 in FIG. 35 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C"

refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, from a client computing device, a request for a session, the request specifying a first region;
    providing a session token to the client computing device, the session token usable to generate resource requests, the session token encrypted using a first secret key maintained as a secret by a security service of the first region, wherein the first secret key inaccessible to the client computing device; and
    as a result of obtaining, at a second region different than the first region, a request for resources that specifies the session token, the resources located at the second region, at least:
        identifying the first region based at least in part on the session token;
        providing the request for resources to the first region;
        re-encrypting the session token, from using the first secret key to using a public key of the second region, to produce a first encrypted session token;
        obtaining the first encrypted session token;
        decrypting the first encrypted session token using a private key of the second region corresponding to the public key;
        encrypting the session token using a second secret key different from the first secret key to produce a second encrypted session token, wherein the second secret key is generated based at least in part from a key associated with the client computing device and a key associated with the second region, the second secret key maintained as a secret in the second region; and
        fulfilling the request for resources using credentials provided by the second encrypted session token.

2. The computer-implemented method of claim 1, wherein:
    the session token comprises a first session key; and
    the method further comprises:
        obtaining the first session key as part of re-encrypting the session token at the first region using the first secret key; and
        verifying a digital signature of the request for resources using the first session key extracted from the session token.

3. The computer-implemented method of claim 1, further comprising providing a second session key to the client computing device, wherein the request for resources is digitally signed using a digital signature based at least in part on the second session key.

4. The computer-implemented method of claim 1, further comprising caching the second encrypted session token in the second region to produce a cached session token.

5. The computer-implemented method of claim 4, further comprising, as a result of obtaining, at the second region, a subsequent request for resources using the session token encrypted using the first secret key, at least:
    verifying the subsequent request for resources was generated using the session token; and fulfilling the subsequent request for resources using credentials provided by the cached session token.

6. A system, comprising:
one or more processors; and
memory to store computer-executable instructions that, as a result of execution by one or more processors, cause the system to:
  obtain, at a second region, a request for resources, the request encoding a session token and identifying a first region, wherein the session token is encrypted using a cryptographic key inaccessible to a requestor of the first region;
  provide, to the first region, information encoding the session token and a public cryptographic key associated with the requester and a second public cryptographic key associated with the second region;
  obtain an encrypted session token from the first region;
  decrypt the encrypted session token using a private key corresponding to the public cryptographic key associated with the requester and the second public cryptographic key associated with the second region; and
  fulfill the request for resources using credentials provided by the decrypted session token.

7. The system of claim 6, wherein the computer-executable instructions, as a result of execution by the one or more processors, further cause the system to:
  identify the first region based at least in part on the session token; and
  obtain the encrypted session token from the first region in response to providing the session token and the information specifying the public key associated with the second region.

8. The system of claim 6, wherein the computer-executable instructions, as a result of execution by the one or more processors, further cause the system to:
  obtain a request for a session digitally signed with a second digital signature, the request for the session specifying a first region;
  verify the request for the session using the second digital signature; and
  provide the session token.

9. The system of claim 6, wherein the computer-executable instructions to fulfill the request for resources using the credentials provided by the decrypted session token, as a result of execution by the one or more processors, further cause the system to:
  encrypt the decrypted session token using a secret key maintained as a secret in the second region to produce an encrypted session token; and
  fulfill the request for resources using credentials provided by the encrypted session token.

10. The system of claim 6, wherein the session token generated in the first region includes a session key and the cryptographic key is maintained as a secret in the first region.

11. The system of claim 10, wherein the session key is a public key of a public key cryptography key pair, the public key cryptography key pair including a private session key corresponding to the session key.

12. The system of claim 6, wherein the computer-executable instructions, as a result of execution by the one or more processors, further cause the system to:
  cache the decrypted session token in the second region to produce a cached session token;
  obtain, at the second region, a subsequent request for resources using the session token generated in the first region;
  verify that the subsequent request for resources was generated using the session token generated in the first region; and
  fulfill the subsequent request for resources using credentials provided by the cached session token.

13. A set of one or more non-transitory computer-readable storage media with executable instructions stored thereon that, as a result of being executed by one or more processors of a computer system, cause the computer system to at least:
  provide a session token to a device associated with a customer in a first region, the session token encrypted using a cryptographic key maintained as a secret in the first region and being inaccessible to the customer;
  obtain a request comprising information encoding the session token and a public key generated based at least in part from a first key associated with the customer and a second key associated with a second region;
  decrypt the session token using the cryptographic key;
  encrypt the session token at the first region using the public key to produce an encrypted session token; and
  make the encrypted session token available to the second region.

14. The set of one or more non-transitory computer-readable storage media of claim 13, wherein the instructions further comprise instructions that, as a result of being executed by the one or more processors, cause the computer system to at least:
  generate a session key associated with the session token;
  store the session key in a set of session data prior to encrypting the set of session data to produce the session token; and
  provide the session key to a device in the first region.

15. The set of one or more non-transitory computer-readable storage media of claim 13, wherein the instructions further comprise instructions that, as a result of being executed by the one or more processors, cause the computer system to at least:
  obtain, at the second region, a request for resources using the session token;
  identify the first region based at least in part on the session token;
  send, to the first region, the request for the encrypted session token;
  as a result of obtaining the encrypted session token from the first region:
    decrypt the encrypted session token using a private key of the second region corresponding to the public key of the second region to produce a decrypted session token;
    encrypt the decrypted session token using a second secret key different from the cryptographic key to produce a second encrypted session token, the second secret key maintained as a secret by a security service in the second region; and
    fulfill the request for resources using credentials provided by the second encrypted session token.

16. The set of one or more non-transitory computer-readable storage media of claim 15, wherein the instructions further comprise instructions that, as a result of being executed by the one or more processors, cause the computer system to cache the second encrypted session token in the second region to produce a cached session token.

17. The set of one or more non-transitory computer-readable storage media of claim 16, wherein the instructions further comprise instructions that, as a result of being executed by the one or more processors, cause the computer system to:

obtain, at the second region, a subsequent request for resources using the session token;

verify that the subsequent request for resources was generated using the session token; and fulfill the subsequent request for resources using credentials provided by the cached session token.

18. The set of one or more non-transitory computer-readable storage media of claim 16, wherein the instructions further comprise instructions that, as a result of being executed by the one or more processors, cause the computer system to delete the cached session token from the second region after a specified time period has elapsed.

19. The set of one or more non-transitory computer-readable storage media of claim 13, wherein:

the cryptographic key is a private key of a public key cryptography key pair, the public key cryptography key pair including a public key generated to match the cryptographic key; and the public key cryptography key pair is generated using RSA cryptography.

20. The set of one or more non-transitory computer-readable storage media of claim 13, wherein the cryptographic key is generated using elliptic curve cryptography.

\* \* \* \* \*